(12) United States Patent
Greiff et al.

(10) Patent No.: US 12,286,151 B1
(45) Date of Patent: Apr. 29, 2025

(54) SYSTEM AND METHOD FOR CONTROLLING MOTION OF ARTICULATED VEHICLES

(71) Applicant: Mitsubishi Electric Research Laboratories, Inc., Cambridge, MA (US)

(72) Inventors: Marcus Greiff, Cambridge, MA (US); Rien Quirynen, Cambridge, MA (US); Karl Berntorp, Cambridge, MA (US); Stefano Di Cairano, Cambridge, MA (US); Yebin Wang, Cambridge, MA (US); Eyad Zeino, Cambridge, MA (US); Astha Tiwari, Cambridge, MA (US); Hassan Iqbal, Cambridge, MA (US); Shuangxuan Ran, Cambridge, MA (US); Sixiong You, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 229 days.

(21) Appl. No.: 18/189,377

(22) Filed: Mar. 24, 2023

(51) Int. Cl.
*B62D 13/06* (2006.01)
*B60W 30/095* (2012.01)

(52) U.S. Cl.
CPC .......... *B62D 13/06* (2013.01); *B60W 30/095* (2013.01); *B60W 2300/14* (2013.01); *B60W 2510/18* (2013.01)

(58) Field of Classification Search
CPC . B62D 13/06; B60W 30/095; B60W 2300/14; B60W 2510/18
See application file for complete search history.

(56) References Cited

U.S. PATENT DOCUMENTS

| | | | |
|---|---|---|---|
| 4,518,053 A | 5/1985 | Queveau | |
| 5,414,624 A | 5/1995 | Anthonyson | |
| 2020/0001920 A1* | 1/2020 | Hejase | B60W 30/18036 |
| 2023/0331217 A1* | 10/2023 | Wang | B60W 30/18009 |

(Continued)

OTHER PUBLICATIONS

Pesce et al., Trajectory Planning for Articulated Vehicles, 2017, usp.br, pp. 1-60 (Year: 2017).*

(Continued)

*Primary Examiner* — Sze-Hon Kong
(74) *Attorney, Agent, or Firm* — Gene Vinokur

(57) ABSTRACT

A system for controlling motion of an articulated vehicle with one or multiple trailers is described. The system is configured to infer the state of a vehicle, determine a motion path with forward motions and backward motions for the vehicle based on the state, and formulate an optimal control problem for optimizing the motion path. The optimal control problem comprises an integral tracking error function indicating integral tracking error based on motion cusps relating to the motion path. The motion cusps indicate switching between forward motion and backward motion. The motion path is optimized over a prediction horizon based on solving the optimal control problem. A control command is generated for the vehicle based on the optimized motion path and a vehicle model, and the motion of the articulated vehicle is controlled based on the control command thereby changing its state.

20 Claims, 23 Drawing Sheets

(56) References Cited

U.S. PATENT DOCUMENTS

2024/0051521 A1* 2/2024 James ................... B60W 30/06
2024/0239409 A1* 7/2024 Tokoro ............... B62D 15/0285

OTHER PUBLICATIONS

Bill Triggs, Motion Planning for Nonholonomic Vehicles: An Introduction, 1993, Robotics Research Group, pp. 1-19 (Year: 1993).*
"A Path Planning and Path-following Control Framework for a General 2-trailer with a Car-like Tractor". jungqvist, Oskar and Evestedt, Niclas and Axehill, Daniel and Cirillo, Marcello and Pettersson, Henrik. Journal of field robotics, vol. 36, No. 8, pp. 1345-1377, 2019, Wiley Online Library.

* cited by examiner

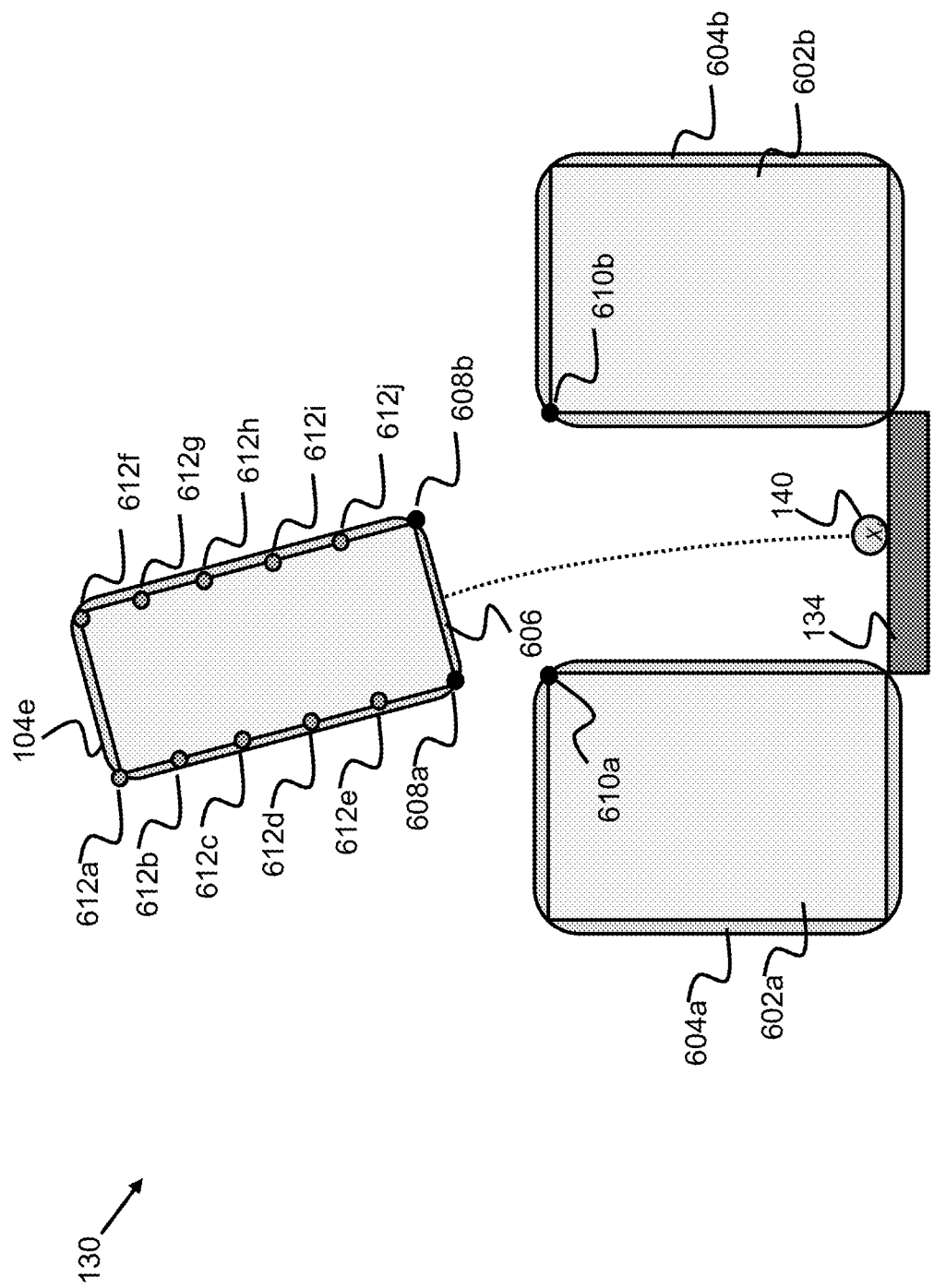

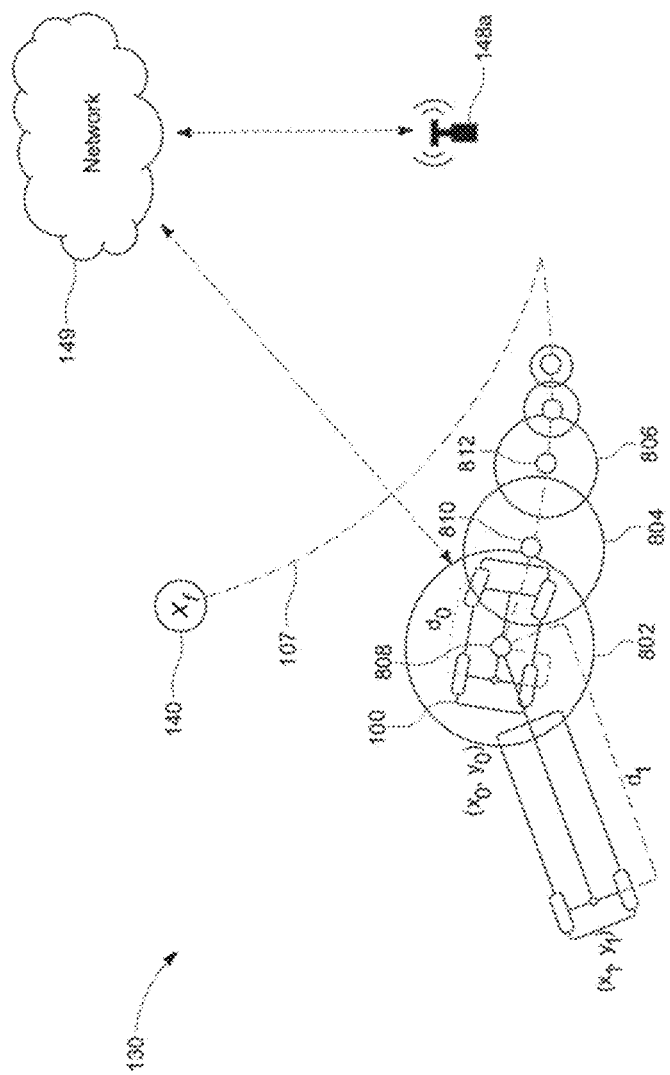

SYSTEM AND METHOD FOR CONTROLLING MOTION OF ARTICULATED VEHICLES

TECHNOLOGICAL FIELD

The present disclosure relates to controlling motion of vehicles, and more particularly to motion planning and predictive control for an autonomous or a semi-autonomous vehicle-trailer system with one or more trailers.

BACKGROUND

Automated transportation systems may lead to reduced accidents, and improved road safety. Connected and automated vehicles (CAVs) may also improve vehicle infrastructure and traffic flows, thereby reducing congestion, travel time, vehicular emissions, and fuel consumption. Commercial heavy-duty vehicles (HDV), such as trucks, are an important use case of vehicle automation in logistics and shipping. In particular, autonomous control of heavy-duty articulated vehicles may provide considerable advantages to the transportation sectors with respect to economic, environmental, and social factors.

In recent years, optimization-based planning and control have been increasingly used for automated vehicle operation. For heavy-duty articulated vehicles, the major focus of ongoing research has been on platooning and control of articulated vehicles, especially when cruising on the highway. To this end, optimization-based motion planning and control techniques have been utilized for automation of different tasks. In addition, various techniques have been proposed for articulated vehicle motion planning, such as sampling-based, lattice-based, or combined algorithms. Moreover, different control algorithms, for example, including sliding mode control, linear quadratic regulation, input-to-state linearization, continuous time-varying nonlinear feedback laws, dynamic programming, and model predictive control, have been proposed to track a resulting motion plan for an articulated vehicle.

However, maneuvers such as precision reversing are more difficult to automate, and most docking or parking of articulated vehicles rely on skilled drivers, requiring extensive and expensive labor training. During a docking maneuver, a driver needs to accurately control position and orientation of an articulated vehicle, such as a tractor-trailer, while executing a sequence of forward and reverse motions to park the articulated vehicle in a designated bay area with tight specifications of space and stationary configuration errors. Moreover, the driver may have a limited vision of an area around the designated docking space. As a result, a task of automated docking or parking is a critical maneuver in heavy-duty articulated vehicle operations, due to requiring an extremely high precision.

Reliable tracking and control of such articulated vehicles during parking and docking maneuvers is difficult owing to complex parking and docking maneuvers and corresponding disturbances and modeling errors. Moreover, small tracking errors during parking maneuvers may lead to damaged infrastructure, both on the vehicle and the docking bay.

Further, tracking and control of the articulated vehicles during parking maneuvers become even more challenging if there are many trailers connected in a series without active steering. Any disturbance acting on the closed-loop system, such as un-modeled dynamics will significantly affect tracking performance of a rear trailer of an articulated vehicle when reversing, necessitating control systems that change both in structure and in tuning when performing forward and backward path tracking.

In certain cases, the standard n-trailer (SNT) may be used in a control system design for controlling articulated vehicles. The SNT model admits an exact feedback linearization that results in powerful nonlinear feedback laws that can be combined with linear control synthesis techniques. However, such control system designs based on SNT are extremely sensitive to modeling errors and cannot easily incorporate state constraints that are necessary to ensure operational safety.

An alternative is to use model predictive controller (MPC) to achieve path tracking of articulated vehicles. However, linear MPC are limited to path tracking for straight forward motions (such as, cruise control). Further, when considering forward and backward motions, a control system combining linear MPC and nonlinear MPC (NMPC) may be used for path tracking and control of the articulated vehicles. In certain cases, a linear MPC is complemented by an extended Kalman filter specifically designed to estimate external disturbances, while proposing the linear MPC with fuzzy logic. Alternatively, NMPC may be used for path tracking and control of arbitrary dynamically feasible paths with both forward and backward motion for special paths having motion primitives, such as linear segments and circular trajectories.

However, such linear or nonlinear MPC control systems fail to consider impact of modeling errors. To this end, backward motion implies significant challenges in path tracking and control, specifically for performing docking or parking maneuvers, as even small modeling errors are amplified through a chain of unstable systems. While the docking maneuver may seem easy, it requires a comparably higher precision and is a key task in heavy-duty articulated vehicle operation. Therefore, there is a need to overcome a technical problem associated with docking maneuver, specifically, automated tractor-trailer docking operation.

SUMMARY

It is an object of some embodiments to disclose a system for controlling a motion of an articulated vehicle. It is another object of some embodiments to disclose a method for controlling a motion of an articulated vehicle. It is another object of some embodiments to disclose a new type of control system using a motion planning algorithm and a real-time reference tracking controller, tailored to a task of automated docking or parking maneuver. It is another object of some embodiments to provide such a system and a method that uses a tracking controller using nonlinear model predictive control for motion planning to facilitate robust path tracking with respect to a docking maneuver for one or more trailers connected in series.

Some embodiments are based on the realization that the docking maneuver (also referred to as docking operation or parking operation) is a critical maneuver in heavy-duty articulated vehicle operations, due to requiring an extremely high precision to dock the articulated vehicle successfully. Some embodiments are based on a realization that the docking maneuver requires extensive and expensive labor training, specifically, for vehicle-trailer docking maneuver.

Some embodiments are based on the realization that during the docking maneuver, a driver needs to accurately control the position and orientation of an articulated vehicle while executing a sequence of forward and reverse motions. Moreover, the driver may have a limited vision of an area around a designated docking space to connect a rear end of the trailer to a docking bay. Therefore, reliable tracking and control of such articulated vehicles during docking maneuvers is difficult owing to disturbances and modeling errors. In particular, any disturbance or un-modeled dynamics may significantly affect tracking performance of a rear trailer of an articulated vehicle when reversing, posing serious safety concerns in automated docking maneuvers.

Some embodiments are based on the recognition that use of linear MPC for path tracking and control of articulated vehicles is restricted to simpler motion primitives, such as the forward motion used in cruise control on highways.

Some embodiments are based on the understanding that path tracking and control with forward and backward motions for special paths having motion primitives, such as linear segments and circular trajectories is challenging as any modeling error is greatly amplified through a chain of unstable systems in non-linear MPC.

Some embodiments are based on the realization that controllers may perform explicit linearization and provide linear state feedbacks, however, that may prevent backward motion from all initial states because of jack-knife effects.

Some embodiments are based on the understanding that a hybrid control system that switches between different linear state feedback controllers defined for different motion primitives may be used; however, such control system may produce a large set of linear state feedbacks for different linear state feedback controllers and may remain sensitive to modeling errors and disturbances.

Some embodiments are based on the realization that a lateral tracking error may be introduced due to, for example, an unknown steering angle bias. Although the bias may be tolerable in forward motions, backward motions may amplify an effect of a disturbance due to the bias, causing the steering angle bias and modeling errors result in much larger tracking errors.

It is an object of the present disclosure to focus on articulated vehicle, such as tractor-trailer operating with one or more trailers. It is an object of the present disclosure to disclosure techniques for performing autonomous docking maneuvers for articulated vehicles that requires a high precision due to the potential for infrastructure damage and is a key task in fully autonomous heavy-duty vehicle operations.

Some embodiments are based on the realization that it is common for motion planners to generate a fragmental path including multiple motion cusps, i.e., segments connected by a stationary configuration or a point in a state space. A motion cusp adds flexibility to space exploration in the planning and tends to give a shortest distance path. Conventional motion planners may seek for a shortest path and thus generate unnecessary motion cusps. Such motion cusps may compromise the positioning accuracy of an integrated system. Conventional motion planners tend to improve the generated path in terms of path length, but fail to consider a number of motion cusps. Some embodiments are based on the realization that the conventional motion planners may take motion cusps into consideration by integrating a cost function with a soft constraint. As a result, computation time may increase substantially.

Some embodiments are based on the realization that, in theory, presence of motion cusps may add inconvenience due to necessity of shifting a gear but may not cause a problem if large tracking errors are tolerable. However, in practical applications involving precision parking, such as the docking maneuver, attenuation of tracking errors and system robustness may be severely affected when reversing. This is particularly true if many trailers are connected in series without active steering. In addition, frequently occurring motion cusps and extended periods of reversing may lead to large and dangerous terminal tracking errors in the docking maneuvers.

Some embodiments are based on the realization that the presence of the motion cusp necessitates a motion of an articulated vehicle with zero and near-zero velocity and such motion is problematic for accuracy of control due to dominance of inertia of the articulated vehicle over its dynamic behavior. Hence, each motion cusp in a path of the articulated vehicle creates uncertainty that accumulates with a total number of motion cusps, thereby creating a tracking accuracy problem.

Some embodiments are based on the realization that for performing a special path, such as comprising forward and backward motion along line segment and circular path in docking or parking maneuvers, MPC based control systems may result in significant offsets in trailer's lateral tracking error. Some embodiments are based on the realization that the NMPC based control system utilizing non-linear vehicle model may perform worse if there is a modeling mismatch between the prediction model of the controller and the underlying system dynamics.

It is an object of some embodiments to generate a path for performing a docking maneuver. Some embodiments are based on understanding that sampling-based motion planning controllers construct a graph by adding each new node based on a cost-to-go indicative of the cost of having a path going through the new node. Hence, it is crucial to add a cost-to-go penalty due to an excessive number of motion cusps and constraint violations. However, using a soft constraint over a total number of motion cusps in the cost function is computationally expensive for sampling-based motion planning and may lead to a failure in finding a feasible solution within a time period. As a result, real-time usability of such soft constraint is affected.

Accordingly, to overcome the above-mentioned problems with docking maneuvers, some embodiments of the present disclosure disclose a multi-stage path and motion planning system that during a first stage aims to find a feasible path using a sampling-based motion planning. Further, after finding a feasible path, instead of terminating the planning and outputting the path to the controller, the multi-stage path and motion planning system continues to expand a graph during a second stage using hard constraints relating to the motion of the articulated vehicle.

Additionally, it is an object of some embodiments to provide a sampling-based motion planning that may enable the motion of the articulated vehicle with increased accuracy, to perform a docking maneuver of an articulated vehicle.

It is an object of some embodiments of the present disclosure to provide an integrated system comprising a graph-based motion planning algorithm and a real-time reference tracking controller. The system is configured to perform a task of automated articulated docking. It is an object of some embodiments of the present disclosure to provide a modified variant of an A-search guided tree (AGT) path and motion planning algorithm.

It is an object of some embodiments of the present disclosure to disclose techniques for tracking an obtained reference trajectory from the AGT algorithm for performing the docking maneuver.

It is an object of some embodiments to provide a real-time and feasible implementation of a nonlinear model predictive controller with integral action (iNMPC) for considering combined lateral and longitudinal dynamics of the articulated vehicle.

Some embodiments are based on the recognition that the articulated vehicle, for example, a truck or a tractor-trailer, alternates forward motions and reverse motions when steering towards a docking bay or docking area. Further, within the docking area, a docking mechanism of the articulated vehicle connects to a docking door.

Some embodiments are based on the recognition that unlike conventional automated driving on highways or urban environments, the docking maneuver is more lenient to the path tracking errors when the articulated vehicle is far from a docking configuration but is very stringent in both lateral position and heading error requirements in a neighborhood of the docking area in the docking bay.

Some embodiments are based on the understanding that a configuration of the articulated vehicle system with n trailers may be defined as:

$$q=(x,y,\theta_0,\theta_1,\ldots,\theta_n)\in R^2\times(S^1)^{n+1}=C$$

where $C_{free}\subseteq C$ denotes a set of collision-free motion primitives for the vehicle. The set of collision-free motion primitives may depend on many factors, such as obstacles in the docking bay and geometry of the trailers.

It is an object of some embodiments to compute a trajectory and control an articulated vehicle to execute a docking maneuver starting from an initial configuration $q(0)\in C_{free}$ with zero velocity, to a target docking configuration in a terminal set $q(t_f)\in C_f\subseteq C_{free}$, while meeting certain requirements within a terminal time $t_f>0$.

Some embodiments are based on the understanding that there may be a constraint on total time for performing the docking maneuver, T, which need to be taken into consideration both in the planning and the control stage.

Some embodiments are based on the understanding that the requirements for the automated docking system with respect to a preferred docking pose are that a lateral position error of a last trailer ($n^{th}$ trailer) of the articulated vehicle is defined as: $e_n^y(t_f)=|y_n^{ref}(t_f)-y_n(t_f)|<0.1$ meters (m) and a heading angle error is defined as: $|e_i\theta(t_f)|=|\theta_i^{ref}(t_f)-\theta_i(t_f)|<0.1°$ for all i=0, ..., n.

Some embodiments are based on the recognition that planning and control algorithm disclosed in the present disclosure is configured to meet real-time requirements of generation of the path and controlling motion of the articulated vehicle.

It is an object of some embodiments to provide a tailored modification of the IAGT algorithm for motion planning of the articulated vehicle docking maneuver.

It is an object of some embodiments to provide a NMPC with integral tracking error for reference tracking that is offset-free, to meet the stringent precision requirements of the docking maneuver.

It is an object of some embodiments to provide a system that considers impact of modeling error, such as error due to constant steering angle bias, error due to an incorrect hitching offset and error due to actuator dynamics, during tracking and path panning.

Accordingly, one embodiment discloses a system for controlling a motion of an articulated vehicle having one or more trailers using a motion planner. The system comprises a memory configured to store computer executable instructions and one or more processors configured to execute the instructions to collect a feedback signal indicative of a state of the articulated vehicle, and determine a motion path for the articulated vehicle based on the feedback signal, the motion path comprising one or more forward motions of the articulated vehicle and one or more backward motions of the articulated vehicle. The one or more processors are configured to generate an optimal control problem for optimizing the motion path, the optimal control problem comprising an integral tracking error function relating to the motion path, the integral tracking error function indicating at least an integral tracking error resulting from one or more motion cusps, the one or more motion cusps indicating a switching between a forward motion and a backward motion in the motion path. The one or more processors are configured to optimize the motion path over a prediction horizon based on solving the optimal control problem, the prediction horizon being associated with a vehicle model of the articulated vehicle having the state. The one or more processors are configured to generate a control command for the articulated vehicle based on the optimized motion path and the vehicle model, and control the motion of the articulated vehicle based on the control command thereby changing its state.

The one or more processors are further configured to construct a graph having multiple nodes defining states of the articulated vehicle over the prediction horizon. The multiple nodes of the graph comprises an initial node defining a target state of the articulated vehicle and a target node defining an initial state of the articulated vehicle, wherein each pair of nodes in the graph is connected with an edge defined by one or a combination of collision-free motion primitives moving the articulated vehicle between the states of the connected nodes, and wherein the multiple nodes connected through the corresponding edges form a first path through the graph connecting the initial node with the target node by a sequence of motion primitives for moving the articulated vehicle from the initial state to the target state. The one or more processors are further configured to generate the motion path based on the first path formed by the graph, and control the motion of the articulated vehicle based on the motion path, when the motion path is formed before a termination condition is met. In particular, the one or more processors are configured to perform the expansion of the first graph until the termination condition is met and control the movement of the vehicle based on the second path, when the second path is formed before the termination condition is met.

Some embodiments are based on the realization that the one or more processors are configured to control the movement of the vehicle based on the first path, when the second path is not formed until the termination condition is met.

The one or more processors are further configured to connect the target node of the graph to an initial configuration of the articulated vehicle by solving a linear quadratic regulator (LQR) steering problem.

The one or more processors are further configured to determine a first number of motion cusps in the sequence of motion primitives of the first path, and determine a first number of initial tracking errors induced by solving the LQR steering problem. On determining at least one of: the first number of motion cusps to be greater than a predefined motion cusp threshold, or the first number of initial tracking errors to be greater than a predefined initial tracking error threshold, the one or more processors are further configured to expand the graph to add one or more new nodes until the termination condition is met. The expansion of the graph is subjected to a constraint associated with at least one of: a total number of motion cusps, or a total number of initial tracking errors. The graph is expanded to form a second path by connecting the initial node with the target node. The second path has at least: a second number of motion cusps that are less than the first number of motion cusps, or a second number of initial tracking errors that are less than the first number of initial tracking errors.

Some embodiments are based on an understanding that the second path comprises a minimum number of motion cusps for moving the articulated vehicle from the initial state to the target state. Other embodiments are based on the realization that a key factor of the maneuver success is how well the graph connects to the initial configuration using the predefined initial tracking error threshold on the initial tracking errors to determine the feasibility of the second path.

Some embodiments are based on the realization that one or more processors are further configured to construct the graph to form the first path by iteratively expanding a node from multiple nodes to create a new node or by connecting two existing nodes from the multiple nodes.

In some embodiments, to form at least one of: the first path or the second path, the one or more processors are further configured to construct a tree of nodes emanating from the target node at the terminal configuration $q(t_f) \in C_{free}$. Further, the one or more processors are configured to connect the tree with the initial configuration $q(0) \in C_{free}$ of the articulated vehicle with a path segment closest to the initial configuration computed as a solution to a linear quadratic regulation (LQR) steering problem. In this way, a node in the tree that is closest to the initial configuration of the articulated vehicle is controlled to be as close as possible to the initial configuration of the articulated vehicle, resulting in a kinematically feasible reference trajectory with a small but tolerable initial tracking errors $q(0) \neq q^{ref}(0)$ which is referred to as the initial tracking errors, may be used to determine a quality of a computed motion path along with a number of motion cusps of the motion path.

In some embodiments, to form at least one of: the first path or the second path, the one or more processors are further configured to select an expandable node from the graph, based on a cost associated with the expandable node. Further, the one or more processors are configured to expand the graph by adding a child node connected to the expandable node with an edge defined by a collision-free motion primitive such that a cost of the child node is less than a cost of the expandable node. The cost of the child node is a minimum cost for reaching the target node from the initial node through the child node. In an example, the cost of the child node includes a first cost of an initial path through a first set of nodes, a second cost of a target path through a second set of nodes, and a third cost of a connecting path between the first set of nodes and the second set of nodes.

Some embodiments are based on the realization that the one or more processors are further configured to remove a child node from a queue while expanding the graph to form the second path, when an edge between the child node and a corresponding expandable node comprises a number of motion cusps greater than a predefined motion cusp threshold.

Some embodiments are based on the realization that the one or more processors are further configured to select the expandable node to form the first path without a constraint associated with the number of motion cusps. Further, the one or more processors are configured to select the expandable node to form the second path, wherein the expansion of the graph is subjected to the constraint associated with a total number of motion cusps and/or a total number of initial tracking errors when connecting the tree of nodes to the initial configuration and/or the total computation time of the planning.

Some embodiments are based on the realization that the one or more processors are further configured to initialize the second tree with a root node at a distance from the target node having a cusps-free movement to the target node.

Some embodiments are based on the realization that the root node is connected to the target node with an edge defining a straight motion in order to avoid inducing errors close to the terminal configuration at the docking bat where safety and small initial tracking errors are paramount.

The one or more processors are further configured to generate a reference trajectory for the motion of the articulated vehicle along at least one of: the first path or the second path, as a function of time, and generate a control command for the articulated vehicle to cause the articulated vehicle to follow the reference trajectory.

Some embodiments are based on the realization that the one or more processors are further configured to generate the reference trajectory for the motion of the articulated vehicle by adding a time dimension to at least one of: the first path or the second path, wherein the adding the time dimension comprises adding extra time at one or more motion cusps of the reference trajectory.

The one or more processors are further configured to determine a safety region for the motion of the articulated vehicle based on the generated reference trajectory, check for a dynamic obstacle within the safety region, and cause to stop the motion of the articulated vehicle along the reference trajectory by initiating an automatic emergency braking (AEB) system to execute a braking maneuver on identifying the dynamic obstacle to be within the safety region. The safety region comprising one or more safety sets along the reference trajectory.

The path and motion planning system comprises a predictive controller. The predictive controller configured with at least a constraint function, a quadratic objective function and the vehicle model, wherein the predictive controller is configured to track the motion of the articulated vehicle.

The one or more processors are further configured to generate an equality constraint function and an inequality constraint function for the predictive controller, when the predictive controller comprises one or more non-linear constraints and a non-linear vehicle model. The one or more processors are further configured to generate an objective function for the predictive controller, the objective function being configured to minimize errors between one or more predicted states and the reference trajectory over a prediction time horizon of the predictive controller. The one or more processors are further configured to solve a constrained optimization problem associated with the predictive controller based on the equality constraint function, the inequality constraint function, and the objective function, using one or more iterations of sequential quadratic programming.

Some embodiments are based on the realization that the equality constraint function, the inequality constraint function, and the objective function relating to the constrained optimization problem associated with the predictive controller are adjusted to at least one of: a forward motion of the articulated vehicle or a backward motion of the articulated vehicle.

Some embodiments are based on the realization that one or more functional relationships defining an integral action for the constrained optimization problem of the predictive controller are determined differently for the one or more forward motions and the one or more backward motions, and wherein an integral tracking error state is reset at the time at which the one or more motion cusps occur.

Some embodiments are based on the realization that the articulated vehicle comprises a tractor coupled with one or more trailers, wherein the integral action is implemented to integrate at least one of: a lateral positional tracking error of an end trailer when the articulated vehicle is executing the one or more backward motions, or a lateral positional tracking error of the tractor when the articulated vehicle is executing the one or more forward motions.

Some embodiments are based on the realization that the predictive controller includes one or more collision avoidance constraints to enforce one or more collision-free motion primitives in an environment while executing a sequence of motion primitives for moving the articulated vehicle.

Some embodiments are based on the realization that each of the one or more collision avoidance constraints are implemented using multiple non-linear inequality constraints.

Some embodiments are based on the realization that the articulated vehicle is a tractor-trailer vehicle comprising a tractor coupled with one or more trailers, wherein the articulated vehicle is controlled by the control system to perform a docking maneuver.

Another embodiment discloses a method for controlling a motion of an articulated vehicle. The method comprises collecting a feedback signal indicative of a state of the articulated vehicle, determining a motion path for the articulated vehicle based on the feedback signal, and generating an optimal control problem for optimizing the motion path. The motion path comprises one or more forward motions of the articulated vehicle and one or more backward motions of the articulated vehicle. The optimal control problem comprises an integral tracking error function relating to the motion path. The integral tracking error function indicates at least an integral tracking error resulting from one or more motion cusps. The one or more motion cusps indicate a switching between a forward motion and a backward motion in the motion path. The method further comprises optimizing the motion path over a prediction horizon based on solving the optimal control problem, the prediction horizon being associated with a vehicle model of the articulated vehicle having the state. The method further comprises generating a control command for the articulated vehicle based on the optimized motion path and the vehicle model and controlling the motion of the articulated vehicle based on the control command thereby changing its state.

Yet another embodiment discloses a non-transitory computer readable storage medium embodied thereon a program executable by a processor for performing a method for controlling a motion of an articulated vehicle. The method comprises collecting a feedback signal indicative of a state of the articulated vehicle, determining a motion path for the articulated vehicle based on the feedback signal, and generating an optimal control problem for optimizing the motion path. The motion path comprises one or more forward motions of the articulated vehicle and one or more backward motions of the articulated vehicle. The optimal control problem comprises an integral tracking error function relating to the motion path. The integral tracking error function indicates at least an integral tracking error resulting from one or more motion cusps. The one or more motion cusps indicate a switching between a forward motion and a backward motion in the motion path. The method further comprises optimizing the motion path over a prediction horizon based on solving the optimal control problem, the prediction horizon being associated with a vehicle model of the articulated vehicle having the state. The method further comprises generating a control command for the articulated vehicle based on the optimized motion path and the vehicle model and controlling the motion of the articulated vehicle based on the control command thereby changing its state.

Some embodiments are based on the understanding that performing the docking maneuver for articulated vehicles requires complex, time consuming and costly labor training. Moreover, owing to limited visibility around an area associated with a docking bay, drivers of the articulated vehicles may have to perform extra movements, such as forward and backward motions several number of times in order to correctly approach the docking bay and a final vehicle pose. Owing to limited visibility, the docking maneuver may also be prone to accidents. Moreover, conventional path and motion planning systems fail to perform such docking operation for articulated vehicle in an automated manner. To overcome these, the present disclosure discloses a system for controlling motion of an articulated vehicle for performing a docking maneuver. Therefore, it is an objective of the present disclosure to enable automated docking of the articulated vehicle with one or more trailers. The automated docking maneuver may reduce time for docking and chances of accidents. In this way, complex docking operations may be performed in an automated manner.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 6C shows an example docking maneuver, in accordance with some embodiments of the present disclosure.

FIG. 8A shows an example of execution of an automated docking maneuver with automatic emergency braking, in accordance with some embodiments of the present disclosure.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram only to avoid obscuring the present disclosure. Contemplated are various changes that may be made in the function and arrangement of elements without departing from the spirit and scope of the subject matter disclosed as set forth in the appended claims.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail to avoid obscuring the embodiments. Further, like reference numbers and designations in the various drawings indicated like elements.

It is an object of some embodiments to disclose a system for controlling motion of an articulated vehicle in real-time. In an example, the system is based on model predictive controller (MPC) for determining control inputs based on a dynamic model and constraints of the system. Moreover, the system includes a path and motion planning algorithm, for example an A-search guided tree (AGT). It is another object of some embodiments to disclose techniques for controlling motion or operation of the articulated vehicle during docking maneuver in an automated manner, i.e., without human intervention. It is another object of some embodiments to disclose techniques for computing dynamically or kinematically feasible reference trajectory online, starting from an initial pose $q(0) \in C_{free}$ to a docking pose $q(t_f) \in C_f$, while avoiding collisions between the articulated vehicle and any static and/or dynamic obstacles in the environment.

Figure 1A:
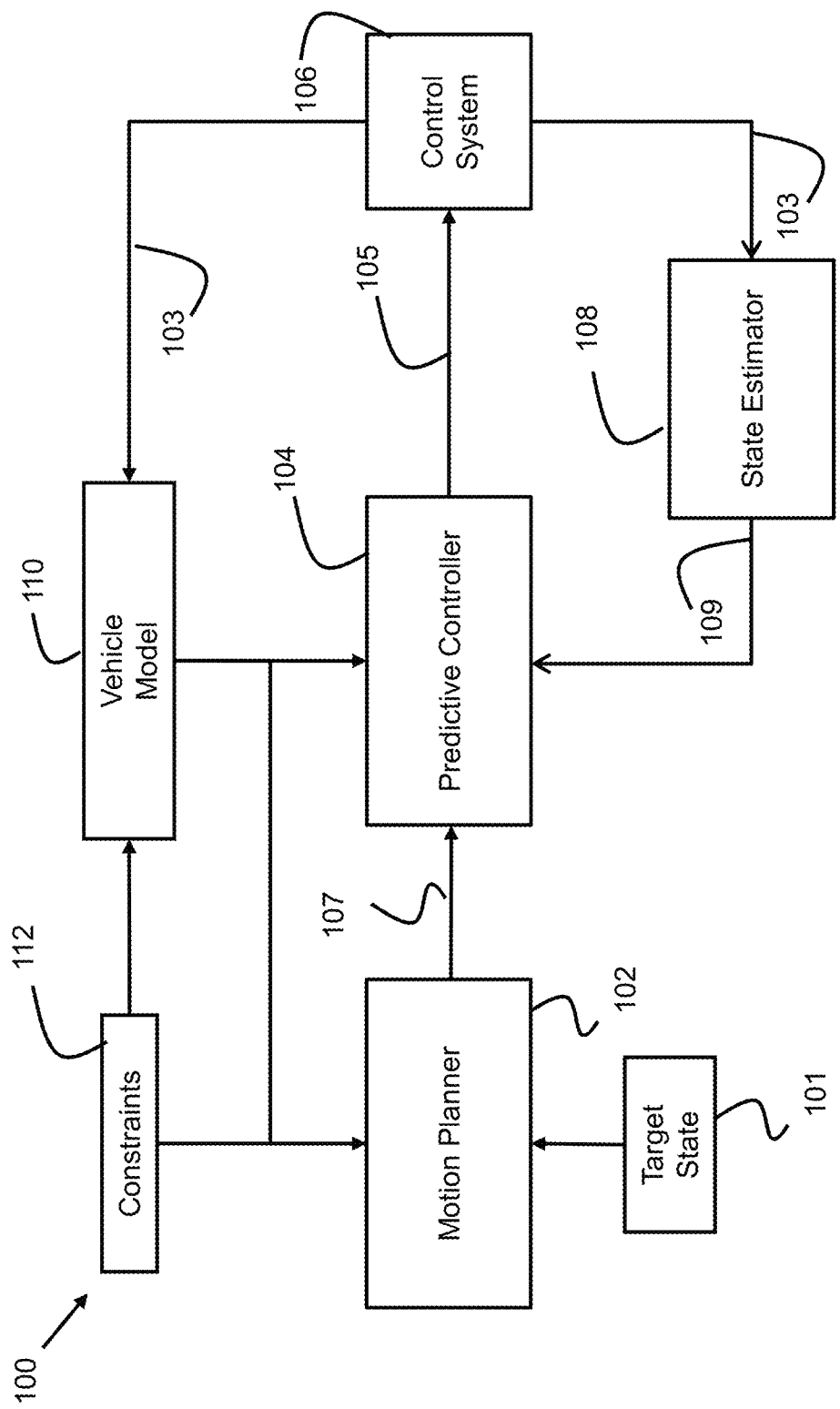
FIG. 1A shows an example block diagram of a path and motion planning system for controlling a motion of an articulated vehicle, according to some embodiments of the present disclosure.

FIG. 1A illustrates a block diagram of a path and motion planning system 100 for controlling a motion of an articulated vehicle, in accordance with some embodiments of the present disclosure. In an example, the articulated vehicle is a tractor-trailer vehicle comprising a tractor coupled with one or more trailers. The articulated vehicle is controlled by the path and motion planning system 100 to perform a docking maneuver or a parking maneuver for the trailer. In this regard, the path and motion planning system 100 is configured to keep target tracking errors for the trailers 124 with respect to a reference trajectory 107 during a final time of the maneuver below threshold values, for performing a successful docking or parking maneuver. Such maneuvers may be performed in, for example, in a shipping yard management system, a parking bay, and so forth. The path and motion planning system 100 (referred to as system 100, hereinafter) is configured to perform the maneuver while avoiding collisions between the yard dog or trailer and any obstacles in the shipping yard environment.

The system 100 is configured to control motion and movement of the articulated vehicle. In an example, the system 100 may be configured to control the motion of the articulated vehicle, using a motion planner 102, a predictive controller 104 and a control system 106, while performing a docking maneuver. During the docking maneuver, the articulated vehicle may have to maneuver in forward and reverse motions consecutively while steering towards a docking bay. At the docking bay, a last trailer of the articulated vehicle may connect to a docking door. Once docked, loading and/or offloading of goods from the trailers may be performed. A configuration of the articulated vehicle is explained in detail in conjunction with FIG. 1B.

Figure 1B:
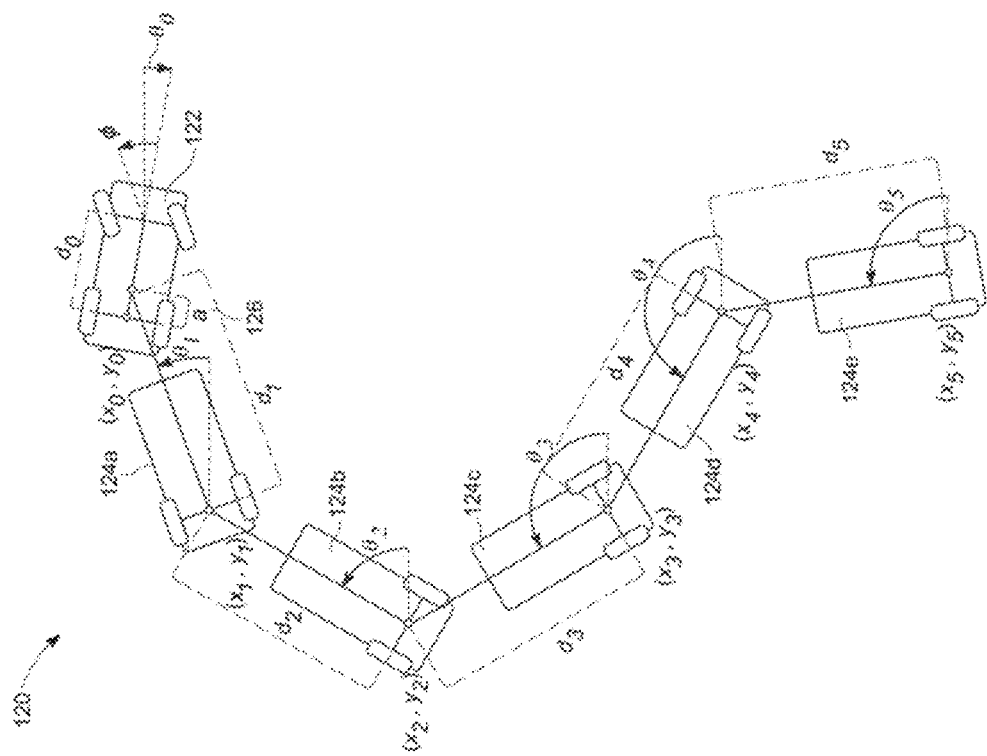
FIG. 1B shows an articulated vehicle with multiple trailers, according to some embodiments of the present disclosure.

Referring to FIG. 1B, there is shown an articulated vehicle 120 with multiple trailers, in accordance with some embodiments of the present disclosure. It may be noted that the articulated vehicle 120 comprises a tractor 122 and multiple trailers (depicted as trailers, 124a, 124b, 124c, 124d, and 124e, and collectively referred to as trailers 124). In this regard, a first trailer 124a from the multiple trailers 124 may be connected to the tractor 122. In an example, the trailers 124 may not have any active steering wheel. Therefore, motion and orientation of the trailers 124 may be controlled by the tractor 122. The articulated vehicle 120, i.e., the tractor 122 and the trailers 124 may have to perform a docking maneuver for docking the articulated vehicle 120 in a docking bay.

In accordance with an example, a configuration of the articulated vehicle 120 may be defined as $q=(x_0, y_0, \theta_0, \theta_1, \ldots, \theta_n) \in R^2 \times (S^1)^{n+1} = C$. It may be noted that in other implementations, other parameters may be used for defining the configuration of the articulated vehicle 120. For example, the configuration of the articulated vehicle 120 may be defined using relative heading angles of the trailers 124. In an example, a relative angle between the first trailer 124a and the tractor 122 may be defined as a hitching offset, $\alpha$, 126. For example, the hitching offset 126 may be non-zero ($\alpha \neq 0$), indicating generalized trailer configuration of the first trailer 124a with respect to the tractor 122. In certain cases, the hitching offset 126 may be zero ($\alpha = 0$), indicating standard trailer configuration of the first trailer 124a with respect to the tractor 122. The standard trailer configuration may be a subset of the generalized trailer configuration.

It may be noted that such configuration of the trailers 124 and the tractor 122 is only exemplary and should not be construed as a limitation. In other embodiments of the present disclosure, the articulated vehicle 120 may include multiple trailers connected in series, a single trailer, and so forth.

Referring back to FIG. 1A, the system 100 comprises the motion planner 102 connected to the predictive controller 104 and the control system 106, for example, via a state estimator 108. In an example, the predictive controller 104 is a non-linear model predictive controller (NMPC) configured with a vehicle model 110. The vehicle model 110 may include a set of differential or difference equations representing how the state of the articulated vehicle 120 and measured output 103 of the control system 106 changeover time. In an example, the set of differential or difference equations may represent the changes of the state of the articulated vehicle 120 and the output 103 as functions of current input 105, previous inputs and previous outputs. The vehicle model 110 may further include constraints 112 that represent physical and operational limitations of the articulated vehicle 120.

During operation, the motion planner 102 generates a reference trajectory 107 for controlling motion of the articulated vehicle 120. In this regard, the predictive controller 104 receives the reference trajectory 107 indicating a desired behavior of the control system 106. The reference trajectory 107 may be, for example, a desired sequence of one or more motion commands. In an example, the reference trajectory 107 may indicate a time function of a path to be travelled by the articulated vehicle 120 to perform a maneuver, such as the docking maneuver. For example, the motion planner 102 may generate a path based on, for example, a graph structure. Further, time-dimension may be added to the path to generate the reference trajectory 107.

In response to receiving the reference trajectory 107, the predictive controller 104 generates a control signal (also referred to as, control input) 105 that serves as an input for the control system 106. In response to receiving the control input 105, the control system 106 updates the output 103 of the control system 106. Based on measurements of the output 103 of the control system 106 and knowledge of the control input 105, the state estimator 108 may update an estimated state 109 of the control system 106. The estimated state 109 of the control system 106 provides state feedback to the predictive controller 104. For example, the predictive controller 104 tracks motion of the articulated vehicle 120 to ensure that the articulated vehicle 120 is travelling along the reference trajectory 107, using the estimated state 109 of the control system 106.

The control system 106 may be any machine or device controlled by certain manipulation control input 105. In an example, the control input 105 may be associated with physical quantities, such as voltage, pressure, force, torque, and so forth. For example, the control input 105 may indicate control values of, for example, steering angle, acceleration, driving speed, etc. for controlling the articulated vehicle 120.

The control system 106 may be configured to generate controlled output signals 103 (also referred to as, output 103). For example, the output 103 may also be associated with physical quantities, such as current, flow, velocity, positions indicative of a transition of a state of the articulated vehicle 120 from a previous state to a current state, and so forth. In an example, the output 103 may be associated in part with previous output values of the control system 106, and in part with previous and current input values. The dependency on previous inputs and previous outputs may be encoded within the state of the control system 106. During operation of the control system 106, for example, the control system 106 may generate the output 103 indicative of change in state of the articulated vehicle 120, for example, change in precise location, orientation, or settings of the articulated vehicle 120 being controlled, based on movement of the articulated vehicle 120 from one state to another while following the reference trajectory 107. In an example, the control input 105 may also be provided to actuators of the articulated vehicle 120 in order to move the articulated vehicle 120 in automated manner based on the reference trajectory 107. The output 103 may include a sequence of output values generated by the control system 106 following the application of certain input values.

The vehicle model 110 may be used by the control system 106. The vehicle model 110 may include a set of mathematical equations that describe how the output 103 of the control system 106 may change over time, as functions of current inputs, previous inputs, and previous outputs. The state of the control system 106 may correspond to any set of information, such as time varying information. For example, the state of the control system 106 may be a subset of current and previous inputs and outputs that, together with the vehicle model 110 of the control system 106 and future inputs, may uniquely define a motion of the articulated vehicle 120 or output 103 of the control system 106.

The control system 106 may be subjected to physical limitations and specific constraints 112. The constraints 112 may be applied to limit a range of the output 103, the input 105, and possibly certain or all states of the control system 106, in which the control system 106 is allowed to operate. In an example, the constraints 112 may correspond to driving speed limit, physical area limit associated with an environment, etc.

The predictive controller 104 may be implemented in hardware or as software program executed in a processor, for example, a microprocessor. The predictive controller 104 may receive the estimated state 109 of the control system 106, at fixed or variable control sampling time intervals. In an example, the estimated state 109 may indicate future motion of the articulated vehicle 120 based on the current and previous inputs and current and previous outputs of the control system 106. Based on the control input 105 provided by the predictive controller 104, the actuators of the articulated vehicle 120 may be controlled to move the articulated vehicle 120. The actuators may be controlled to cause the articulated vehicle 120 to travel on the reference trajectory 107. Such control of articulated vehicle 120 based on the control input 105 may cause a change in a state of the articulated vehicle 120. Subsequently, determining the estimated state 109 based on the output 103 of the control system 106 enables the predictive controller 104 to monitor and track the motion or movement of the articulated vehicle 120.

The predictive controller 104 may receive the estimated state 109 and the desired reference trajectory 107. Further, the predictive controller 104 may be configured to determine, using the received information, the inputs, for example, the control signal or control input 105, for operating the control system 106 for controlling movement of the articulated vehicle 120. The predictive controller 104 may also track the movement of the articulated vehicle 120 based on the estimated state 109 and the reference trajectory 107.

The motion planner 102 may be implemented in hardware or as a software program executed in a processor. Such processor may be either the same or a different processor from the predictive controller 104. The motion planner 102 is configured to receive the estimated state 109 of the control system 106 and a desired target state 101, at fixed or variable control time sampling intervals. The motion planner 102 is configured to determine, using the received information, the reference trajectory 107 for the predictive controller 104. In an example, the reference trajectory 107 may be updated based on change in the estimated state 109.

The state estimator 108 may be implemented in hardware or as a software program executed in a processor. Such processor may be either the same or a different processor from the predictive controller 104 or the motion planner 102. The state estimator 108 may be configured to receive the output 103 of the control system 106, at fixed or variable control time sampling intervals. Further, the state estimator 108 may determine, using the new and the previous output measurements, the estimated state 109 of the control system 106. In this manner, the reference trajectory 107 generated by the motion planner 102 may be updated, based on the estimated state 109 of the control system 106 and control signals or control input 105 generated by the predictive controller 104. The updated reference trajectory may optimize operation of a task, such as a maneuver, by the articulated vehicle 120.

In an example, the state estimator 108 may be deterministic, or may propagate stochastic estimated state 109 of the control system 106 as moments of a probabilistic distribution or particles representing the distribution, conditioned on the received output 103 subject to a stochastic measurement model. For example, the state estimator 108 may be based on linear Kalman filtering framework, nonlinear Kalman filtering framework, and particle filtering framework.

Pursuant to embodiments of the present disclosure, the system 100 may be configured to optimize a path and the reference trajectory 107 generated by the motion planner 102 to minimize tracking errors, including an integral tracking error. Some embodiments are based on the realization that path tracking and control with forward and backward motions, i.e., due to presence of motion cusps, is challenging as any modeling error is greatly amplified through a chain of unstable systems in non-linear MPC (NMPC). In particular, the path tracking and control is challenging for special paths, for example, corresponding to docking maneuver, having motion primitives, such as linear segments and circular trajectories.

Figure 1C:
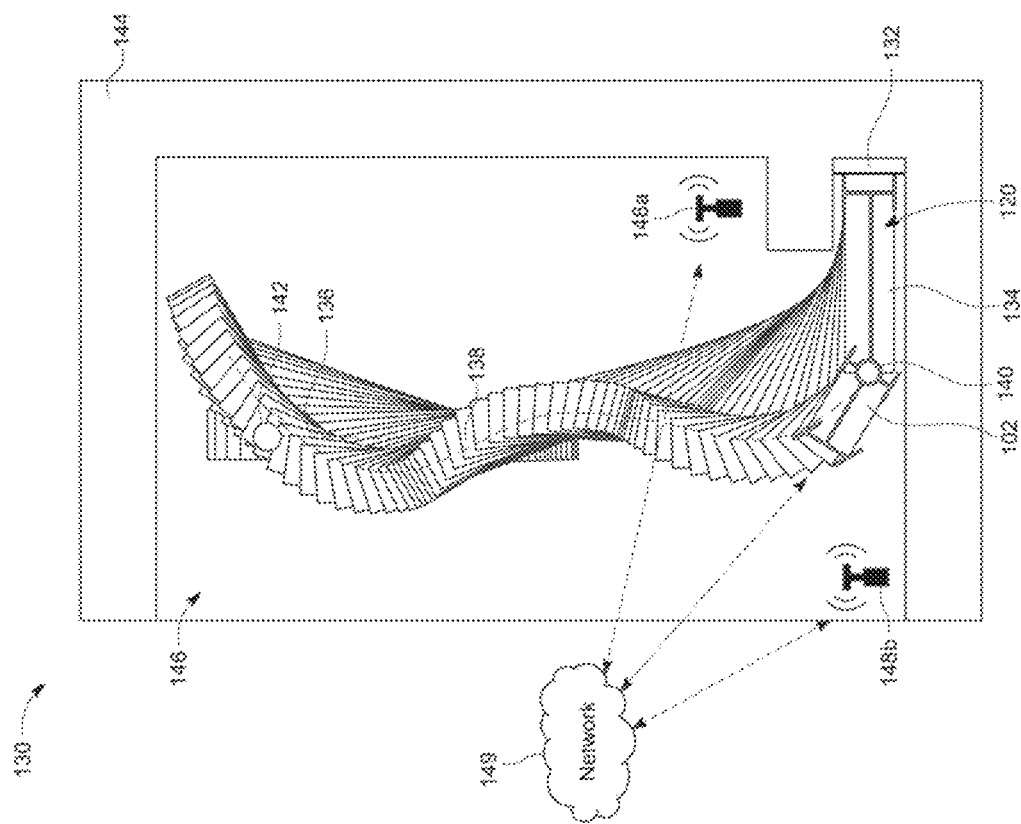
FIG. 1C shows an example automated docking maneuver, according to some embodiments of the present disclosure.

FIG. 1C shows an example automated docking maneuver 130, in accordance with some embodiments of the present disclosure. For example, the articulated vehicle 120 may have to perform the docking maneuver 130 to dock a rear side of the articulated vehicle 120 in a docking bay 132. For example, the rear side may correspond to a rear side of a trailer 134, and the rear side of the trailer 134 may be docked in the docking bay 132. To this end, the docking maneuver 130 may include a sequence of motions comprising one or more forward motions 136 and one or more backward motions 138 in order to reach a target goal configuration 140 (referred to as, a goal state 140 or a target state 140, hereinafter) in front of the docking bay. To reach the target state 140, the articulated vehicle 120 may start from an initial state or configuration 142 (referred to as, an initial state 142, hereinafter). The docking maneuver 130 is to be performed without causing any collisions between the articulated vehicle 120 and any obstacle 144 within an environment 146 of the articulated vehicle 120. Pursuant to present example docking maneuver 130, the obstacle free environment 146 is different from a free subset of the articulated vehicle 120 configuration, $C_{free}$, as rotation of the articulated vehicle 120 may change based on a collision with the obstacle 144.

As described above, unlike typical automated driving on highways or urban environments, the docking maneuver 130 is more lenient to path tracking errors when the articulated vehicle 120 is far from the target state 140 near the docking bay 132. However, the docking maneuver 130 is very stringent in both lateral position and heading error requirements in a neighborhood of a docking point in the docking bay 132. This may prevent damage to the docking mechanism and to successfully maneuver the trailer 134 into the docking bay 132.

According to some embodiments of the present disclosure, the automated docking maneuver 130 is to be executed based on a reference trajectory 107. The reference trajectory 107 may be computed by the motion planner 102. For example, the reference trajectory 107 may include a forward motion 136, followed by a reverse motion 138. Some embodiments of the disclosure are based on the realization that the position and the heading errors with respect to the reference trajectory 107 need to be sufficiently small in a terminal phase. i.e., towards the end of the reference trajectory 107 when the docking bay 132 is close, to allow for a successful docking of the trailer 134 to the docking bay 132.

According to some embodiments, a set of vehicle configurations or vehicle poses of the articulated vehicle 120 are defined as $q \in C$, where $C_{free} \subseteq C$ denotes a set of collision-free configurations for the articulated vehicle 120. To this end, there are certain requirements or constraints for performing the automated docking maneuver 130. In an example, a constraint for performing the automated docking maneuver 130 is that the reference trajectory 107 starting from an initial configuration q(0) of the articulated vehicle 120 to a docking configuration $q(t_f)$ of the articulated vehicle 120 at a terminal time $t_f$, is to be computed online and in real-time or near real-time, such that the reference trajectory 107 is kinematically feasible while avoiding collisions between the articulated vehicle 120 and any static obstacles, such as the obstacle 144. In an example, for a successful docking maneuver 130 and to ensure the safety of the docking mechanism, a lateral position error $|e_n^y(t_f)|=|y_n^{ref}(t_f)-y_n(t_f)|$ should be less than 0.1 meters (m) for a last trailer (trailer number n) and a heading error $|e_i^\theta(t_f)=\theta_i^{ref}(t_f)-\theta_i(t_f)|$ should be less than 0.1° (degrees) for all trailers (i=0, . . . , n) with respect to a preferred docking configuration $q^{ref}=(x_0^{ref}, y_0^{ref}, \theta_0^{ref}, \theta_1^{ref}, \ldots, \theta_n^{ref}) \in R^2 \times (S^1)^{n+1}=C$. Moreover, the lateral position error and the heading error are required to be in a set where $C_f \subseteq C_{free}$ around a docking configuration of $q^{ref}(t_f) \in C_f$. Further, the constraint for automated docking maneuver 130 may include that if a dynamic obstacle enters a safety set around a current or predicted positions of the articulated vehicle 120, such as within the environment 146, the real-time trajectory maneuvering and tracking is interrupted by an emergency braking system. Further, the real-time trajectory maneuvering and tracking is resumed when the dynamic obstacle moves away or out of the environment 146.

In addition, the control system 106 for controlling the articulated vehicle 120 operation for automated docking maneuver 130 needs to run on an automotive grade embedded system platform and meet the real-time requirements or constraints. In particular, the motion planner 102 may have to execute motion planning at standstill and compute the reference trajectory 107 within a maximum computation time of 2-5 seconds. Further, the predictive controller 104 may have to execute trajectory tracking continuously while the articulated vehicle 120 is moving with a sampling time of $T_s = 50$ milliseconds (ms).

In an example, the system 100 may control the articulated vehicle 120 operations for performing the docking maneuver 130 under an assumption of normal driving conditions, i.e., not at-the-limit maneuvers. Subsequently, the vehicle model 110 may be based on a single-track model in which two wheels on each axle of the articulated vehicle 120 are lumped together. Further, if the articulated vehicle 120 is equipped with multiple rear axles, the multiple axles may be lumped together resulting in a model with only two wheels, one at the front and one at the rear of the tractor 122. Although the vehicle model 110 based on force-torque balances, i.e., dynamic model may be more accurate than a kinematic model, the difference is small when the system moves slowly. This is typically the case for the docking maneuver 130, and the resulting small modeling errors can be handled by feedback nature of the predictive controller 106.

In this regard, conditions set for the system 100 to determine vehicle model operations or motion commands for the articulated vehicle 120 may be denoted as:

$$\left. \begin{array}{l} \dot{x}_0 = \cos(\theta_0)u_1, \\ \dot{y}_0 = \sin(\theta_0)u_1, \\ \dot{\phi} = u_2, \\ \dot{\theta}_0 = \dfrac{1}{d_0}\tan(\phi)u_1, \\ \dot{\theta}_i = \dfrac{1}{d_i}\left(\prod_{j=1}^{i-1} \cos(\theta_{j-1} - \theta_j)\right)\sin(\theta_{i-1} - \theta_i)u_1 \end{array} \right\} \quad (1)$$

wherein $(x_0, y_0)$ are the longitudinal-lateral positions, respectively, of the tractor 122 towing the trailers 124 or 134; $\theta_0$, is a heading angle and $\dot{\theta}_0$ is a heading rate. Further, $u_1$, denotes a longitudinal velocity of the articulated vehicle 120; $\phi$ is front wheel steering angle. Moreover, $d_0$ is a wheelbase of the tractor 122 towing the trailers 124 or 134; and $d_i$ is the wheelbase of the ith trailer.

In some embodiments of the present disclosure, state of the articulated vehicle 120 may also be used with the vehicle configuration or pose in the vehicle model 110. The state of the articulated vehicle 120 may indicate, for example, a velocity, integral tracking errors, and steering angle rates, of the articulated vehicle 120. The state of articulated vehicle 120 may be denoted as: X, and time derivative of the state of the articulated vehicle 120 tracked by the predictive controller 104 may be denoted as: {x}. The state of the articulated vehicle 120 may be defined based on its corresponding configuration, such as initial state 142 may correspond to the initial configuration q(0) of the articulated vehicle 120, and the target state 140 may correspond to the target docking configuration $q(t_f)$.

In an example, the motion planner 102 is a based on A-search guided tree (AGT) graph. For example, an AGT graph comprises multiple nodes defining states and/or configurations of the articulated vehicle 120 over a prediction horizon. The multiple nodes of the AGT graph comprises an initial node defining the target state 140 of the articulated vehicle 120 and a target node defining the initial state 142 of the articulated vehicle 120. Pursuant to an example embodiment of present disclosure, the motion planner 102 may generate or construct the AGT graph having multiple nodes indicating a corresponding state vector indicating, for example, but not limited to, velocities, configuration or pose, disturbances, and integral tracking errors. In an example, transitions between the nodes in the AGT graph are done based on zero-velocity boundary conditions. Subsequently, each pair of nodes in the AGT graph is connected with an edge defined by one or a combination of collision-free motion primitives as boundary conditions for moving the articulated vehicle 120 between the states of the connected nodes. The multiple nodes connected through the corresponding edges form a path or the reference trajectory 107 through the AGT graph connecting the initial node with the target node by a sequence of motion primitives for moving the articulated vehicle 120 from the initial state 142 to the target state 140.

Continuing further, one or more road-side units (RSUs) or infrastructure sensing devices (depicts as RSUs 148a and 148b) may be used for accurate execution of the automated docking maneuver 130, based on accurate sensing of a current state, the initial state 142, the target state 140, as well as a current environment 146 of the articulated vehicle 120 and the system 100. For example, the RSUs 148a and 148b may include one or more sensors, for example, distance range finders, radars, LIDARs, and/or cameras, as well as sensor fusion technologies in order to accurately detect the state of the articulated vehicle 120 and geometry of the environment 146 around the articulated vehicle 120.

In some embodiments of the present disclosure, the computations of sensor fusion technologies may be executed either in the cloud or in one or more mobile edge computers (MECs), which may be either embedded as a part of the RSUs 148a and 148b or they may be separate devices that are connected to the RSUs 148a and 148b. In some embodiments of the present disclosure, a communication network 149 may be used for real-time communication between the articulated vehicle 120, the RSUs 148a and 148b, and the system 100.

Figure 1D:
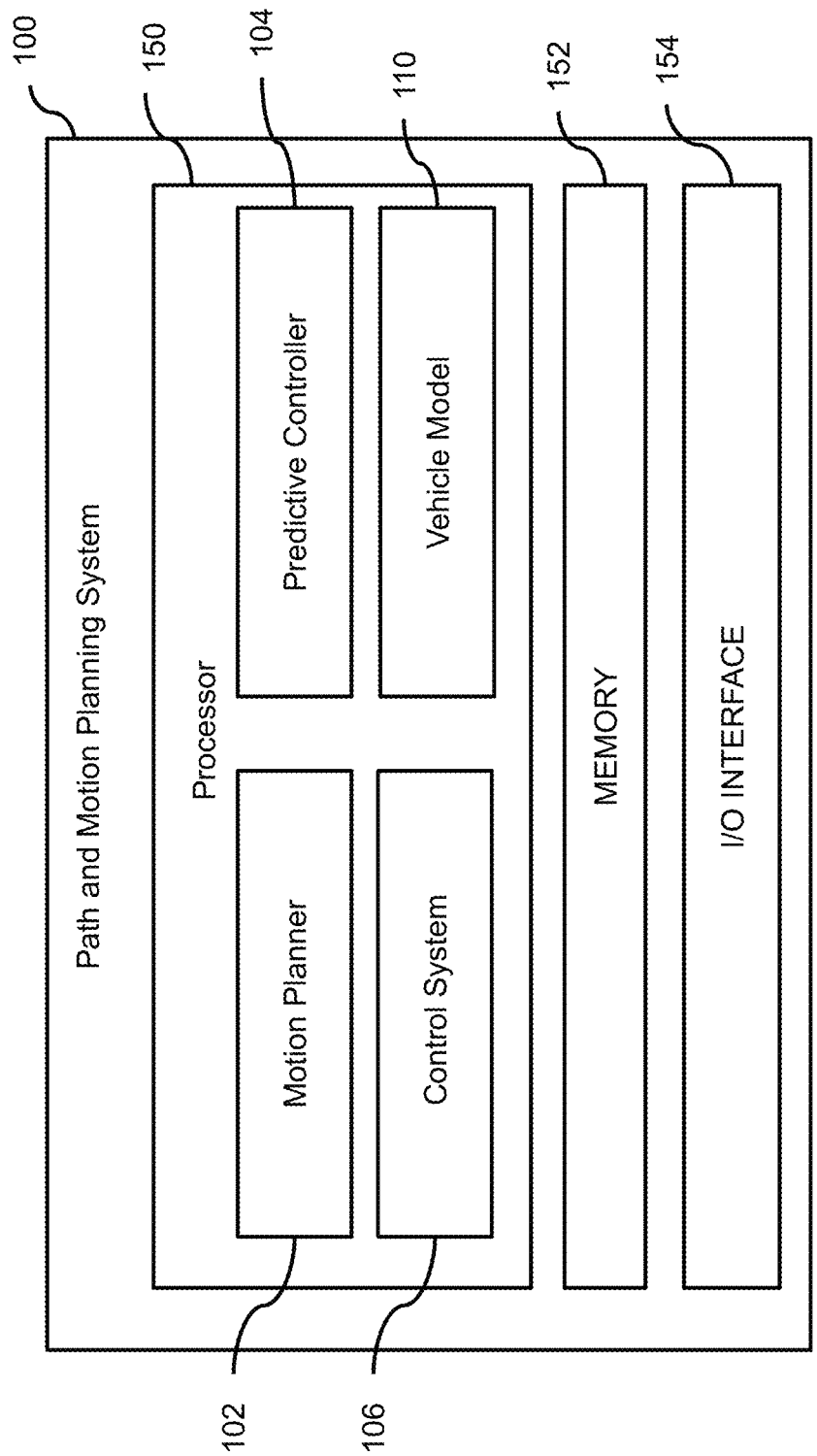
FIG. 1D shows a block diagram of a system that may be used for controlling motion of an articulated vehicle, according to some embodiments of the present disclosure.

FIG. 1D illustrates a block diagram of the system 100, exemplarily illustrated in FIG. 1A that may be used for controlling motion of the articulated vehicle 120, in accordance with an example embodiment. FIG. 1D is explained in conjunction with FIG. 1A.

The system 100 may include at least one processor 150, a memory 152, and an I/O interface 154. The memory 152 may include modules, depicted as the motion planner 102, the predictive controller 104, the control system 106, and the vehicle model 110. In accordance with an embodiment, the system 100 may store data that be generated by the processor 150 and/or other modules, such as the motion planner 102, the predictive controller 104, the control system 106, and the vehicle model 110, while performing corresponding operation or may be retrieved from a database associated with the system 100. In an example, the data may include articulated vehicle 120 information, reference trajectory 107, control input 105, control output 103, estimated state 109, navigation instructions, and so forth.

The processor 150 may retrieve computer executable instructions that may be stored in the memory 152 for execution of the computer executable instructions. The memory 152 may store the computer executable instruction, that when implemented, performs operation associated with the motion planner 102, the predictive controller 104, the control system 106 and the vehicle model 110. The memory 152 may also store current state, current configuration, target state, target configuration and predicted reference trajectory 107 of the articulated vehicle 100.

The processor 150 may be embodied in a number of different ways. For example, the processor 150 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 150 may include one or more processing cores configured to perform independently. A multi-core processor may enable multiprocessing within a single physical package. Additionally or alternatively, the processor 150 may include one or more processors configured in tandem via the bus to enable independent execution of instructions, pipelining and/or multithreading. Additionally or alternatively, the processor 150 may include one or more processors capable of processing large volumes of workloads and operations to provide support for big data analysis. In an example embodiment, the processor 150 may be in communication with the memory 152 via a bus for passing information among components of the system 100.

The memory 152 may be non-transitory and may include, for example, one or more volatile and/or non-volatile memories. In other words, for example, the memory 152 may be an electronic storage device (for example, a computer readable storage medium) comprising gates configured to store data (for example, bits) that may be retrievable by a machine (for example, a computing device like the processor 150). The memory 152 may be configured to store information, data, content, applications, instructions, or the like, for enabling the system 100 to conduct various functions in accordance with an example embodiment of the present disclosure. For example, the memory 152 may be configured to buffer input data for processing by the processor 150. As exemplarily illustrated in FIG. 1D, the memory 152 may be configured to store instructions for execution by the processor 150. As such, the memory 152 may store the motion planner 102, the predictive controller 104, the control system 106, and the vehicle model 110. It may be noted that the memory 152 may also store other instructions that when executed performs other operations associated with the components of the system 100, such as the state estimator, the constraints, and so forth.

It may be noted that whether configured by hardware or software methods, or by a combination thereof, the processor 150 may represent an entity (for example, physically embodied in circuitry) capable of performing operations according to an embodiment of the present disclosure while configured accordingly. Thus, for example, when the processor 150 is embodied as an ASIC, FPGA or the like, the processor 150 may be specifically configured hardware for conducting the operations described herein.

Alternatively, as another example, when the processor 150 is embodied as an executor of software instructions, the instructions may specifically configure the processor 150 to perform the algorithms and/or operations described herein when the instructions are executed. However, in some cases, the processor 150 may be a processor specific device (for example, a mobile terminal or a fixed computing device) configured to employ an embodiment of the present disclosure by further configuration of the processor 150 by instructions for performing the algorithms and/or operations described herein. The processor 150 may include, among other things, a clock, an arithmetic logic unit (ALU) and logic gates configured to support operation of the processor 150. The network environment, such as, 130 may be accessed using the I/O interface 154 of the system 100. The I/O interface 154 may provide an interface for accessing various features and data stored in the system 100.

The processor 152 of the system 100 may be configured to determine a motion path for the articulated vehicle 120 based on a feedback signal. Further, the processor 152 may optimize the motion path over the prediction horizon based on solving an optimal control problem (OCP). After solving the OCP, the processor 152 may generate an optimized motion path and an optimized reference trajectory having reduced number of integral tracking errors and motion cusps. Based on the optimized reference trajectory, the processor 152 may generate a control command for the articulated vehicle 120. Based on the control command, the articulated vehicle 120 may be controlled to perform the docking maneuver 130.

The memory 152 of the system 100 may be configured to store a dataset (such as, but not limited to, state and configuration data associated with the articulated vehicle 120, target state, initial and/or current state, sensor data, reference trajectory, optimized reference trajectory, predefined motion cusp threshold, predefined initial tracking error threshold, optimal control problem, and map data) associated with the articulated vehicle 120. In accordance with an embodiment, the memory 152 may include processing instructions for processing stored data. The dataset may include real-time data and historical data, relating to the articulated vehicle 120 and/or the docking maneuver 1330.

In some example embodiments, the I/O interface 154 may communicate with the system 100 and displays input and/or output of the system 100. As such, the I/O interface 154 may include a display and, in some embodiments, may also include a keyboard, a mouse, a joystick, a touch screen, touch areas, soft keys, one or more microphones, a plurality of speakers, or other input/output mechanisms. In one embodiment, the system 100 may comprise user interface circuitry configured to control at least some functions of one or more I/O interface elements such as a display and, in some embodiments, a plurality of speakers, a ringer, one or more microphones and/or the like. The processor 150 and/or I/O interface 154 circuitry comprising the processor 150 may be configured to control one or more functions of one or more I/O interface 154 elements through computer program instructions (for example, software and/or firmware) stored on the memory 152 accessible to the processor 150. The processor 150 may further render notification associated with the articulated vehicle 120 and/or the docking maneuver 130, such as gear changes, ETA, warning, etc., on the user equipment or audio or display onboard the articulated vehicle 120 via the I/O interface 154.

In some embodiments, the processor 150 may be configured to provide Internet-of-Things (IoT) related capabilities to users of the system 100 disclosed herein. The IoT related capabilities may in turn be used to provide smart city solutions by providing real time warnings, big data analysis, and sensor-based data collection by using the cloud-based mapping system for providing accurate navigation instructions and ensuring driver safety. The I/O interface 154 may provide an interface for accessing various features and data stored in the system 100.

In operation, the processor 150 may collect a feedback signal. In an example, the motion planner 102 may collect the feedback signal indicative of a state of the articulated vehicle 120. For example, the feedback signal may indicate a current state of the articulated vehicle 120. Pursuant to the docking maneuver 130, the current state of the articulated vehicle 120 may correspond to the initial state 142 during starting of the docking maneuver 130. In an example, such feedback signal may be obtained from the control system 106 and/or the predictive controller 104 tracking the motion of the articulated vehicle 120.

Further, the processor 150 may determine the motion path for the articulated vehicle 120. In an example, the motion planner 102 may determine the motion path for the articulated vehicle 120 based on the feedback signal. The motion path comprises one or more forward motions of the articulated vehicle 120 and one or more backward motions of the articulated vehicle 120. For example, the motion path having time dimensions may be the reference trajectory 107 for performing the docking maneuver 130. In an example, the motion path may be a dynamically feasible and collision-free path. However, due to several motion cusps caused by switching between successive forward-backward-forward motions, control of the articulated vehicle 120 while performing the docking maneuver 130 may be affected. Specifically, due to the backward motions in the motions cusps, impact of modeling error may be greatly amplified resulting in failure in controlling and tracking the articulated vehicle 120 accurately during such docking maneuver 130.

To overcome the previously mentioned problems, the predictive controller 104 may be configured to track the motion path or the reference trajectory generated by the motion planner 102 such that the reference trajectory considers modeling errors in backward motions and allows to perform complex docking maneuver 130 reliably. In this regard, the processor 150 may generate an optimal control problem (OCP) for optimizing the motion path. For example, the predictive controller 104 may generate the OCP for optimizing the motion path, such that the optimized motion path is tracked. The optimal control problem may include, for example, an integral tracking error function relating to the motion path. For example, the integral tracking error function may be a quadratic objective function indicating at least an integral tracking error based on the one or more motion cusps present in the motion path or the reference trajectory over a prediction horizon of length N. As may be understood, the one or more motion cusps indicate a switching between a forward motion and a backward motion in the motion path. In an example, the predictive controller 104 may be implemented by a non-linear model predictive controller with integral action (iNMPC), where the integral tracking error function is introduced in the iNMPC prediction model.

Further, the processor 150 may optimize the motion path over the prediction horizon based on solving the OCP. For example, the motion planner 102 may optimize the motion path by solving the OCP. The prediction horizon may be associated with the vehicle model 110 of the articulated vehicle 120 having the state. In an example, the OCP may be solved by a tailored implementation of sequential quadratic programming (SQP) known as the real-time iterations (RTI) scheme. For example, the RTI algorithm may performs a single SQP iteration per control time step, and use a continuation-based warm starting of the state and control trajectories from one time step k to the next k+1 to solve the OCP.

After solving the OCP, the motion planner 102 may generate the optimized motion path and the optimized reference trajectory having reduced number of integral tracking errors. Further, the processor 150 may generate a control command for the articulated vehicle 120. In an example, the control system 106 may generate a control command for the articulated vehicle 120 based on the optimized motion path and the vehicle model 110. The processor 150 may control the motion of the articulated vehicle 120 based on the control command. In an example, the control system 106 may control the motion of the articulated vehicle 120 based on the control command, thereby changing its state. Moreover, the predictive controller 104 may track the motion of the articulated vehicle 120 while following the optimized motion path. In this manner, the articulated vehicle 120 may be moved from the initial state 142 to the target state 140 for performing the docking maneuver.

To this end, inclusion of the integral tracking error function in the optimal control problem (such as in the iNMPC) reduces the impact of modeling errors during the path and motion tracking of the articulated vehicle 120. Moreover, steering angle bias and tracking error are significantly smaller when using the iNMPC in forward direction. As a result, reliable and efficient path and motion tracking may be performed during backward motion with the iNMPC. Particularly, the integral tracking error function used in the optimal control problem used in the iNMPC reduces the tracking errors, such as integral tracking error, both in forward motion and even more so in backward motion. In particular, the iNMPC is effective in dealing with the steering angle bias, hitching offsets, and other considered modeling errors. Further, trailer terminal error is significantly reduced by including the integral tracking error function, thereby enable precise and reliable terminal lateral tracking during docking maneuvers.

Figure 1E:
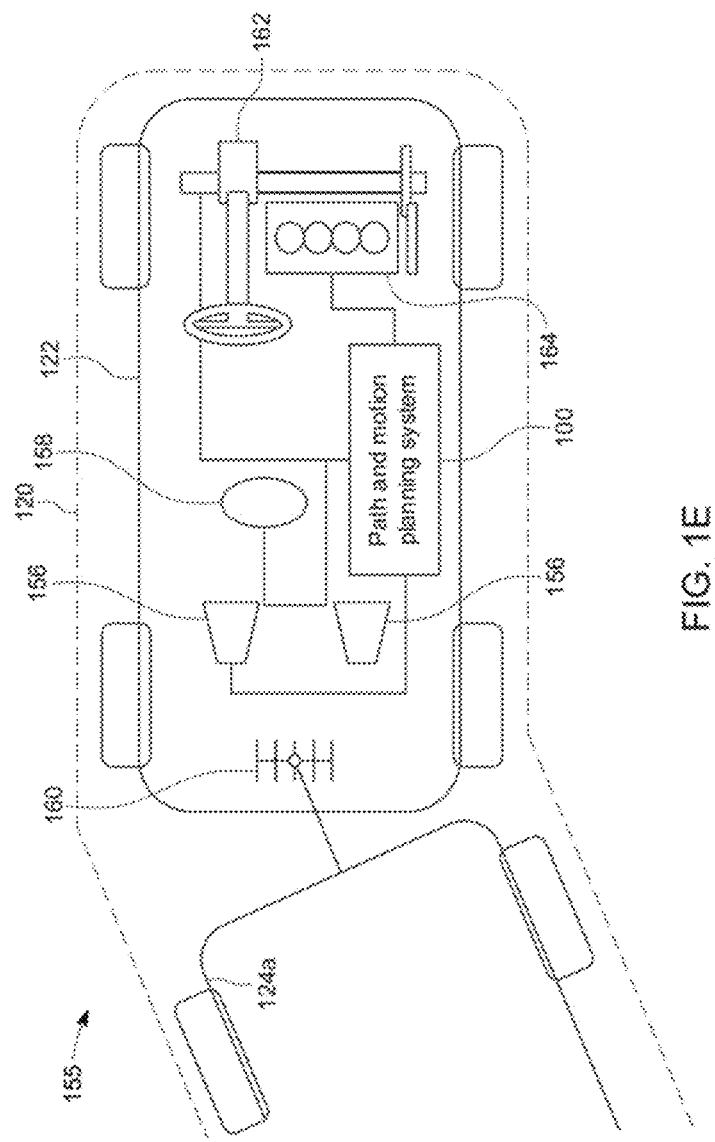
FIG. 1E shows a schematic of a vehicle connected to trailers forming an articulated vehicle, according to some embodiments of the present disclosure.

FIG. 1E shows a schematic 155 of a vehicle connected to trailers forming the articulated vehicle 120, in accordance with some embodiments of the present disclosure. Pursuant to the present example, the vehicle may be tractor 122 and the trailers may be the trailers 124 or the trailer 134. The articulated vehicle 120 may include or may be connected to the system 100. It may be noted that the illustration of the articulated vehicle 120 as tractor-trailer is only exemplary and should not be construed as a limitation. In other embodiments of the present disclosure, examples of the articulated vehicle 120 may include, but is not limited to, passenger cars-trailer, heavy-duty vehicles, tractor-trailer, buses, and rovers. Further, techniques for performing automated docking maneuver 130 disclosed in the present disclosure is not limited to articulated vehicles and may be applied to any autonomous or semi-autonomous vehicle, such as cars, buses, trucks, and so forth.

In accordance with some embodiments of the present disclosure, techniques for controlling movement of the tractor 122 are disclosed. Examples of such movement may include, but are not limited to, lateral motion of the tractor 122 controlled by a steering system 162. In one embodiment, the steering system 162 is controlled by the system 100.

The tractor 122 may include an engine 164, which may be controlled by the system 100 or by other components of the tractor 122. The tractor 122 may also include one or more sensors 156 to sense the surrounding environment 146. Examples of the sensors 156 may include, but are not limited to, distance range finders, radars, LIDARs, and cameras. The tractor 122 may also include one or more sensors 158 to sense current motion quantities and internal status of the tractor 122. Examples of the sensors 158 may include, but are not limited to, global positioning system (GPS), accelerometers, inertial measurement units, gyroscopes, shaft rotational sensors, torque sensors, deflection sensors, pressure sensors, and flow sensors. The sensors 156 and 158 may provide information to the system 100. The tractor 122 may be equipped with a transceiver 160 enabling communication capabilities of the system 100 through wired or wireless communication channels.

For example, the system 100 may control operation or movement of the tractor 122. In this regard, the system 100 may generate the reference trajectory 107 for movement of the tractor 122 for completing a task. Further, the system 100 may generate motion commands for the tractor 122 based on the reference trajectory 107 to be followed. Further, the system 100 may control components, such as the steering system 162 of the tractor 122 to configure the tractor 122 to perform the task. In an example, the task may be the docking maneuver 130, wherein the motion commands may include a sequence of forward and reverse motions.

Figure 1F:
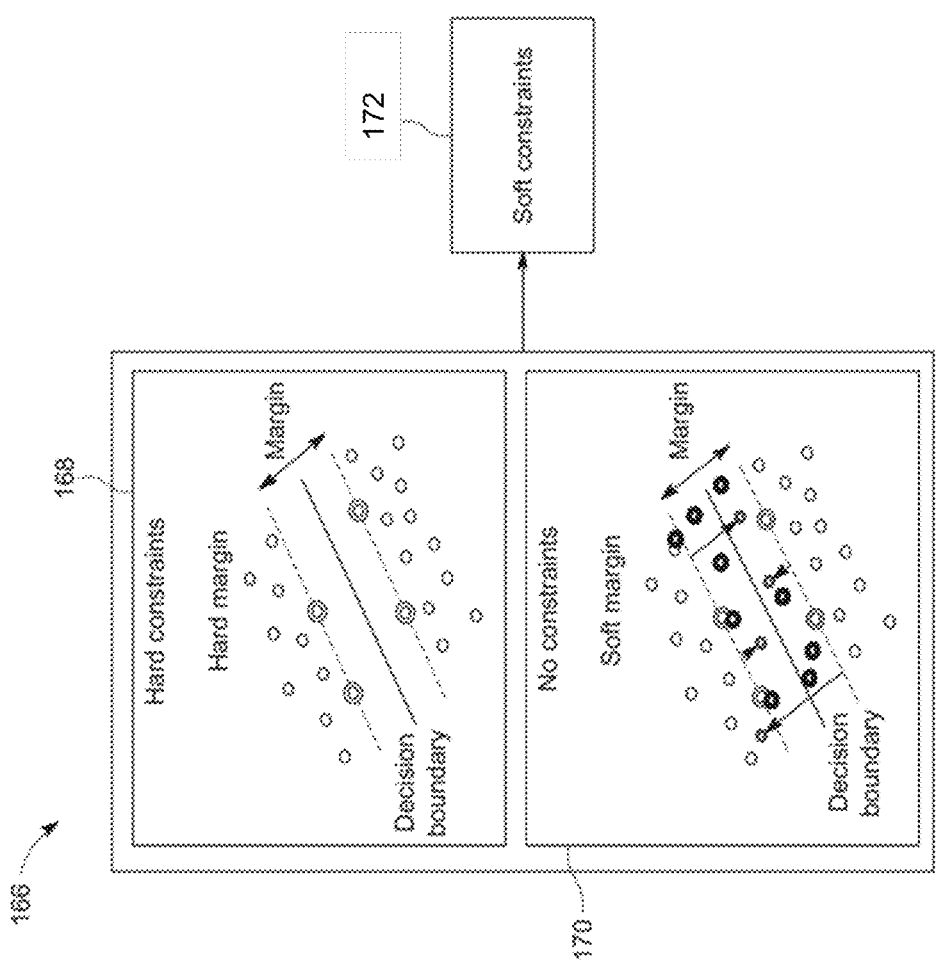
FIG. 1F shows the distinction between hard and soft constraints employed in the optimization-based motion planning and control, according to some embodiments of the present disclosure.

FIG. 1F shows an example graphic 166 depicting no constraints, hard constraints, and soft constraints as related to the motion primitives for motion planning, in accordance with some embodiments. It may be noted that vehicle path planning plays a key role in vehicle navigation systems. To this end, path and motion planning is an essential task for autonomous vehicles navigation. In particular, map data and sensor-based data form a basis for generating a trajectory, such as the reference trajectory 107 that serves as a target value to be tracked by the predictive controller 104. Besides comfort aspects, kinematic feasibility and possible collisions are considered when generating the reference trajectory 107.

During path planning and trajectory generation, constrained optimization may have to be performed. To this end, vehicle motion must be planned and regulated to accomplish driving tasks and while respecting constraints introduced by a selected vehicle model. In an example, a motion planning layer is responsible for computing a safe, comfortable, and dynamically feasible trajectory based on a vehicle's current configuration and a current state, and a goal configuration and a target state. Depending on context, the goal configuration may differ. For example, for the docking maneuver 130, a goal location may be the docking bay 132, such that a rear end of a last trailer 124e or 134 of the articulated vehicle 120 is sufficiently close to the docking bay 132 to facilitate on-loading or off-loading.

A path planning problem is to find a path $\sigma(\alpha): [0, 1] \rightarrow X$ in a state space of the articulated vehicle 120 (or more generally, a robot) that starts at the initial state 142 or an initial configuration of the articulated vehicle 120 and reaches the target state 140 or a goal configuration while satisfying constraints 112. The path planning problem may be solved to generate a dynamically feasible path or a trajectory. The generated trajectory must be smooth without extreme turns as a robot may have several motion constraints, such as the non-holonomic condition in under-actuated systems, which becomes more restrictive as the number of trailers 124 increases. Feasible path planning refers to a problem of determining a path that satisfies some given problem constraints (namely, hard constraints) relating to avoiding obstacles, without focusing on a quality of the solution.

While generating a feasible path ensures obstacle-free navigation, however, due to imposition of the hard constraints, the quality of the generated path may be affected. For example, the path or trajectory may have sharp turn, longer route of inferior quality, a greater number of motion cusps, and the like. As shown in FIG. 1E, the path planning problem with hard constraints 168 on motion primitives may hamper efficiency of the generated path.

To this end, not applying any constraints 112 in dynamic optimization is important as the constraints 112 reflect safety and quality limits. However, applying no constraints 170 may result in an infeasible path, without efficiently overcoming obstacles.

Therefore, optimal path planning is required. Optimal path planning refers to the problem of finding a path that optimizes some quality criterion subject to certain given constraints. The problem of finding an optimal path is difficult. Moreover, there may not be an efficient algorithm able to solve all instances of the problem while satisfying constraints 112. Therefore, soft constraints 172 may have to be imposed to generate an optimal path.

A soft constraint is a condition imposed on a trajectory generated by a solution that may have to be satisfied rather than not satisfied but is prepared to accept not satisfying it because of the cost of satisfying it, or because of conflicts with other constraints or goals. In case there are multiple soft constraints, there is a need to determine which of the various constraints should take priority if there is a conflict between soft constraints itself or if it would prove costly to satisfy them.

In accordance with present disclosure, a soft constraint 172 is imposed on one or more motion cusps in a generated path to ensure accuracy of path. The embodiments of the present disclosure describe imposing the soft constraint 172 based on integral tracking error associated with one or more motion cusps in the generated path.

A way in which the path and motion planning system 100 operates to generate a path with soft constraints associated with motion cusps is described in detail with the following figures.

Figure 2:
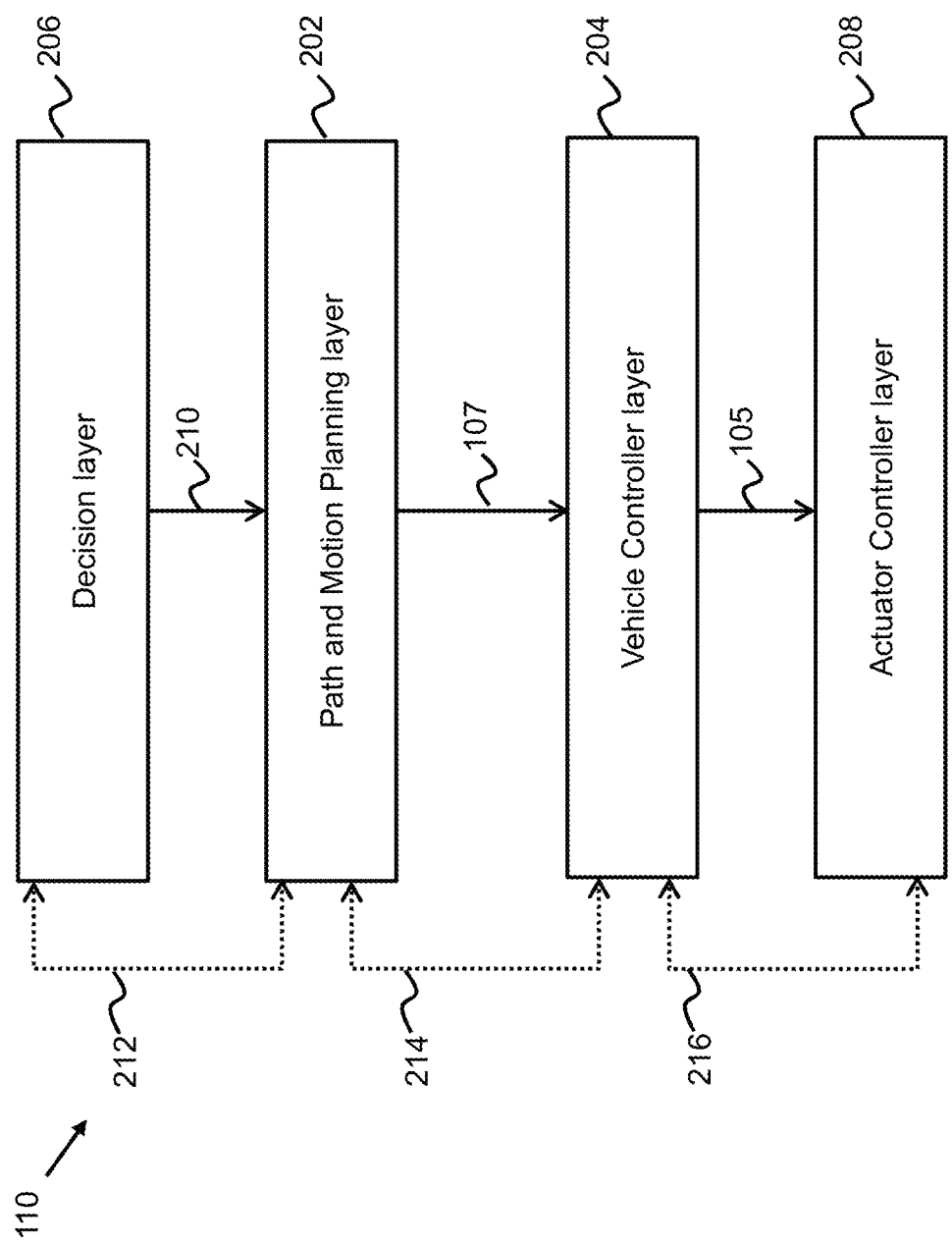
FIG. 2 shows a block diagram of a system for controlling motion of an articulated vehicle, in accordance with some embodiments of the present disclosure.

FIG. 2 shows a block diagram of the system 100 for controlling a motion of the articulated vehicle 120, in accordance with some embodiments of the present disclosure. As may be understood, autonomous and semi-autonomous vehicles are complex systems that require integration of advanced and interconnected sensing and control components. Due to complexity associated with developing software and hardware components of an autonomous vehicle and dynamic driving conditions, the autonomous controlling of a vehicle is complicated.

In accordance with an embodiment, the system 100 for controlling motion of the articulated vehicle 120 may include a path and motion planning layer 202 and a vehicle controller layer 204. For example, the path and motion planning layer 202 may be implemented by the motion planner 102 and the vehicle controller layer 204 may be implemented by the predictive controller 104.

In an example, the path and motion planning layer 202 computes the reference trajectory 107 and provides the reference trajectory 107 to the vehicle controller layer 204. Further, the vehicle controller layer 204 computes control input 105 for the control system 106 to track the reference trajectory 107. In certain cases, the control system 106 may update the reference trajectory 107 to optimize vehicle operation during the docking maneuver 130. The vehicle controller layer 204 may then execute a desired sequence of one or more motion commands.

According to some embodiments of the present disclosure, the layers of the system 100 may also include a decision layer 206 and/or an actuator controller layer 208.

In operation, a sequence of destinations, in the form of a route, may be computed through a road network by a route planner (not shown). For example, the route planner may use a map-based technology to generate the route between a source location and a target location. Such a route is then to be navigated by the articulated vehicle 120, in automated or semi-automated manner. Pursuant to present disclosure, the route may be travelled by the articulated vehicle 120 in automated manner. Moreover, the route may include a docking maneuver, a parking maneuver, etc. to reach the target location.

Given the route, the decision layer 206 may be responsible for determining one or more local driving goals (or target goals) corresponding to the target location and corresponding discrete decisions 210 for the articulated vehicle 120. Each decision from the discrete decisions 210 may be a desired sequence of one or more motion commands. Examples of the motion commands may include, but are not limited to, turn right, stay in lane, turn left, change lane, or come to full stop in a particular position. In this regard, a number of sensing and mapping modules may use information from the one or more sensors 156 and 158, such as radar, LIDAR, inertial measurement units (IMUs), camera, and/or global positioning system (GPS) information, together with prior map information, to estimate an estimated state from a current state of the articulated vehicle 120 and surrounding parts of the environment 146 that are relevant to the system 100 and the articulated vehicle 120 for a particular driving scenario. The sensing and mapping modules may be made available to one, multiple, or all the layers of the system 100.

Based on the one or more driving goals and corresponding discrete decisions 210, the path and motion planning layer 202 is responsible for determining the reference trajectory 107 that is provided to the vehicle controller layer 204. According to some embodiments of the present disclosure, the reference trajectory 107 is a safe, desirable, and dynamically feasible trajectory that the articulated vehicle 120 should follow. The reference trajectory 107 may be determined based on the outputs of the sensing and mapping module, i.e., one or more sensors, and the output 103 of the control system 106. Some embodiments are based on the realization that an important requirement for the reference trajectory 107 computed by the path and motion planning layer 202 is that the reference trajectory 107 is collision free, dynamically feasible, and possible to be tracked by the predictive controller 104 in the vehicle controller layer 204. In other words, the reference trajectory 107 achieves or reaches the one or more driving goals while avoiding any collisions with any static or dynamic objects in the environment 146 and respecting the vehicle model 110 of the control system 106 that can be represented by a set of mathematical equations.

Some embodiments of the present disclosure are based on the realization that a typical limiting factor in the path and motion planning task is the non-convex nature of constraints of a dynamic optimization problem. This results in achieving only a locally optimal solution, which may differ significantly to a globally optimal solution. In some cases, solving the optimization problem may utilize a large computational load and time, to find just a feasible solution. According to some embodiments, the path and motion planning task may be performed, for example, using sampling-based methods such as rapidly exploring random trees (RRTs), or graph-search methods such as A-star, D-star and other variations of these algorithms.

Continuing further, the vehicle controller layer 204 aims to realize the reference trajectory 107, considering the vehicle model 110 and the constraints 112, by computing a control signal or control input 105 for operating the control system 106. The control input 105 may include one or more actuation commands such as values for, for example, steering angle, wheel torque and brake force. In some embodiments of the present disclosure, the vehicle controller layer 204 provides the control input 105 to an additional layer that consists of one or more controllers in the actuator controller layer 208. The actuator controller layer 208 directly regulates the actuators to achieve a desired movement of the articulated vehicle 120.

Different embodiments of the present disclosure may use different techniques in the vehicle controller layer 204 to track the reference trajectory 107 that is computed by the path and motion planning layer 202. In some embodiments of the disclosure, a model predictive controller (MPC) is used in the vehicle controller layer 204, such that future information in the long-term reference trajectory 107 computed by the path and motion planning layer 202 can be used effectively to achieve the desired movement or operation of the articulated vehicle 120.

In some embodiments of the present disclosure, linear model predictive controller (LMPC) may be used in the vehicle controller layer 204. The LMPC may be a resultant of a linear vehicle model 110 used in combination with linear constraints 112 and a quadratic objective function, to track the reference trajectory 107 that is computed by the path and motion planning layer 202. In other embodiments of the present disclosure, one or more of the constraints 112 and/or objective functions may be non-linear and/or the vehicle model 110 equations that describe vehicle state behavior may be non-linear, resulting in a non-linear model predictive controller (NMPC) to track the reference trajectory 107 that is computed by the path and motion planning layer 202.

Some embodiments of the present disclosure are based on the realization that the path and motion planning layer 202 may compute a long-term, highly predictive motion plan, but it typically needs to run at slow sampling frequencies. In some embodiments of the present disclosure, the path and motion planning layer 202 is executed once for each desired sequence of one or more motion commands. For example, the path and motion planning layer 202 may be executed for automated docking maneuver 130 as illustrated in FIG. 1C. In some embodiments of the present disclosure, the path and motion planning layer 202 may be executed multiple times for each desired sequence of one or more motion commands for performing the automated docking maneuver 130, e.g., to allow for re-planning when the surrounding environment 146 of the articulated vehicle 120 has changed substantially.

Some embodiments of the present disclosure are based on the realization that the predictive vehicle controller layer 204 may track the reference trajectory 107 by computing the control input 105 over a short prediction horizon, while running at high sampling frequencies. For example, the vehicle controller layer 204 may use a prediction horizon of 1-10 seconds while the vehicle controller layer 204 may be executed at a sampling frequency of 10-100 times per second. The vehicle controller layer 204 may be highly reactive to local deviations due to uncertainties, for example, related to obstacles, in the surrounding environment 146 of the articulated vehicle 120, in the vehicle state estimation as well as other uncertainties in the sensing and mapping module.

In some embodiments of the present disclosure, a different vehicle model may be used in different components in the multi-layer system 100 for controlling the motion of an autonomous or semi-autonomous articulated vehicle 120. For example, a simple but computationally cheap kinematic model may be used in the path and motion planning layer 202, while a relatively accurate but computationally more expensive dynamic single- or double-track vehicle model can be used in the vehicle controller layer 204.

It may be noted that information may be shared between the different components or layers in the multi-layer system 100 for an autonomous or semi-autonomous control of the articulated vehicle 120. For example, information 212 related to the output of one or more sensors, map data, route, and the vehicle surroundings may be shared between the decision layer 206 and the path and motion planning layer 202. Further, information 214 related to the output of one or more sensors, map data, route, and the vehicle surroundings may be shared between the path and motion planning layer 202 and the vehicle controller layer 204. Further, information 216 relating to the output of one or more sensors, map data, route, and the vehicle surroundings may be shared between the vehicle controller layer 204 and the actuator controller layer 208. In addition, some embodiments of the present disclosure are based on the realization that reliability and safety in control of the articulated vehicle 120 may be improved by using diagnostic information such as, e.g., a performance metric of success and/or failure of the algorithm in one component that may be shared with components of the multi-layer system 100.

In one embodiment, a two-stage approach may be used at the path and motion planning layer 202 to construct a graph for generating a path for performing the docking maneuver 130. The graph may include a set of nodes indicating states and a set of edges. In an example, the graph may include a root node indicating target state 140 or goal configuration of the articulated vehicle 120. It may be noted that the target state 140 or the goal configuration may correspond to the docking bay 132. The graph may include multiple nodes defining states of the articulated vehicle 120 over the prediction horizon of, for example, 1-10 seconds. The multiple nodes of the graph may include an initial node defining the target state 140 of the articulated vehicle 120 and a target node defining the initial state 142 of the articulated vehicle 120. Further, each pair of nodes in the graph is connected with an edge defined by one or a combination of collision-free motion primitives moving the articulated vehicle 120 between the states of the connected nodes. Herein, any node or edge of the graph may include location and heading information of the articulated vehicle 120. The set of nodes and the set of edges may be collision-free and represent a kinematically or dynamically feasible transition between states. Moreover, the set of nodes and the set of edges may represent all states where the articulated vehicle 120 does not collide with any obstacles in the environment 146.

In an example, an AGT algorithm may be used to construct the graph. Further, the target node of the initial state 142 of the graph may be connected to the initial configuration of the articulated vehicle 120 by solving a linear quadratic regulator (LQR) steering problem. In particular, based on solving an LQR steering problem an edge that may be a solution to a steering problem is computed. For example, the steering problem may be solved numerically instead of analytically, as the considered that the articulated vehicle 120 does not admit closed form analytical solution to the steering problem in the general setting. Further, based on the edge, the target node, when being sufficiently close to the initial state 142, may be connected to the initial configuration.

The motion planner 102 is configured to generate a motion path, based on which the reference trajectory 107 is generated, based on the graph or a first path formed in the graph. In particular, the multiple nodes connected through the corresponding edges form the first path through the graph connecting the initial node with the target node by a sequence of motion primitives for moving the articulated vehicle 120 from the initial state 142 to the target state or goal state 140.

Further, the control system 106 may control the motion of the articulated vehicle 120 based on the motion path, when the motion path is formed before a termination condition is met, such as within a predefined time limit. A manner in which the motion planner 102 computes the path for controlling the movement of the articulated vehicle 120 for performing the docking maneuver 130 and/or the control system 106 optimizes the generated first path to reduce tracking error is described in detail hereinafter.

Figure 3A:
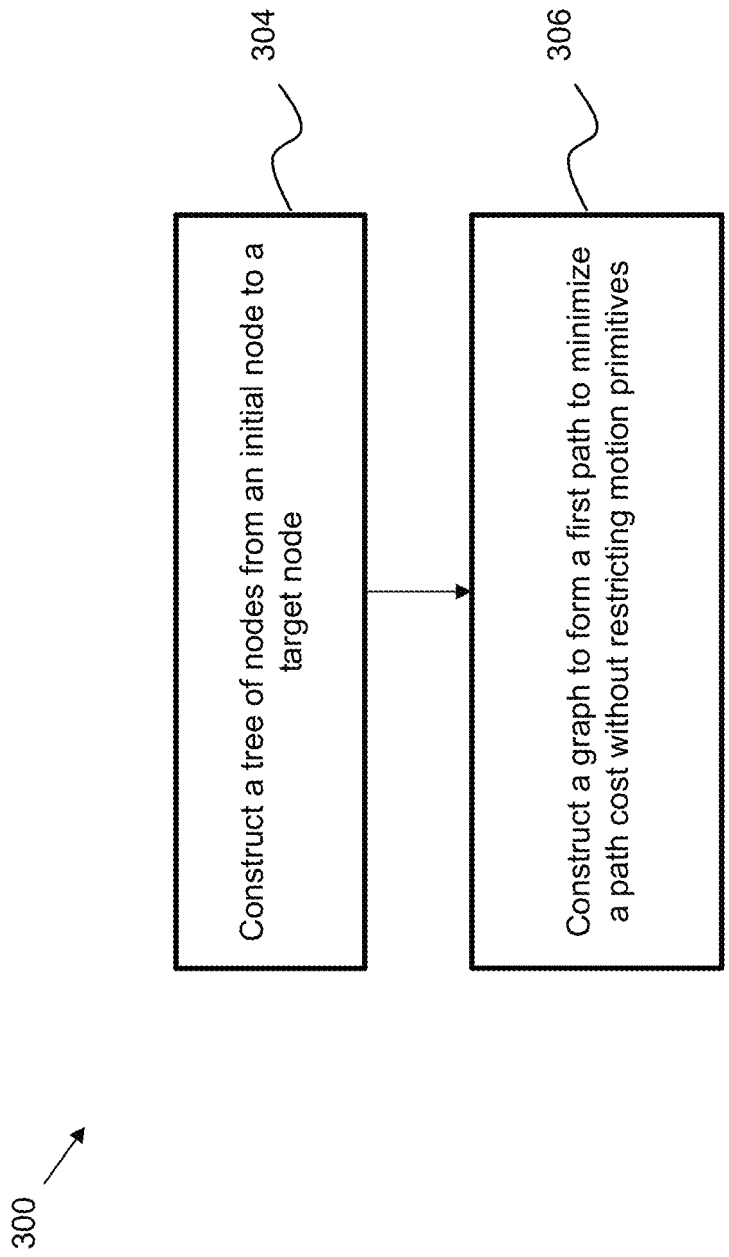
FIG. 3A illustrates an example method for generating a first path for controlling motion of the articulated vehicle, in accordance with some embodiments of the present disclosure.

FIG. 3A illustrates an example method 300 for generating a first path for controlling motion of the articulated vehicle 120, in accordance with some embodiments of the present disclosure. In an example, the motion of the articulated vehicle 120 may correspond to a docking maneuver from the initial state 142 or initial configuration to the target state 140 or target configuration. For example, with regard to the environment 146 disclosed in FIG. 1C, the initial state 142 may correspond to a starting configuration of the articulated vehicle 120 and the target state 140 corresponds to a location of the articulated vehicle 120 corresponding to docking bay 132.

It may be noted that the system 100 is equipped with the ability to interact with the environment 146 and receive sensor data corresponding to the state of the articulated vehicle 120 and surrounding environment 146. In an example, the articulated vehicle 120 is configured with the system 100 for controlling its movement in an automated manner. For example, the system 100 may include one or more components to determine a first path for the articulated vehicle 120 and further control its movement to perform certain operations, such as a docking or a parking operation. Pursuant to embodiments of the present disclosure, the articulated vehicle 120 operation may correspond to the docking maneuver 130. However, such operation should not be construed as a limitation, and the system 100 may also be used to perform other operations, such as cruise control, hitching, parking, and so forth. For example, the system 100 may provide a set of motion commands to control the motion of the articulated vehicle 120, based on the first path. In an example, the system 100, particularly, the motion planner 102 may utilize an A-search guided tree (AGT) algorithm to generate the first path for the articulated vehicle 120, to cause the articulated vehicle 120 to perform the docking maneuver. The method 300 describes the use of the AGT algorithm to generate the path, to perform the docking maneuver in an effective and efficient manner.

In an example, the motion planner 102 of the system 100 may perform the steps of method 300 to generate the first motion path and the reference trajectory 107.

As may be understood, an AGT path and motion planning algorithm is a variant of A-star-based algorithms. The AGT algorithm may be capable of efficiently computing kinematically feasible solutions for automated vehicle parking tasks. Pursuant to embodiments of present disclosure, the docking maneuver 130 described may be considered as a special parking task with very stringent requirements on terminal phase of the maneuver in terms of lateral position error and heading angle error.

Pursuant to embodiments of the present disclosure, the AGT algorithm is a hybrid A-star algorithm. Given a configuration or pose of the articulated vehicle 120 including position and heading angles, the AGT algorithm searches for solutions which prioritize control actions at each node to balance optimality of a computed motion path and computational efficiency. Moreover, the AGT algorithm simultaneously expands a sub-graph, i.e., a tree of nodes (also referred to as, a goal tree) from the initial node for the terminal docking configuration $q^{ref}(t_f)$ to the target node for the initial configuration $q(0)$ by a sequence of nodes with associated state vectors $X_i$.

In an example, a tree of the graph may be defined as a union of a set of nodes and a set of edges. In this regard, the tree may be defined as: T=(V, E), where V is a set of nodes, and E is the set of edges. To this end, $E(X_i, X_f)$ denotes a feasible and collision-free trajectory between states $X_i$ and $X_f$. Moreover, $C_{free}$ is implicitly obtained by checking collisions with static obstacles, such as the obstacle 144, in the environment 146. It may be assumed that M denotes a finite set of motion primitives pre-computed from available control actions, and $V_{max}$ denotes a maximum number of nodes allowed in the graph.

According to some embodiments of the present disclosure, to enhance the performance of the AGT algorithm for path and motion planning in automated docking maneuver 130, and to improve the performance of the predictive controller 104 for tracking a resulting reference trajectory 107, tailored modifications are done to generate the first path using the AGT algorithm.

At 302, a tree of nodes is constructed from an initial node. The initial node of the tree corresponds to the target or goal state 140, $X_f$. Moreover, the target node of the tree corresponds to a state close to the initial state 142 of the articulated vehicle 120. In an example, the tree (also referred to as, a goal tree) is rooted at the target state 140, $X_f$, of the articulated vehicle 120. As such, any kinematic infeasibility largely occurs due to the initial tracking error, which may be suppressed before reaching the target state 140 provided that the initial tracking error is sufficiently small.

At 304, a graph is constructed to form the first path. According to some embodiments, the graph for the first path may target to minimize a path cost without restricting motion primitives for travelling from the initial state 142 to the target state 140. In this regard, the system 100 may utilize the motion planner 102 corresponding to the path and motion planning layer 202 to generate the first path.

Figure 3B:
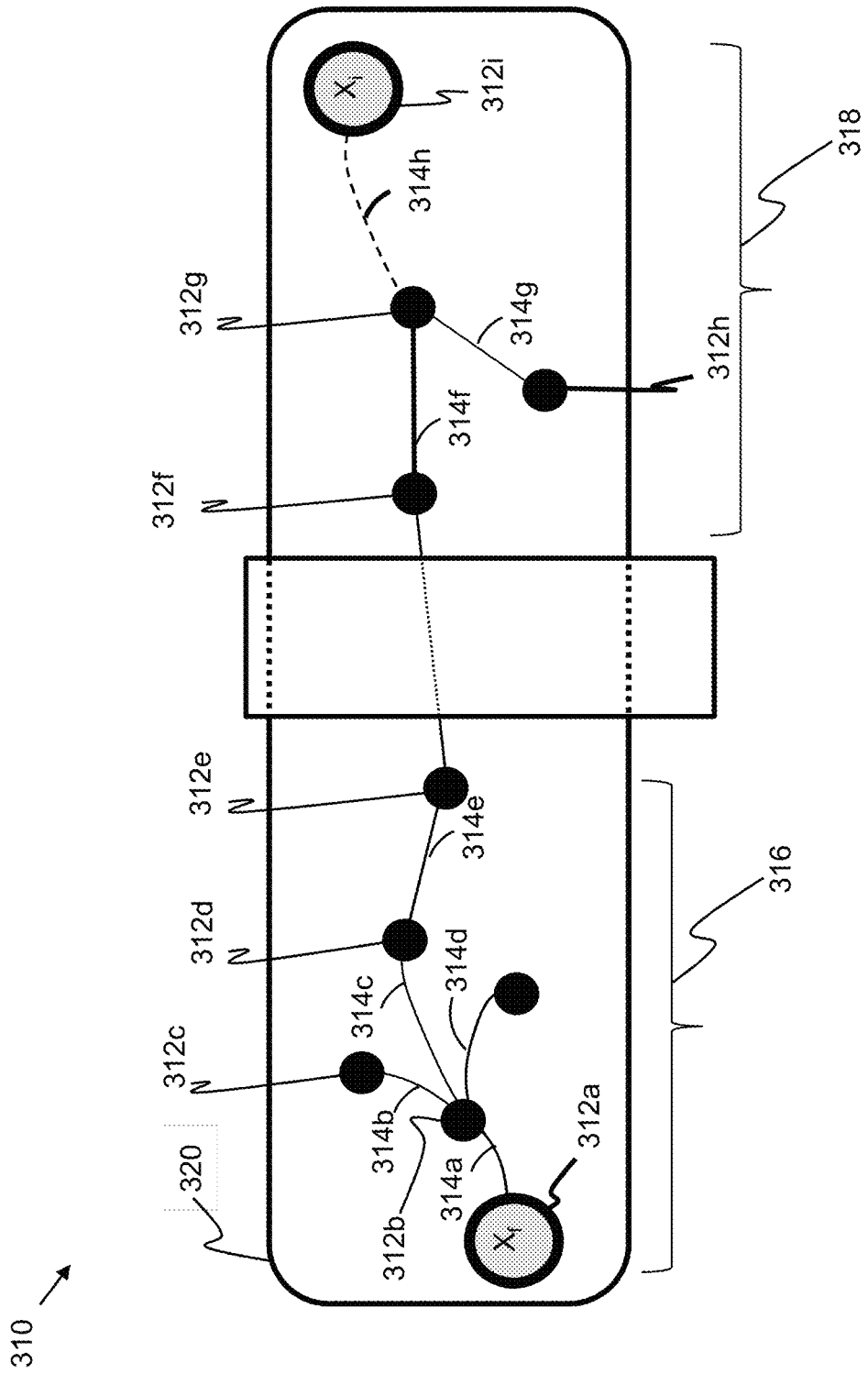
FIG. 3B illustrates an example graph structure for forming the first path, in accordance with some embodiments of the present disclosure.

FIG. 3B illustrates an example graph structure 310 for forming the first path, in accordance with some embodiments. In accordance with some embodiments, the graph structure 310 may have multiple nodes, depicted as nodes 312a-312i. The nodes 312a-312i define states, such as the states $X_i$ and $X_f$ of the articulated vehicle 120. The multiple nodes 312a-312i of the graph 310 may include an initial node 312a corresponding to the target state $X_f$ of the articulated vehicle 120 and a target node 312i corresponding to an initial state $X_i$ of the articulated vehicle 120.

The target state $X_f$ may correspond to the docking configuration. As may be understood, each pair of the nodes 312a-312i in the graph 310 is connected with an edge (depicted as edges 314a-314h) defined by one or a combination of collision-free motion primitives for moving the articulated vehicle 120 between the corresponding states of the connected nodes. In addition, each node 312a-312i may include a number of motion cusps, representing the number of motion cusps in the path from either 312a or 312i to the particular node. For example, the multiple nodes 312a-312i connected through the corresponding edges 314a-314h may be used to generate the first path through the graph 310 connecting the initial node 312a with the target node 312i by a sequence of motion primitives for moving the articulated vehicle 120 from the initial state $X_i$ to the target state $X_f$.

In an example, the graph 310 may be constructed by iteratively expanding a node from the multiple nodes 312a-312i to create a new node or by connecting two existing nodes from the multiple nodes 312a-312i. The new node and the expanded node or the two existing nodes may be connected with a corresponding edge that denotes collision free motion primitives for moving the articulated vehicle 120.

In particular, to construct the graph 310, the AGT algorithm may be employed by the motion planer 102. In an example, the AGT may construct a tree 316 of nodes from a target configuration of the articulated vehicle 120 to an initial configuration. In another example, a tree 318 may be constructed from the initial configuration to the target configuration. In yet another example, two simultaneous trees 316 and 318 may be generated. The tree 318 may originate from the initial configuration and the tree 316 may originate from the target configuration, as a bidirectional AGT (BIAGT). In yet another example, the tree 316 may be constructed from the target configuration until it is sufficiently close to the initial configuration in some distance expressed on a configuration manifold. In this manner, a first path 320 may be formed based on the tree 316 and/or the tree 318. Once sufficiently close, for example, when the tree 316 reaches the node 312g, the tree 316 is connected to the initial configuration by solving a linear quadratic regulation (LQR) steering problem. To this end, the edge 314h is not a motion primitive, but rather a solution to the LQR steering problem computed online. The solution to the LQR steering problem may be determined numerically instead of analytically, as the articulated vehicle 120 does not admit closed form analytical solution to the steering problem in the general setting.

In an example, the expansion of the trees 320 may be based on a cost function $F(\cdot)$ that sums a heuristic value $h(\cdot)$ and arrival cost $g(\cdot)$. In an example, the heuristic value of a node in the AGT algorithm is calculated based on a first cost-to-go estimated by a neural network module, and a second cost-to-go representing the Reeds-Shepp (RS) path length between a current node towards the initial configuration of the articulated vehicle 120, while ignoring the obstacles 144.

In one embodiment, the heuristic value $h(\cdot)$ is a weighted sum of the first cost-to-go and the second cost-to-go. The arrival cost $g(\cdot)$ of a node is the sum of costs of all edges 314a-314h connecting the target configuration to the node 312g close to the initial configuration. In one embodiment, the RS path of the articulated vehicle 120 is calculated as the RS path of the tractor 122.

In one embodiment, the AGT algorithm is modified to generate a second path, based on the first path 320. In this regard, the second path is generated based on a hard constraint associated with the number of motion cusps that are allowed in a connecting path between two states and a total number of initial tracking errors. In such a case, the connecting path of motion primitives between two states for generating the second path may have minimum number of motion cusps and minimum number of initial tracking errors. In accordance with some embodiments, motion primitives between the two states, say $X_i$ and $X_j$ may represent the construction of the shortest distance path. Such an embodiment associated with the generation of the second path is explained in detail in conjunction with following FIG. 4A, FIG. 4B, and FIG. 4C. In some embodiments, motion primitives to be applied at the initial state $X_i$ may not introduce additional cusps or tracking error, i.e., a velocity of motion primitives to be applied at the target node 312$i$ or the initial state $X_i$ may be same as velocity of motion primitive reaching the initial state $X_i$ from its parent node 312$g$.

When the generation of the first path 320 is successful, the system 100, specifically, the motion planner 102 may generate the first path 320 without restricting motion primitives corresponding to movement of the articulated vehicle 120. The first path 320 may have minimized cost associated therewith. However, if a total number of nodes 312$a$-312$i$ in the trees 316 and/or 318 reaches $V_{max}$ and a solution trajectory, i.e., the first path 320, has not been found, the path planning fails. For example, if the path planning fails, the generation of the first path may be re-started, or the control of the articulated vehicle 120 may be transferred for manual maneuvering.

Based on the generated first path 320, the reference trajectory 107 may be generated for the facilitating the motion of the articulated vehicle 120 along the first path 320, as a function of time. Thereafter, based on the reference trajectory 107, a control command may be generated for the articulated vehicle 120 to cause the articulated vehicle 120 to follow the reference trajectory 107. To this end the modified AGT algorithm employed by the motion planner 102 may improve the performance of the predictive controller 104 for tracking the reference trajectory 107 of the articulated vehicle 120 and for enabling successful docking maneuver 130. An example embodiment of the modified AGT algorithm is used by system 100 or the motion planner 102 for controlling the movement of the articulated vehicle 120 to perform the docking maneuver 130 is defined in detail hereinafter.

Figure 4A:
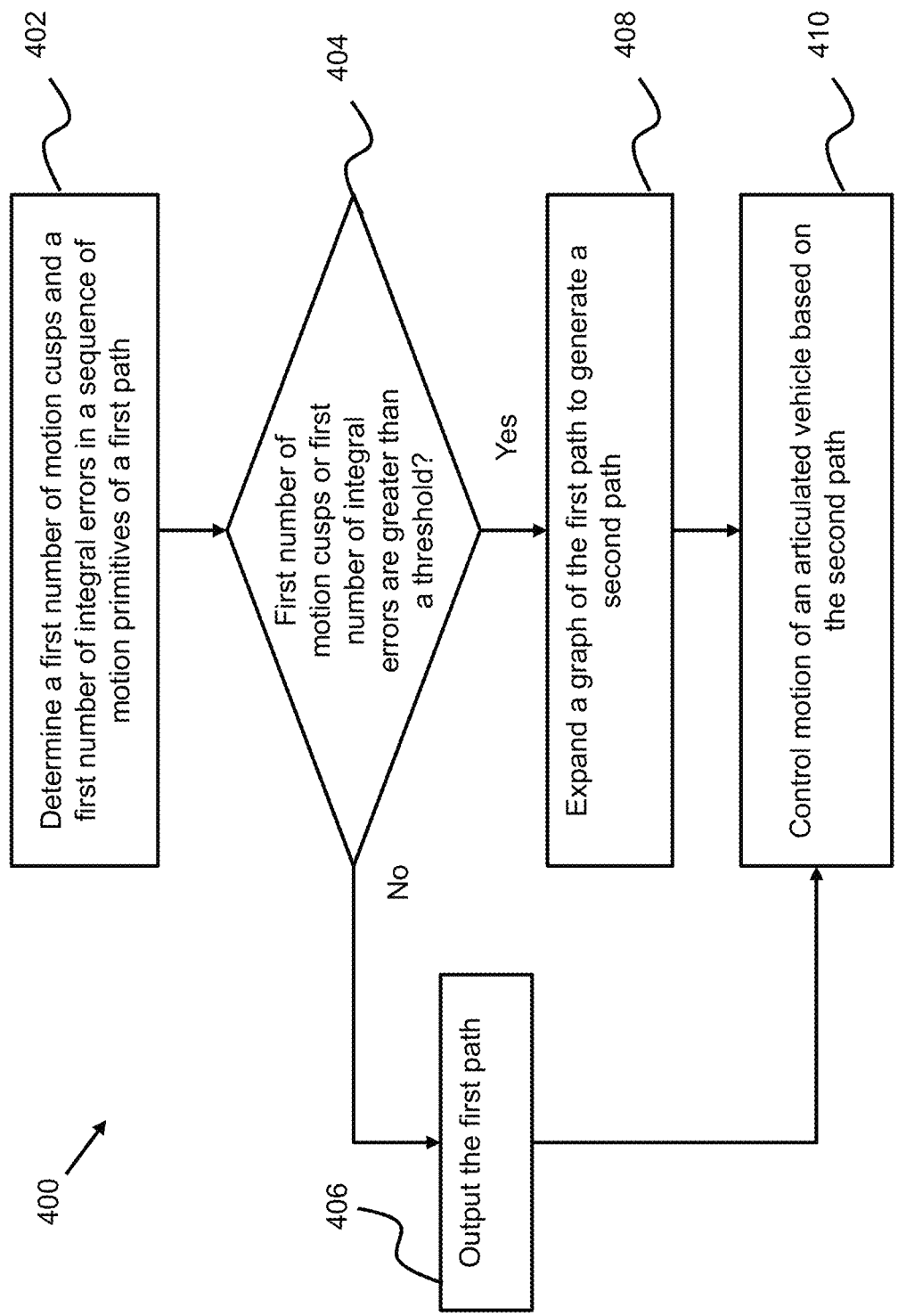
FIG. 4A shows an example method for controlling motion of an articulated vehicle based on a second path, in accordance with some embodiments of the present disclosure.

FIG. 4A shows an example method 400 for controlling motion of articulated vehicle 120 based on a second path, in accordance with some embodiments of the present disclosure. For example, the motion of the articulated vehicle 120 may correspond to the docking maneuver 130 from the initial configuration or initial state 142 to the target configuration or target state 140. In an example, the steps of the method 400 may be performed after generation of the first path 320, as described in FIGS. 3A and 3B.

According to some embodiments, path and motion planning for automated docking maneuver 130 is described herein. In this regard, to improve the performance of the predictive controller 104 for tracking the resulting reference trajectory 107, the AGT algorithm is modified. The modified AGT algorithm is configured to continue expanding the graph 310, even after the generation of the first path 320, to generate the second path, if the first path does not meet the criteria on path quality, for example the number of motion cusps of the first path exceeds a threshold or the number of initial tracking errors exceeds a threshold. It may be noted that the second path is also constructed by the expansion of the tree 316 from the initial node 312$a$ grown backward in time to the target node 312$i$ which indicates the initial state 142 ($X_i$). The second path is constructed in the present method 400.

At 402, a first number of motion cusps in a sequence of motion primitives of the first path 320 may be determined. In particular, a motion cusp indicates a switching between a forward motion and a backward motion in the sequence of motion primitives. As used herein, a motion cusp switches from a forward motion to a backward motion or switches from the backward motion to the forward motion in the sequence of motion primitives defining the first path 320.

Conventional motion planners typically seek the shortest path and may thus provide a solution having unnecessary motion cusps. This is largely because a cost-to-go guided tree construction fails to take the number of motion cusps into account. Such motion cusps may compromise positioning accuracy of the integrated path and system 100. The motion cusps necessitate the motion of the articulated vehicle 120 with zero and near-zero velocity and such motions are problematic for the accuracy of the path and motion planning system 100 due to the dominance of inertia of the articulated vehicle 120 over its dynamic behavior.

Additionally, for heavy-duty vehicles (HDVs), a gear shift needs to be made at each motion cusp which also incurs a significant temporal cost. Hence, each motion cusp in the first path 320 of the articulated vehicle 120 amplifies modeling errors and disturbance which accumulate with the number of motion cusps, creating an accuracy problem and increasing the total time of the docking maneuver 130.

In certain cases, conventional planners for non-holonomic systems may yield slight residuals in the non-holonomic constraints of the multiple articulated vehicles. In other words, there may be relaxations or numerical errors in the motion planner 102 which may cause error transients. As the articulated vehicle 120 is intrinsically robust when moving in the forward direction, these errors will be suppressed if they occur early in a maneuver, but the suppression of the errors is much slower when the articulated vehicle 120 is operating in the reverse or backwards direction. This is particularly challenging for the docking maneuver 130, which typically terminates with a long reversing maneuver. Further, owing to backward or reverse motions in the motion cusps, modeling errors due to, for example, steering angle bias, incorrect hitching offset and actuator dynamics may affect tracking of the first path 320. As a result, it may be challenging to follow the first path 320 precisely.

Consequently, in one embodiment of the present disclosure, it is realized that small planning errors may be tolerated if they occur early in the docking maneuver 130, for example near the initial state 142 or the target node 312$i$ of the articulated vehicle 120. Therefore, the tree 316 is grown backward in time from the initial node 312$a$ corresponding to the target configuration and is connected to the target node 312$i$ corresponding to the initial configuration by a short steering segment that is computed online. However, in addition to the motion cusps of the first path 320, initial tracking errors in the steering segment may determine a performance of the docking maneuver 130, as large initial tracking errors may lead to substantial errors in the target docking configuration.

As such, to overcome the problems associated with the number of motion cusps and the connection of the tree 316 to the initial configuration, the first number of motion cusps in the first path 320 is determined. Moreover, a first number of initial tracking errors in first path 320 are determined. In an example, the first number of initial tracking errors in the first path 320 is determined by solving the LQR steering problem used for connecting the node 312*g* with the initial node 312*a*, when the tree 316 is constructed backwards. For example, the first number of initial tracking errors may indicate an amount of difference between a current state of the articulated vehicle 120 and a state at a start of the first path 320 or the reference trajectory 107.

Further, at 404, a determination is made to check if the first number of motion cusps in the first path 320 is greater than a predefined motion cusp threshold, and if the first number of initial tracking errors is greater than a predefined initial tracking error threshold.

Continuing further, at 406, if the first number of motion cusps in the first path 320 is less than the predefined motion cusp threshold and the first number of initial tracking error is less than the predefined initial tracking error threshold, the motion planner 102 may output the first path 320 for controlling motion of the articulated vehicle 120 according to the first path 320. In this regard, the reference trajectory 107 may be generated based on the first path 320.

At 408, on determining the first number of motion cusps in the first path 320 to be greater than predefined motion cusp threshold at or the first number of initial tracking errors to be greater than a predefined initial tracking error threshold, the motion planner 102 is configured to keep on expanding the graph 310 of the first path 320. The motion planner 102 may expand the graph 310 to generate a second path. In particular, the graph 310 is expanded to add new nodes in the graph 310 until a termination condition is met. Such expansion of the graph 310 is subjected to a hard constraint associated with a total number of motion cusps and a total number of initial tracking errors in the graph 310 or the first path 320. The graph 310 is further expanded to form the second path connecting the initial node 312*a* with the target node 312*i*. The second path may have a second number of motion cusps that is less than the first number of motion cusps in the first path 320 and/or the second path may have a second number of initial tracking errors that is less than the first number of initial tracking errors in the first path 320.

For example, the graph 310 may be expanded based on the first number of motion cusps and the first number of initial tracking errors. In particular, on comparing the first number of motion cusps and the first number of initial tracking errors with the corresponding thresholds and determining that a constraint is violated, the motion planner 102 may keep on expanding the graph 316 to add more new nodes. The predefined motion cusp threshold indicates a maximum number of allowed motion cusps in a path, and the predefined initial tracking error threshold indicates a small number related to the initial tracking error allowed in a path. For example, if the first number of motion cusps in the first path 320 is less than the predefined motion cusp threshold and the first number of initial tracking errors is small or less than the predefined initial tracking error threshold, then the articulated vehicle 120 may be able to follow the reference trajectory 107 based on the first path 320 with greater accuracy. However, if the first number of motion cusps in the first path 320 is greater than the predefined motion cusp threshold or the first number of initial tracking error is large or more than the predefined initial tracking error threshold, a large amount of uncertainty may be added at each of the motion cusps, which, in addition to the initial tracking errors may hamper accuracy of path planning and may prevent the articulated vehicle 120 form travelling along the reference trajectory 107 based on the first path 320 to the docking bay 132.

For example, the predefined motion cusp threshold and the predefined initial tracking error threshold may be user-selectable or dynamically defined based on the first path 320, for example, based on a length of the first path 320.

In an example, the predefined initial tracking error threshold may be related to a cost function of the predictive controller 104 used for tracking motion of the articulated vehicle 120. Furthermore, the motion planner 102 may have a terminal condition for generating the second path. In particular, the terminal condition may correspond to computational time, i.e., a computation time for generating the second path may be limited. Therefore, to reduce the initial tracking error within limited computational time, two thresholds for the initial tracking error may be defined. This may allow the motion planner 102 to output and evaluate a best candidate motion plan found before the terminal condition is met, i.e., within the limited computational time, if the motion planner 102 fails to generate a solution meeting strict thresholds (or hard constraints) on the number of motion cusps and the initial tracking errors.

In accordance with an example, the motion planner 102 may perform the expansion of the graph 310 until the termination condition is met. The system 100 may then control the movement of the articulated vehicle 120 based on the second path, when the second path is formed before the termination condition is met. However, if the second path is not generated before the termination condition is met or before the limited computational time, the method 400 may go back to 406, to output the first path 320 for controlling the movement of the articulated vehicle 120.

At 410, the system 100 is configured to control the movement of the articulated vehicle 120 based on the second path. In particular, if the second path is generated before the termination condition is met, and the second path has a reduced number of motion cusps or lower number of initial tracking errors as compared to the first path 320, then the motion planner 102 may generate the reference trajectory 107 based on the second path. Subsequently, the system 100 may use the second path for controlling the motion of the articulated vehicle 120, for example, during the docking maneuver 130. In an example, the termination condition may be time-based. For example, the termination condition may indicate an expiration of a pre-defined time period or time limit for generation of the second path. In an example, the time period or time limit of the termination condition may be in a range of 10 seconds to 30 seconds. For example, when the time period of 10 seconds is expired, then the termination condition is met. In another example, the time period of the termination condition may be in a range of 1 second to 60 seconds.

In accordance with some embodiments, the generation of the second path may be initialized based on search for new nodes, wherein node selection is based on penalizing a change of velocity direction in calculating an arrival cost associated with a node. However, to balance the completeness, computational efficiency, and path quality, such penalizing method may substantially increase a time of generation of the second path. Therefore, pursuant to present embodiments, the second path is generated based on the first path 320. The second path is constructed using the modified AGT algorithm.

Figure 4B:
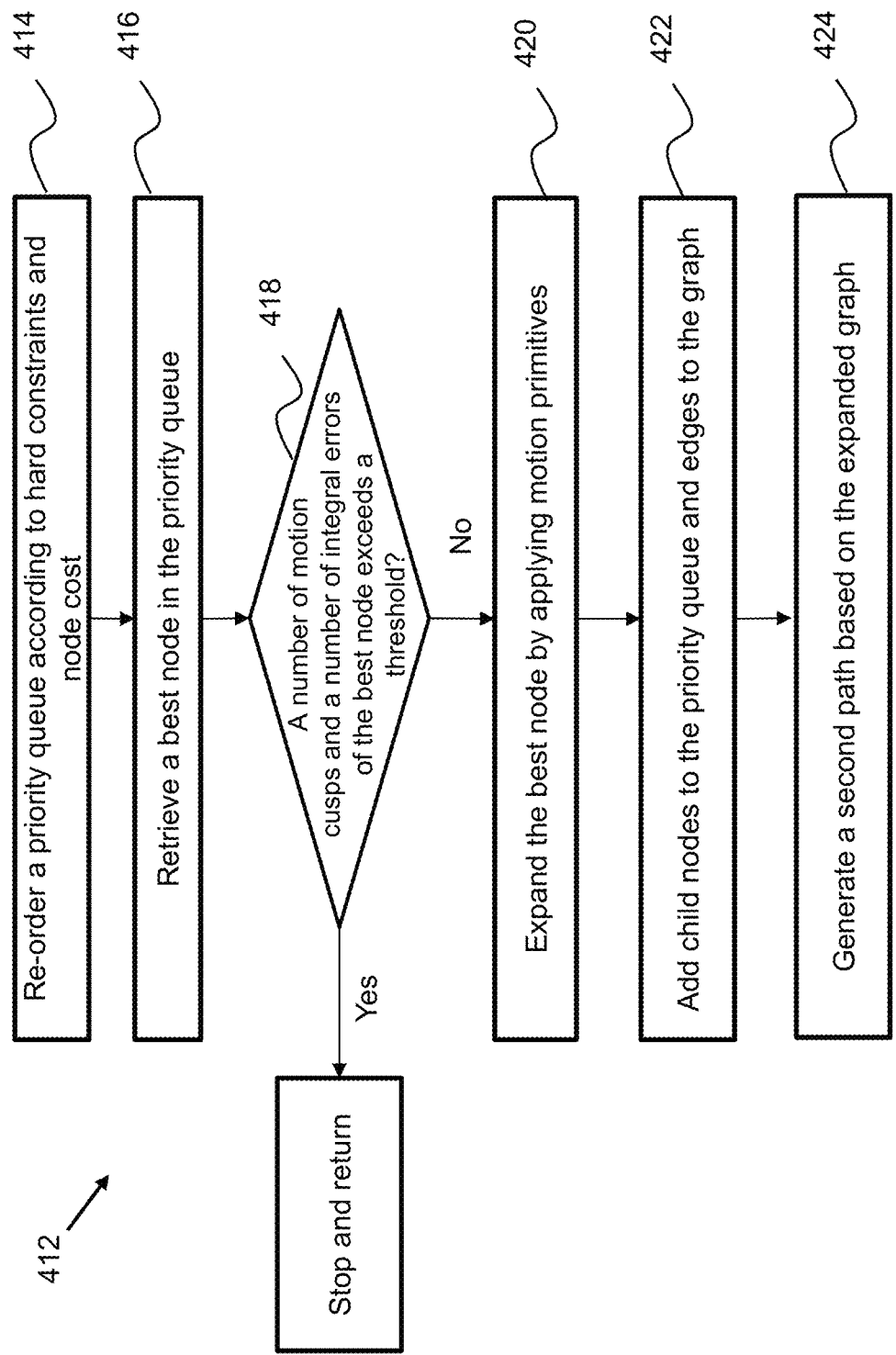
FIG. 4B illustrates an example method to perform expansion of a graph during a second stage, in accordance with some embodiments of the present disclosure.

FIG. 4B illustrates an example method 412 to perform expansion of the graph 310 during a second stage, in accordance with some embodiments. During the second stage, a second path may be generated, based on the first path 320.

At 414, a priority queue is re-ordered based on hard constraints and node cost. In some embodiments, the hard constraint indicates a maximum number of motion cusps for a path from a root node, such as the target node 312i, to a first node, such as the initial node 312a of a graph. For example, several motion cusps of each node are calculated and recorded in a first stage during the generation of the first path 320. Based on the number of motion cusps of the nodes 312a-312i of the graph 310 corresponding to the first path 320, a priority queue for the nodes 312a-312i are re-ordered. Such re-ordering of the nodes 312a-312i is based on, for example, the number of motion cusps, and a node cost. In this regard, one or more nodes 312a-312i with the lowest number of motion cusps have the highest priority to be selected as compared to nodes having the similar of high number of motion cusps. For example, a node with a lowest cost and lowest number of motion cusps gets the priority. In this manner, the priority queue is re-ordered by increasing priority of nodes having lowest number of motion cusps and cost.

Once the priority queue is re-ordered, at 416, a best node is retrieved or selected from the priority queue. At 418, if the best node contains a number of motion cusps greater than the predefined motion cusp threshold of maximum number of allowed motion cusps, it may be identified that there is no way to improve the quality of the first path 320. In such a case, the motion planner 102 returns the first path 320 as the best path. Otherwise, at 420, node expansion is performed starting from the best node. The node expansion may be performed by applying any feasible motion primitive to steer the vehicle dynamics from a starting state corresponding to the best node to new child nodes to form a tree.

At 422, child nodes and associated edges between the best node and corresponding child nodes, if exist, are added to the graph 310. It may be noted that in the present example, the expansion of graph 310 is described using the best node. However, this should not be construed as a limitation. In other embodiments, other nodes may be used to expand the graph 310. Further, it may be noted that nodes for generating the second path may be selected from the nodes 312a-312i or may be new nodes added to the graph 310. In other words, the graph 310 associated with the first path 320 may be expanded and modified to form the second path.

At 424, the second path may be generated based on the new nodes added to the graph. For example, the second path is generated using the new nodes when cost function associated with the nodes forming the second path is less than the threshold. In particular, the second path having the new nodes and/or the best node may have motion cusps less than the predefined motion cusp threshold and initial tracking error less than the predefined initial tracking error threshold.

Figure 4C:
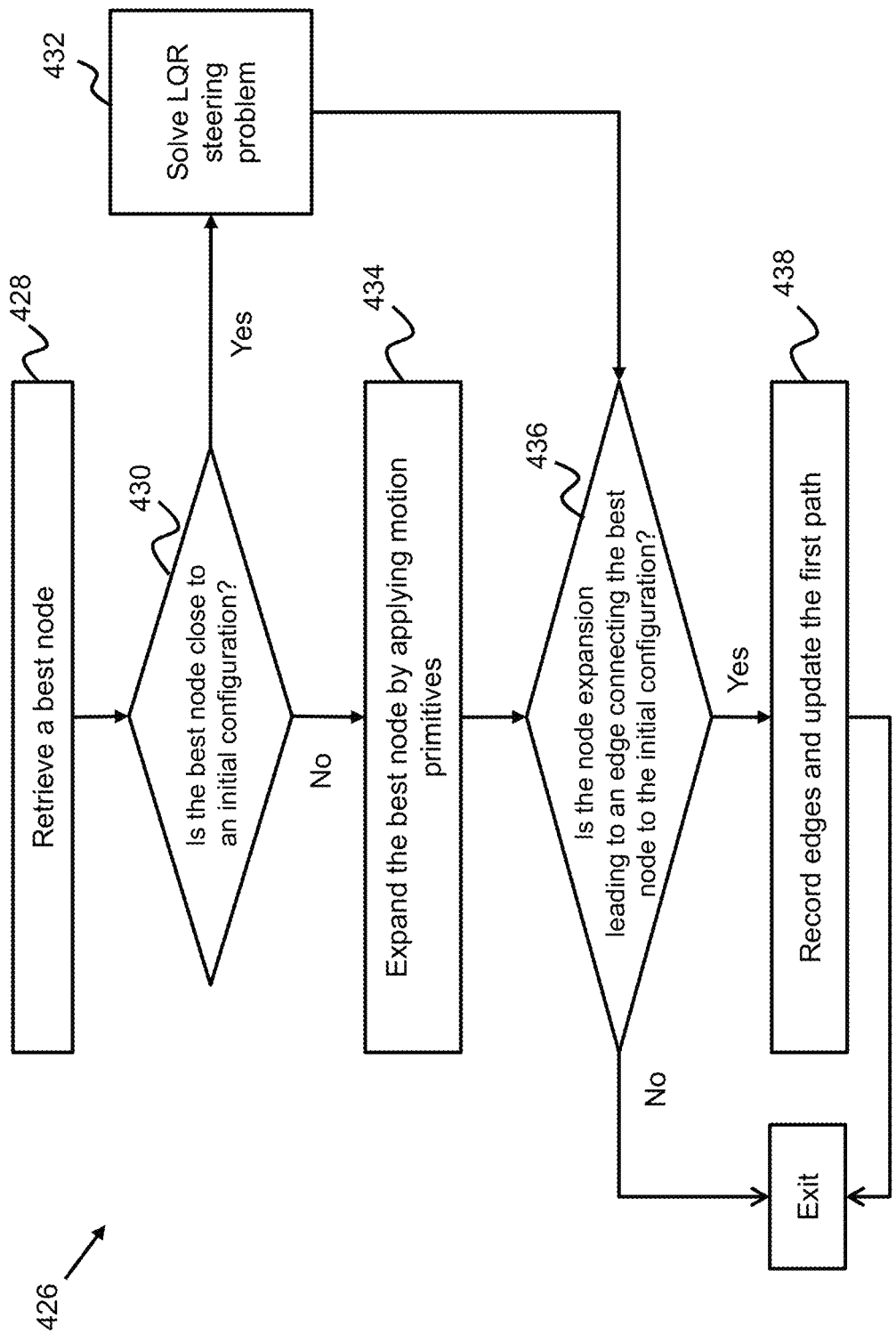
FIG. 4C illustrates an example method of node expansion, in accordance with some embodiments of the present disclosure.

FIG. 4C illustrates an example method 426 of node expansion, in accordance with some embodiments. At 428, the best node of the graph 310 is retrieved. Given the best node, at 430, a determination is made whether the best node of the graph 310 is close to the initial configuration or not.

On determining the best node to be close to the initial configuration, at 432, an LQR steering problem may be solved to generate a solution for connecting the best note with the initial configuration of the articulated vehicle 120.

However, if the best node is not close to the initial configuration, at 434, motion primitives may be applied to expand the best node and add corresponding child nodes.

At 436, a determination to check if the node expansion of best node creates an edge that connects the best node to the initial configuration or the initial state 142. The determination is made to check if the node expansion, at steps 432 or 434 has led to the edge connecting the best node of the graph 310 to the initial configuration. If neither the expansion of the best node with the motion primitives or the LQR steering problem manages to expand the graph 310, the node expansion of the best node is terminated. Thereafter, another node, such as a child node of a previous best node or a second-best node, may be selected for expansion, according to steps of the method described in FIG. 4A, FIG. 4B, and FIG. 4C.

However, if the node expansion of the best node generates a new edge that connects the best node to the initial configuration, at 438, the new edge is recorded, and the first path 320 is updated using the new edge as new path. In this regard, if the new path generated using the new edge contains a smaller number of motion cusps than the first number of motion cusps and/or a less initial tracking error than the first number of initial tracking errors of the first path 320, the new path will be updated as a new first path and the new first path may be further optimized until the termination condition is met. Alternatively, if the new path generated using the new edge contains a second number of motion cusps less than the predefined motion cusp threshold and a second number of initial tracking errors less than the predefined initial tracking error threshold, the new path may be recorded as the second path.

To this end, the continued expansion of the graph 310 is performed to reduce path cost. In particular, the continued expansion of graph 310 is performed to satisfy a hard constraint associated with selection of nodes of the graph by applying restrictive motion primitives. In an example, the motion primitives are restricted based on presence of motion cusps and presence of initial tracking errors within edges associated with a pair of nodes.

Figure 5A:
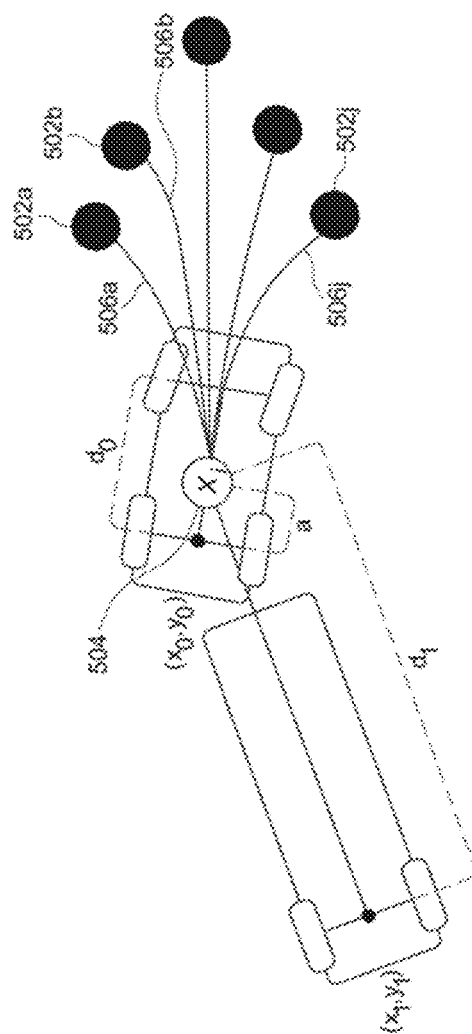
FIG. 5A illustrates a graphical representation of a motion primitive, in accordance with some embodiments of the present disclosure.

FIG. 5A illustrates an example of a type of motion primitives, in accordance with some embodiments. For example, the motion primitives are applied to a node to give a collision-free child node. As may be understood, motion primitives are pre-computed motions that the articulated vehicle 120 may perform. The motion primitives indicate motions in which the articulated vehicle 120 may smoothly transition into. For example, the motion primitives may be used to form edges of a graph, such as the edges 314a-314g in the graph 310. For example, the motion primitives may be super-imposed on the graph 310 at any of the nodes 312a-312i, to identify child node(s) thereof.

In an example, the motion primitives may be applied to the initial node 312a to identify and connect the initial node 312a with its child nodes, using motion primitives forming edges 314a. Subsequently, each node from the trees 316 and 318 may be connected to its child node(s) using motion primitives indicated by the edges 314a-i. The motion primitives may be uniquely defined by a trajectory of control inputs over a finite time interval.

To this end, applying motion primitives corresponding to edge 314a at the initial node 312a or $X_f$, results in a connecting path ending at a state represented in by the node 312b. For example, the edges 314a-314h edge in the graph 310 may be represented by a trajectory.

Pursuant to present example, motion primitives corresponding to an edge 506a may be used for connecting node 504 with 502a. If a state corresponding to the node 502a and the corresponding connecting path 506a are collision-free, the node 502a may become a child node of its parent node, such as the node 504. In an example, the node 504 may have multiple child nodes. In one example, the node 502a may become child node of the node 504, when a path between the node 504 and the node 502a is collision-free, feasible and has a less cost than a threshold.

In accordance with present example, the node 504 may be a best node of the graph 310 forming the first path 320. Further, the motion planner 102 may expand the graph 310 using motion primitives defined by a range of: $\{a_1(t), t \in [0, t_{f1}]\}$ to $\{a_1(t), t \in [0, t_{fj}]\}$). The motion primitives add collision free nodes, such as the node 502a and other nodes 502b-502j. The edge 506a and other edges 506b-506j—may connect the node 504 with corresponding child nodes 502a-502j. According to some embodiments, the child nodes 502a-502j may be added to a path if number of motion cusps from a root of corresponding tree to the child node 502a-502j has a smaller number of motion cusps than a threshold of maximum number of allowed motion cusps or the predefined motion cusp threshold, if a cost of the child node 502a-502j may be less than the cost of the parent node 504, and if initial tracking error in the child node is reduced. Such a child node may be added to graph 310 for generating the second path. A particular child node may be then selected as the next best node for expansion.

In an example, a cost of the child node 502a-502j corresponding to the states may be calculated as a sum of an arrival cost and an estimated cost-to-go, where the arrival cost represents a cost of driving the articulated vehicle 120 from initial state 142 or root node of a tree to the child node 502a-502j, and the estimated cost-to-go represents an estimated cost of driving the articulated vehicle 120 from the initial configuration or the initial state 142 to the child node 502a-502j.

Figure 5B:
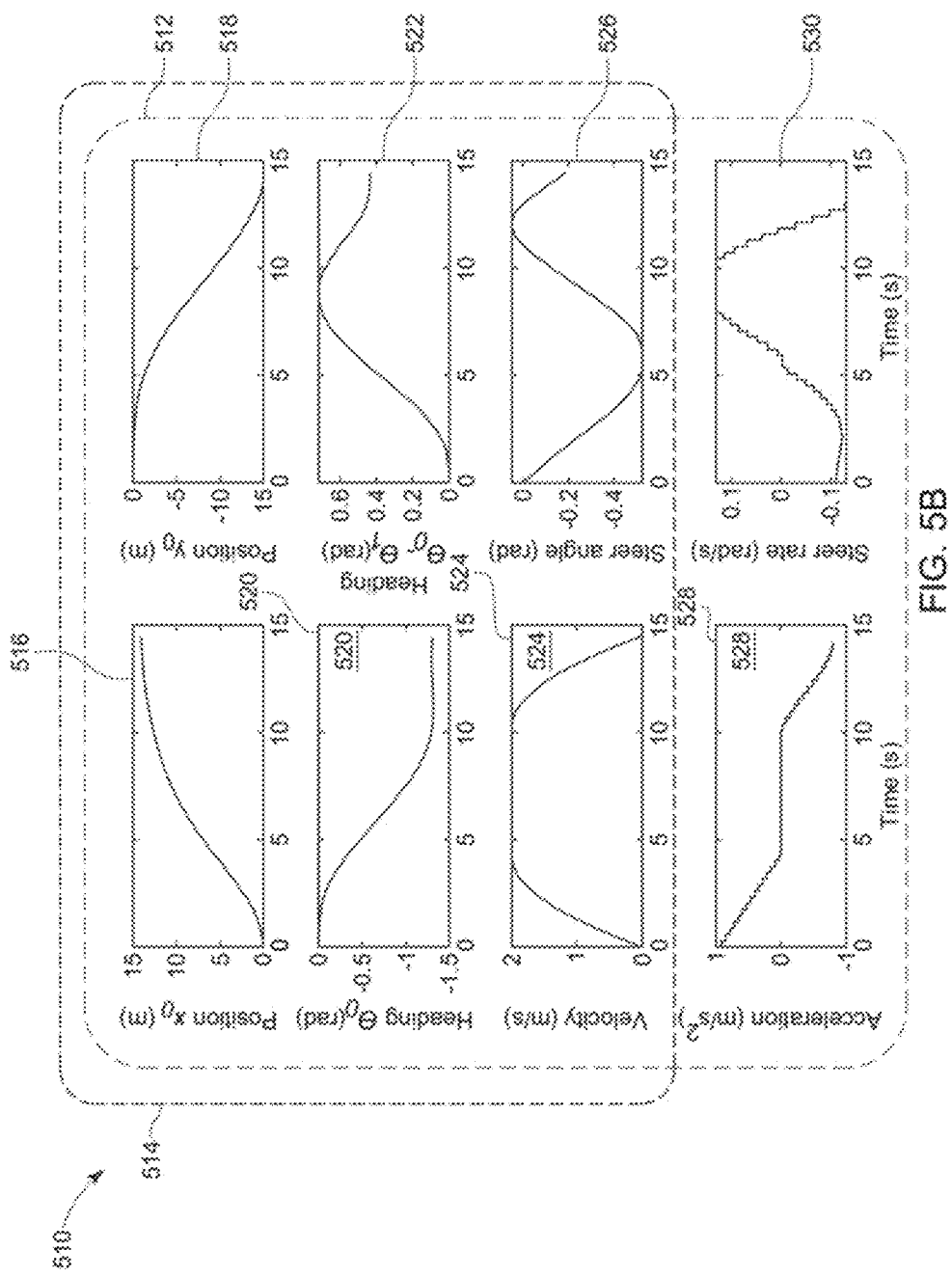
FIG. 5B illustrates a motion primitive as a function of time, in accordance with some embodiments of the present disclosure.

FIG. 5B illustrates a graphical representation of a type of motion primitive 510, in accordance with some embodiments. For example, a motion primitive 510, represented by edges, such as the edges 314a-314h, contains a high-dimensional trajectory, represented as $\{\alpha_i(t), t \in [0, t_{fj}]\}$ 512, which connects two nodes indicating two state vectors, such as $X_i$ and $X_j$, without considering obstacles. A subset of a signal representing high-dimensional trajectory 512 corresponds to a state trajectory 514. In an example, the motion primitive 510 are applied at a node $X_i$ of a tree to expand the tree into a new node with a new node $X_j$.

In one embodiment, a state of the articulated vehicle 120 is defined with velocities and steering angles along with the configuration or pose of the articulated vehicle 120. To this end, the motion primitive 510 associated with an edge connecting $X_i$ and $X_j$ may be a high-dimensional time-varying trajectory, represented as $\{\alpha_i(t), t \in [0, t_{fi}]\}$, wherein each state and control signal of the vehicle model 110 evolves in time. In the case of a single trailer articulated vehicle, the motion primitive 510 may include, for example, a position 516 of a vehicle or the tractor 122, a position 518 of the trailer 124a or 314, heading angles 520 of the tractor 122, heading angles 522 of the trailer 124a or 314, a velocity 524 of the tractor 122, a steering angle 526 of the tractor 122, an acceleration 528 of the articulated vehicle 120, and a steering angle rate 530 of the tractor 122. As may be understood, the components of the motion primitive 510 are depicted as signals. To this end, the signals corresponding to the position 516, the position 518, the heading angles 520, the heading angles 522, the velocity 524 and the steering angle 526 enables to form a new node corresponding to a state vector and the state trajectory 514.

During the first stage for constructing the first path 320, the first set of nodes 312a-312g in a priority queue may be ordered according to corresponding costs of nodes 312a-312g to be selected for expansion, where the cost may not characterize a number of motion cusps. Subsequently, a node with the lowest cost has the highest priority to be selected. During the second stage for constructing the second path, constraint associated with a number of motion cusps and a number of initial tracking errors in the sequence of the motion primitives of the nodes 312a-312g may be imposed for node selection.

Once a trajectory is generated with sufficiently few motion cusps and small initial tracking error, such as based on the second path, the predictive controller 104 is used for accurately tracking the planned trajectory.

Figure 6A:
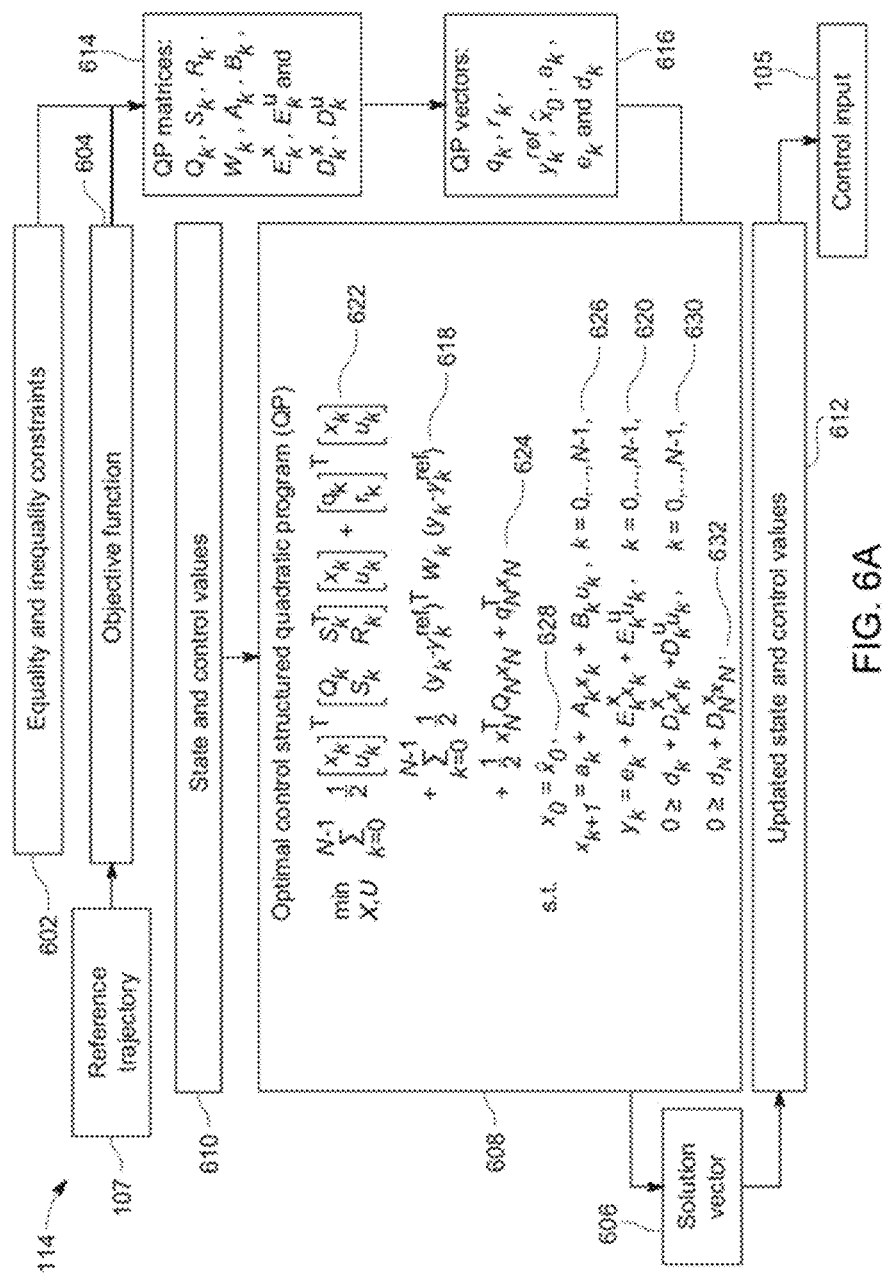
FIG. 6A shows an example block diagram for a linear predictive controller, in accordance with some embodiments of the present disclosure.

FIG. 6A shows an example block diagram for a linear predictive controller 104, in accordance with some embodiments. The predictive controller 104 is configured to compute the control signal 105, given a current state and the estimated state 109 of the control system 106 and the reference trajectory 107. Specifically, the reference trajectory 107 may be determined based on the first path 320 or the second path, as a function of time thereof. The reference trajectory 107 for the movement of the articulated vehicle 120 may be generated by adding a time dimension to the path 320 or the second path generated at 408. In certain cases, the motion planner 102 within the system 100 may generate the second path with minimum number of motion cusps and small number of initial tracking errors and generate the reference trajectory 107 based on the second path. The predictive controller 104 of the system 100 then receives the reference trajectory 107 and tracks the motion of the articulated vehicle 120.

In an example, the predictive controller 104 may be configured to generate equality and inequality constraints 602 for controlling movement of the articulated vehicle 120. For example, the equality and inequality constraints may indicate constraint functions for physical movement of the articulated vehicle 120 corresponding to its surroundings. The equality and inequality constraints 602 may be generated when the predictive controller 104 comprises one or more non-linear constraints and a non-linear vehicle model 110, i.e., when the predictive controller 104 is non-linear. Further, the predictive controller 104 may be configured to generate an objective function 604 for the predictive controller 104, using the reference trajectory 107 generated by the motion planner 102. In an example, the objective function 604 may indicate a start or initial state 142 of the articulated vehicle 120, goal or target state 140 of the articulated vehicle 120, and the reference trajectory 107 to be followed. For example, during the docking maneuver 130, the objective function 604 may indicate the initial state 142 as current location of the articulated vehicle 120 away from the docking bay 132 and the target state 140 or target configuration by the docking bay 132. The objective function 604 may be configured to minimize errors between one or more predicted states of the articulated vehicle 120 and the reference trajectory 107 over the prediction time horizon of the predictive controller 104.

For example, optimal control data of the objective function 604 and the equality and inequality constraints 602 may be used for solving a constrained optimization problem the based on the equality constraint function, the inequality constraint function, and the objective function. For example, based on a solution of the optimization problem, control input 105 may be generated. In an example, a type of the optimization problem may depend on the dynamics of the vehicle model 110 of the system 100, the system constraints 112, the estimated state 109 of the system 100 and the reference trajectory 107.

According to some embodiments, the predictive controller 104 may be configured to compute a control solution, for example, a solution vector 606, comprising a sequence of future optimal control input 105 over a prediction time horizon of the motion planner 102. The predictive controller 104 may be configured to compute the control solution 606 by solving the optimization problem, at each control time step. In accordance with present example, the optimization problem may have inequality constraints 602 and may be in the form of an optimal control structured quadratic program 608.

In some embodiments, the solution of the inequality constrained optimization problem, i.e., the optimal control structured quadratic program (QP) 608 uses state and control values 610 over a prediction time horizon from a previous control time step, which may be read from a memory. In this manner, techniques for warm- or hot-starting of the optimization problem may be implemented. This may reduce the required amount of computational effort of the predictive controller 104, in some embodiments. In an analogous manner, the corresponding solution vector 606 generated by solving the optimal control structured QP 608 may be used to generate a sequence of optimal or suboptimal updated state and control values 612 for a next control time step.

According to some embodiments, the predictive controller 104 may compute the control input 105 for controlling and tracking the movement of the articulated vehicle 120 by solving the optimal control structured QP 608, given the estimated state 109 of the system 100 and the reference trajectory 107.

In some embodiments of the present disclosure, the predictive controller 104 uses a linear-quadratic objective function 604 in combination with a linear vehicle model 110 to predict a behavior of the articulated vehicle 120 and linear inequality constraints. The prediction of the behavior of the articulated vehicle 120 and the linear inequality constraints may result in the formulation of the optimal control structured QP 608 problem that may be formulated as:

$$\min_{X,U} \sum_{k=0}^{N-1} \frac{1}{2} \begin{bmatrix} x_k \\ u_k \end{bmatrix}^T \begin{bmatrix} Q_k & S_k^T \\ S_k & R_k \end{bmatrix} \begin{bmatrix} x_k \\ u_k \end{bmatrix} + \begin{bmatrix} q_k \\ r_k \end{bmatrix}^T \begin{bmatrix} x_k \\ u_k \end{bmatrix} +$$

$$\sum_{k=0}^{N-1} \frac{1}{2}(y_k - y_k^{ref})^T W_k (y_k - y_k^{ref}) + \frac{1}{2} x_N^T Q_N x_N + q_N^T x_N,$$

such that $x_0 = \hat{x}_0$ $x_{k+1} = \alpha_k + A_k x_k + B_k u_k, k=0, \ldots, N-1,$ $y_k = e_k + E_k^x x_k + E_k^u u_k, k=0, \ldots, N-1,$ $0 \geq d_k + D_k^x x_k + D_k^u u_k, k=0, \ldots, N-1,$ $0 \geq d_N + D_N^x x_N,$ where the prediction horizon of the linear predictive controller 104 is discretized in time, using a sequence of N equidistant or non-equidistant control time intervals. The control time intervals may be divided by a corresponding sequence of discrete time points $t_k$ for $k=0, \ldots, N$.

The optimization variables in the optimal control structured QP 608 consist of state variables $x_k$ and control input variables $u_k$ for $k=0, \ldots, N$. According to some embodiments of the present disclosure, the dimensions for the state and the control variables 610 may not need to be equal to each other for each discrete time point $t_k$, where $k=0, \ldots, N$. At each sampling time for the predictive controller 104, the optimal control structured QP 608 is formulated, using QP matrices 614 and QP vectors 616. Subsequently, the optimal control structured QP 608 is solved to compute the solution vector 606. The solution vector 606 may be used to generate updated the state and the control values 612 that may be used in next iteration. Further, based on solving the optimal control structured QP 608 a new control input 105 is generated.

The objective function in the constrained optimal control structured QP that is solved by the predictive controller 104 includes one or more least squares reference tracking terms 618, which penalizes a difference between a sequence of predicted state and/or output values 620 and a sequence of reference state and/or output values for the reference trajectory 107 that is computed by the motion planner 102.

The output variables $y_k$ for $k=0, \ldots, N$, that are used in the reference tracking terms 618 may be defined as any linear function of state and/or control input variables 620. The reference tracking terms 618 may be defined by the weighting matrix $W_k$ 618 in the QP matrices 614 and the reference values $y_k^{ref}$ in the QP vectors 616. In some embodiments of the present disclosure, the weighting matrix is either positive definite $W_k > 0$ or positive semi-definite $W_k \geq 0$, i.e., all eigenvalues of the matrix $W_k$ are either larger than zero or all eigenvalues of the matrix $W_k$ are larger than or equal to zero.

For example, an output function may include, but are not limited to, longitudinal or lateral velocities and/or accelerations of the articulated vehicle 120 a slip ratio or slip angle, angles of orientation or angular velocities, wheel speeds, forces, and torques.

In various embodiments, a penalty between the reference values corresponding to the reference trajectory 107 determined by the motion planner 102 and the values determined by the predictive controller 104 is weighted by the weighting matrix that assigns different weights to different state variables of the target states. Additionally or alternatively, some embodiments add additional reference tracking terms to be considered by the predictive controller 104. Such additional reference tracking terms may be related to, for example, driving comfort, speed limits, energy consumption, pollution, etc. These embodiments balance a cost of reference tracking with the additional reference tracking terms.

In accordance with an example, additional reference tracking terms may be defined based on cost function in the form of a linear-quadratic stage cost 622 and/or a linear-quadratic terminal cost term or matrix 624. These additional linear-quadratic reference tracking terms, including the stage cost 622 and terminal cost matrix 624, may include a linear and/or quadratic penalization of one or more combinations of one or more state and/or control input variables. For example, the objective function in the constrained QP 608 may include a linear or quadratic penalization of longitudinal or lateral velocities and/or accelerations of the vehicle, a slip ratio or slip angle, angles of orientation or angular velocities, wheel speeds, forces, torques or any combination of such quantities. The linear-quadratic objective terms in the stage cost 622 and the terminal cost matrix 624 are defined by the matrices $Q_k$, $S_k$ and $R_k$ in the QP matrices 614 and the gradient values $q_k$, $r_k$ in the QP vectors 616.

In some embodiments of the present disclosure, a Hessian matrix (as used in the stage cost 622) is denoted as:

$$H_k = \begin{bmatrix} Q_k & S_k^T \\ S_k & R_k \end{bmatrix}$$

where the Hessian matrix is either a positive definite $H_k > 0$ or positive semi-definite $H_k \geq 0$. In other words, all eigenvalues of the Hessian matrix $H_k$ are either larger than zero or all eigenvalues of the matrix $H_k$ are larger than or equal to zero.

The constrained optimal control structured QP 608 that is solved by the linear predictive controller 104 at the vehicle controller layer 204 (as shown in FIG. 2) defines a linear vehicle model equations 626 that describes the state of the articulated vehicle 120 at one time step $t_{k+1}$, given the state and control variables 610 at the previous time step $t_k$. The linear vehicle model 110, mathematically defined as linear vehicle model 626, is defined by a time-invariant or time-varying sequence of matrices $A_k$ and $B_k$ in the QP matrices 614 and vectors $a_k$ in the QP vectors 616, for $k=0, \ldots, N-1$. Given the current estimated state $\hat{x}_0$ 109 in the equality constraint for the initial state value 628 and a sequence of control input values $u_k$, the linear dynamic system model equations 626 may be used to compute the state values $x_k$ for $k=0, \ldots, N$.

In addition to the equality constraints, including the initial state value 628, the vehicle model equations 626 and the control input variables or output equations 620, the constrained optimal control structured QP 608 may include one or more inequality constraints to impose physical limitations of the control system 106, safety constraints and/or to impose desirable performance-related constraints on the behavior of the autonomous or semi-autonomous articulated vehicle 120. More specifically, the QP 608 may include path inequality constraints 630 for $k=0, \ldots, N-1$ and/or terminal inequality constraints 632 at the end of the prediction horizon. The inequality constraints are defined by a time-invariant or time-varying sequence of matrices $D_k^x$ and $D_k^u$ in the QP matrices 614 and vectors $d_k$ in the QP vectors 616 for $k=0, \ldots, N$.

The inequality constraints may include constraints on, for example, longitudinal or lateral velocities, accelerations of the articulated vehicle 120, the position and/or heading angles of the articulated vehicle 120 with respect to its surroundings, a slip ratio or slip angle, angles of orientation, angular velocities, wheel speeds, forces and/or torques. For example, obstacle avoidance constraints could be implemented in the predictive controller 104 by defining a set of one or more inequality constraints on a linear function of the predicted position, velocity, and orientation of the articulated vehicle 120 with respect to the predicted position, and velocity and orientation of one or more obstacles 144 in the surrounding environment 146 of the articulated vehicle 120.

In this manner, the equality constraint, and the inequality constraints 602 and objective function 604, previous state and control values 610, QP matrices 614 and QP vectors 616 may be used in formulation and solving the QP 608. By solving the QP 608, the predictive controller 104 may generate the value of control input 105. For example, the values of control input 105 may include values for, for example, longitudinal or lateral velocities of the articulated vehicle 120, longitudinal or lateral accelerations of the articulated vehicle 120, a slip ratio or slip angle for the articulated vehicle 120, angles of orientation, angular velocities, wheel speeds, forces, and torques. Based on the values of the control input 105 corresponding to different functions, the articulated vehicle 120 may be controlled to perform the docking maneuver 130. For example, the control input 105 may be provided to the actuators of the articulated vehicle 120 to control the movement of the articulated vehicle 120 based on the reference trajectory 107 corresponding to the first path 320 or the second path.

The predictive controller 104 may also provide the control input 105 to the control system 106 for generating and estimate of the vehicle state 121 for control purposes. The estimated state 109 of the control system 106 provides state feedback to the predictive controller 104. For example, the predictive controller 104 tracks the movement of the articulated vehicle 120 to ensure that it is travelling along the reference trajectory 107.

Some embodiments of the present disclosure are based on the realization that the optimal control structured QP 608 is convex if the Hessian matrix $H_k$ in 622, the terminal cost matrix $Q_N$ 624 and the weighting matrix $W_k$ 618 are positive definite or positive semi-definite. Embodiments of the present disclosure may use an iterative optimization algorithm to solve the optimal control structured QP 608 to find the solution vector 606, which is either feasible with respect to the constraints and globally optimal, feasible but suboptimal or an algorithm may find a low-precision approximate control solution that is neither feasible nor optimal. As part of the predictive controller 104, the optimization algorithm may be implemented in hardware or as a software program executed in a processor.

Examples of iterative optimization algorithms for solving the QP 608 may include, but are not limited to, primal or dual gradient-based methods, projected or proximal gradient methods, forward-backward splitting methods, alternating direction method of multipliers, primal, dual, or primal-dual active-set methods, primal or primal-dual interior point methods or variants of such optimization algorithms. In some embodiments of the present disclosure, the block-sparse optimal control structure in the QP matrices 614 may be exploited in one or more of the linear algebra operations of the optimization algorithm in order to reduce the computational complexity, and therefore to reduce the execution time and memory footprint of the QP optimization algorithm.

Other embodiments of the disclosure can solve a non-convex optimal control structured QP 608 using optimization algorithms for non-linear programming such as, for example, sequential quadratic programming (SQP) or interior point methods (IPM). Subsequently, either a suboptimal, a locally optimal or globally optimal control solution may be found to the inequality constrained optimization problem at each sampling time of the predictive controller 104.

Figure 6B:
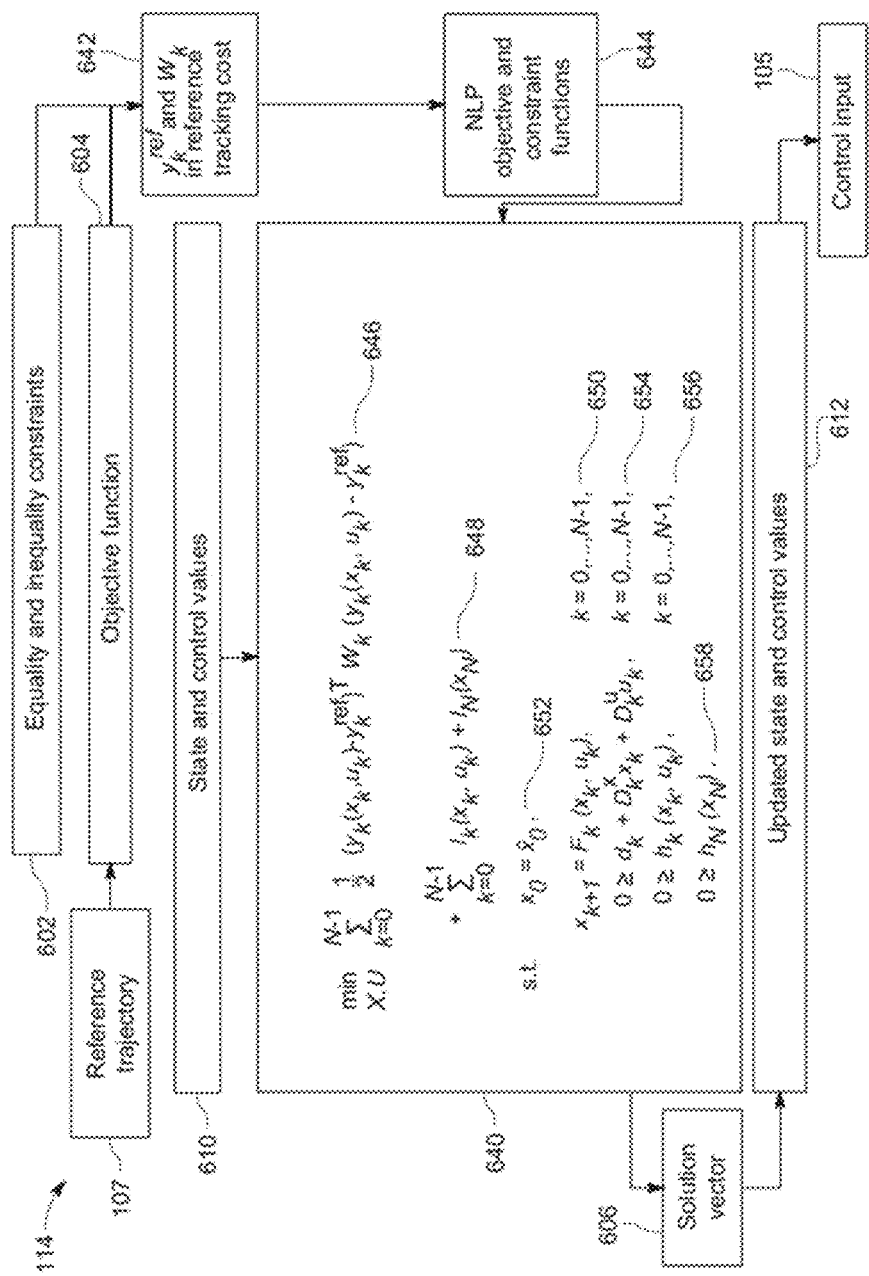
FIG. 6B shows an example block diagram for a non-linear predictive controller, in accordance with some embodiments of the present disclosure.

FIG. 6B shows an example block diagram of a non-linear predictive controller 104, in accordance with some embodiments. In one example, the predictive controller 104 may be implemented by solving an optimal control structured non-linear program (NLP) 640 to compute the control signal 105, given the estimated state 109 of the control system 106 and the reference trajectory 107. In some embodiments of the present disclosure, the predictive controller 104 is a motion predictive controller configured with a linear-quadratic or nonlinear quadratic objective function used in combination with a linear or non-linear vehicle model 110 and a constraint function 644 to predict the behavior of the articulated vehicle 120 and a combination of linear and nonlinear inequality constraints. The predictive controller 104 may track the articulated vehicle 120 based on the predicted behavior.

The predicted behavior of the articulated vehicle 120 and the combination of linear and nonlinear inequality constraints 644 may result in formulation of the optimal control structured NLP 640 problem that may be formulated as:

$$\min_{X,U} \sum_{k=0}^{N-1} \frac{1}{2}\bigl(y_k(x_k, u_k) - y_k^{ref}\bigr)^T W_k \bigl(y_k(x_k, u_k) - y_k^{ref}\bigr) + \sum_{k=0}^{N-1} l_k(x_k, u_k) + l_N(x_N)$$

such that $x_0 = \hat{x}_0$ $x_{k+1} = F_k(x_k, u_k), k=0, \ldots, N-1,$ $0 \geq d_k + D_k^x x_k + D_k^u u_k, k=0, \ldots, N-1,$ $0 \geq h_k(x_k, u_k), k=0, \ldots, N-1,$ $0 \geq h_N(x_N),$ where a prediction horizon of the nonlinear predictive controller 104 is discretized in time, using a sequence of N equidistant or non-equidistant control time intervals. The control time intervals are divided by a sequence of discrete time points $t_k$ for $k=0, \ldots, N$.

The optimization variables in the optimal control structured NLP 640 consist of state variables $x_k$ and control input variables $u_k$ for $k=0, \ldots, N$. In some embodiments, the dimensions for the state and control variables 610 do not need to be equal to each other for each discrete time point $t_k$ for $k=0, \ldots, N$. At each sampling time for the predictive controller 104, the optimal control structured NLP 640 is formulated, using the reference and weighting matrix in the reference tracking cost 642, and NLP objective and constraint functions 644. The optimal control structured NLP 640 is solved in order to compute the solution vector 606. The solution vector 606 may be used to generate updated the state and the control values 612 that may be used in next iteration. Further, based on solving the optimal control structured NLP 640 a new control input 105 is generated.

It may be understood that additional dynamics may need to be modeled in a prediction model in relation to the vehicle model 110 (1) described in relation to FIG. 1A. In one embodiment of the nonlinear controller, the prediction model is defined as:

$$\left. \begin{aligned} \dot{x}_0 &= v\cos(\theta_0), \\ \dot{y}_0 &= v\sin(\theta_0), \\ \dot{\theta}_0 &= \frac{v}{d_0}\tan(\phi + \phi_b), \\ \dot{\theta}_1 &= \frac{v}{d_1}\sin(\theta_0 - \theta_1) + \frac{av}{d_0 d_1}\tan(\phi + \phi_b)\cos(\theta_0 - \theta_1), \\ \dot{v} &= \frac{1}{r_1}(v_d - v), \\ \dot{\phi} &= \frac{1}{r_1}(\phi_d - \phi) \end{aligned} \right\} \quad (2)$$

The prediction model includes first order velocity and steering angle actuators with time constants $\tau_1$ and $\tau_2$ for the velocity and steering angle actuators, respectively. As such, when commanding a desired velocity, $v_d$, and steering angle, $\varphi_d$, respectively, it takes some time characterized by the time constants to achieve the desired response. Additionally, a hitching offset a is included in the prediction model in some embodiments of the controller. Furthermore, a steering angle bias $\varphi_b$ is considered, which may be estimated online or computed in a calibration step. It may be noted that other actuator and bias models may be considered, complementary to the vehicle model in (2). To this end, higher-order actuation models, nonlinear actuation models, and actuation models including a pure delay may also be included in the prediction model or the vehicle model.

Pursuant to present example, the non-linear predictive controller 104 may track the reference trajectory 107 by solving an optimal control problem formulation, in which the reference trajectory 107 is indicated as:

$$(x_0^{ref}(t_i), y_0^{ref}(t_i), \theta_0^{ref}(t_i), \ldots, \theta_n^{ref}(t_i), \varphi^{ref}(t_i), \varphi_d^{ref}(t_i), v_d^{ref}(t_i))_{i=0, \ldots, M}. \quad (3)$$

given a grid of discrete time points to $< t_1 < \ldots < t_i < \ldots < t_M$.

In an example, the objective function in the constrained optimal control structured NLP 640, that may be solved by the predictive controller 104, includes one or more linear and/or nonlinear least squares reference tracking terms 646. The reference tracking terms 646 may penalize a difference between a sequence of predicted state and/or output values and a sequence of reference state and/or output values for the reference trajectory 107 that is computed by the motion planner 102 at the path and motion planning layer 202.

In some embodiments of the present disclosure, a sequence of weighting matrices $W_k$ is used in the least squares reference tracking terms 646 for $k=0, \ldots, N$. To this end, each weighting matrix $W_k$ may be adapted in the control cost function 642, based on the reference trajectory 107. The output values $y_k(x_k, u_k)$ for $k=0, \ldots, N$, which are used in the reference tracking terms 646, may be defined as any linear or nonlinear function of state and/or control input variables.

For example, an output function may include, but is not limited to, longitudinal or lateral velocities, accelerations of the articulated vehicle 120 a slip ratio or slip angle, angle of orientation, angular velocities, wheel speeds, forces, and torques. The reference tracking terms 646 is defined by the weighting matrix $W_k$ and the reference values $y_k^{ref}$ 642. In some embodiments of the present disclosure, the weighting matrix is either positive definite $W_k > 0$ or positive semi-definite $W_k \geq 0$, i.e., all eigenvalues of the matrix $W_k$ are either larger than zero or all eigenvalues of the matrix $W_k$ are larger than or equal to zero.

Embodiments of the present disclosure may define additional tracking terms for the cost function 642 in the form of a stage cost and/or a terminal cost term 648. Both the cost terms may include any combination of linear, linear-quadratic, or nonlinear functions. These additional objective terms may include a penalization of functions of state and/or control input variables. For example, the objective function 644 in the constrained optimal control structured NLP 640 may include a linear, quadratic, or nonlinear penalization of longitudinal or lateral velocities and/or accelerations of the vehicle, a slip ratio or slip angle, angles of orientation or angular velocities, wheel speeds, forces, torques or any combination of such quantities.

The constrained optimal control structured NLP 640 that is solved by the nonlinear predictive controller 104 may define a nonlinear dynamical model 650 that describes a state of the articulated vehicle 120 at one time step $t_{k+1}$, given a state and control variables 610 at the previous time step $t_k$. The nonlinear vehicle model 650 is defined by a time-invariant or time-varying function $x_{k+1} = F_k(x_k, u_k)$ for $k=0, \ldots, N-1$. Given the estimated state $\hat{x}_0$ 121 in the equality constraint for the initial state value 652 and a sequence of control input values $u_k$, the nonlinear dynamical model equations 650 may be used to compute the state values $x_k$ for $k=0, \ldots, N$.

Some embodiments of the present disclosure are based on the realization that a discrete-time dynamical model 650 to predict the behavior of the articulated vehicle 120 may be obtained by performing a time discretization of a set of continuous time differential or differential-algebraic equations. Such a time discretization may sometimes be performed analytically but requires the use of a numerical simulation routine to compute a numerical approximation of the discrete-time evolution of the state trajectory. Examples of numerical routines to simulate a set of continuous time differential or differential-algebraic equations include, but are not limited to, explicit or implicit Runge-Kutta methods, explicit or implicit Euler, backward differentiation formulas and other single- or multistep methods.

In addition to the equality constraints, including the initial state value 652 and the dynamic model equations 650, the constrained optimal control structured NLP 640 may include one or more linear and/or nonlinear inequality constraints to impose physical limitations of the control system 106, safety constraints and/or to impose desirable performance-related constraints on the behavior of the autonomous or semi-autonomous articulated vehicle 120. More specifically, the optimal control structured NLP 640 may include linear path inequality constraints 654 or nonlinear path inequality constraints 656 for k=0, . . . , N−1 as well as linear and/or nonlinear terminal inequality constraints 658 imposed at the end of the prediction horizon. The inequality constraints are defined by a time-invariant or time-varying sequence of matrices $D_k^x$, $D_k^u$, vectors $d_k$ and/or nonlinear functions $h_k(x_k, u_k)$ for k=0, . . . , N.

The inequality constraints may include constraints on, for example, longitudinal or lateral velocities, accelerations of the articulated vehicle 120, the position and/or heading angles of the articulated vehicle 120 with respect to its surroundings, a slip ratio or slip angle, angles of orientation or angular velocities, wheel speeds, forces and/or torques. For example, obstacle avoidance constraints could be implemented in the nonlinear predictive controller 104 by defining a set of one or more inequality constraints on a linear or nonlinear function of the predicted position, velocity, and orientation of the articulated vehicle 120 with respect to the predicted position, velocity, and orientation of one or multiple obstacles 144 in the surrounding environment 146 of the articulated vehicle 120.

Some embodiments of the present disclosure are based on tailored optimization algorithms to efficiently solve the constrained optimal control structured NLP 640 at each sampling instant of the nonlinear predictive controller 104. Such an optimization algorithm may find a solution vector 606, which is either feasible with respect to the constraints and globally optimal, feasible but locally optimal, feasible but suboptimal or neither feasible nor locally optimal computed by an iterative optimization algorithm to find a low-precision approximate control solution. Examples of NLP optimization algorithms include, but are not limited to, variants of interior point methods and variants of sequential quadratic programming (SQP) methods.

In particular, some embodiments of the present disclosure use the real-time iteration (RTI) algorithm that is an online variant of sequential quadratic programming (SQP) in combination with a quasi-Newton or generalized Gauss-Newton type positive semi-definite Hessian approximation, such that at least one convex block-sparse QP approximation needs to be solved at each sampling instant of the nonlinear predictive controller 104.

In an example, each of the iterations of RTI comprises of two steps. At a first step corresponding to a preparation phase, system or vehicle dynamics are discretized and linearized, the remaining constraint functions are linearized, and the quadratic objective approximation is evaluated to build the optimal control structured QP sub-problem. In a second step corresponding to a feedback phase the QP sub-problem is solved to update the current state and control values for all optimization variables and the next control input 105 is obtained to apply feedback to the control system 106.

In some embodiments of the present disclosure, the block-sparse optimal control structure in the Hessian and constraint Jacobian matrices may be used in one or more of the linear algebra operations of the optimization algorithm in order to reduce the computational complexity, and therefore to reduce the execution time and memory footprint of the NLP optimization algorithm.

It may be noted that an amount of precision required in the docking maneuver 130 may require the predictive controller 104 that is robust to certain disturbances. It may be achieved by introducing integral action in the predictive controller 104. In addition, different sets of integral tracking errors may be introduced corresponding to moving in forward and backward motions, as tracking of states $(x_0, y_0, \theta_0)$ of the tractor 122 of the articulated vehicle 120 becomes more important when driving forward, and tracking of the states $(x_n, y_n, \theta_n)$ associated with the last trailer 124e or 134 becomes more important during backward or reverse motion.

In accordance with an embodiment, an integral tracking error, $\eta$, is defined based on a function of the reference trajectory 107 and the states of the articulated vehicle 120. Further, the integral tracking error evolves in time based on a differential equation. The integral tracking error may be defined as:

$$\dot{\eta} = g(\eta, x, x^{ref}, u, u^{ref}) \qquad (4)$$

Herein, $x^{ref}$ denotes a subset of the control input in (3) that may be contained in the state vector of the prediction model, and $u^{ref}$ denotes a subset of the control input in (3) that are contained in the control signal vector of the prediction model. In an example, the articulated vehicle 120 may have a single trailer, such as the tractor 122 connected with the trailer 134 or 124a. In such a case, an integral tracking error function or integral action may be defined as:

$$g(\eta, x, x^{ref}, u, u^{ref}) = \cos(\theta_1^{ref})(x_1 - x_1^{ref}) - \sin(\theta_1^{ref})(y_1 - y_1^{ref})$$

where $$x_1 = x_0 - \cos(\theta_1)d_1 + \cos(\theta_0)\alpha$$

$$y_1 = y_0 - \cos(\theta_1)d_1 + \sin(\theta_0)\alpha$$

Further, when the articulated vehicle 120 is moving in forward motion, an integral action may be implemented to modify the integral tracking error function to integrate a lateral positional tracking error of a front vehicle, such as the tractor 122. For the forward motion, the integral tracking error function may be defined as:

$$g(\eta, x, x^{ref}, u, u^{ref}) = \cos(\theta_0^{ref})(x_0 - x_0^{ref}) - \sin(\theta_0^{ref})(y_0 - y_0^{ref}),$$

To this end, a hybrid differential equation may be included in the non-linear prediction model of the predictive controller 104, which takes the form of equations (3) and (4). Further, when the articulated vehicle 120 comprises the tractor 122 with n trailers and the articulated vehicle 120 is executing the backward motions, the integral action may be implemented to modify the integral tracking error function to integrate the lateral positional tracking error an end trailer, such as the last trailer 124e. The integral tracking error function may be defined as:

$$g(\eta, x, x^{ref}, u, u^{ref}) = \cos(\theta_n^{ref})(x_n - x_n^{ref}) - \sin(\theta_n^{ref})(y_n - y_n^{ref})$$

wherein, $$x_n = x_0 + \cos(\theta_0)a - \sum_{i=1}^{n} \cos(\theta_i)d_i$$

$$y_n = y_0 + \sin(\theta_0)a - \sum_{i=1}^{n} \sin(\theta_i)d_i$$

It may be noted that the integral tracking error function and integral action are defined differently for forward motion and backward motion, i.e., forward direction and backward direction. Specifically, one or more functional relationships defining the integral action or the integral tracking error function for the constrained optimization problem 604 of the predictive controller 104 are determined differently for the forward motions and the backward motions in the reference trajectory 107. Some embodiments are based on the recognition that it is crucial to reset an integral tracking error state at every point in time, i.e., at each time step, when a direction of motion changes corresponding to motion cusps. In other words, if the articulated vehicle 120 does a gear shift during a planned motion cusp at a time $t_j$ at which point $\eta(t_j) \neq 0$, $\eta(t_j) = 0$ may be reset in the prediction model of the predictive controller 104. In an example, an integral state at a second most recent switch is stored, and the integral state is instead set to a value corresponding to a most recent time the control system 106 switched between forward and backward motion in the same manner.

The integral tracking errors may be minimized while satisfying constraints on longitudinal speed, acceleration, front wheel steering angle and steering angle change rate. The constrained optimal control NLP 640 problem may be formulated using direct multiple shooting. In this regard, at each control time step $t_i$ based on a time grid of equidistant time points $t_k$ for k=0, $$N, t_{k+1} - t_k = \frac{T}{N},$$

where T is a horizon length and N is a number of control intervals, a piecewise constant control parameterization may be applied. The constant control parameterization may be denoted as:

$$u(t_i + \tau | t_i) = u_{i,k}$$

for $\tau \in [t_k, t_{k+1})$, $u_{i,k}$ is predicted control input 105 computed at time step $t_i$. For simplicity, the equidistant time grid is aligned with the discrete time points of the planned reference trajectory 107, $x_{i,k}^{ref} = x^{ref}(t_i + t_k)$. Alternatively, a polynomial interpolation may be used for predicting the control input 105.

Given the state estimate $\hat{x}_{i,0}$ at time step $t_i$ and the piecewise constant control parameterization, the vehicle model dynamics in equation (3) and (4) may be discretized by a numerical integration method, resulting in the discrete-time prediction model denoted as:

$$x_{i,k+1} = f(x_{i,k}, u_{i,k}), k=0, \ldots, N-1$$

For example, explicit 4th order Runge-Kutta method may be applied to perform time discretization to predict behavior of the articulated vehicle 120. It may be noted that the use of the Runge-Kutta method is only exemplary and in other embodiments, other integration methods may be used to achieve desired accuracy in prediction of behavior.

For example, the nonlinear cost function of the predictive controller 104 may be based on the least squares tracking terms 646. For example, the cost function may be formulated as:

$$J(X_i, U_i, S_i) = \frac{1}{2}\sum_{k=0}^{N-1}\left(\|x_{i,k} - x_{i,k}^{ref}\|_Q^2 + \|u_{i,k}\|_R^2\right) + \quad (5a)$$

$$\frac{1}{2}\|x_{i,N} - x_{i,N}^{ref}\|_P^2 + \sum_{k=0}^{N-1} \rho\, s_{i,k} \quad (5b)$$

Where $Q \geq 0$, $P \geq 0$ are positive semi-definite weighting matrices, such as, $W_k$. Further, $R > 0$ is positive definite weighting matrices. Where $x^{ref}$ is the reference state trajectory and $s_{i,k}$ are non-negative slack variables that soften the constraints 602 to ensure recursive feasibility of the optimal control problem and are penalized in a linear term in (5b).

According to some embodiments, a quadratic penalty may be imposed for assigning weight by the weighting matrix. The quadratic penalty on the integrated error $\dot{e}_{\gamma_{int}}$ determines how offset-free tracking control $\dot{e}_{\gamma} \to 0$ is achieved, to meet docking requirements at the end of the maneuver. To avoid oscillations, the integrated error $\dot{e}_{\gamma_{int}}$ may be reset whenever its value grows too large or when the lateral position error $\dot{e}_{\gamma_{int}}$ is sufficiently close to zero.

In an example implementation, the predictive controller may be implemented with a sampling period of $$T_s = \frac{T}{N} = 50 \text{ ms}.$$

At each control time step $t_i$, the velocity and steering commands for the low-level actuators of the articulated vehicle 120 may be computed from $u_k$ of solution of the optimal control structured NLP 640 of the optimal control problem.

For example, the nonlinear optimal control structured NLP 640 may be solved within the sampling time of $T_s = 50$ ms, using a tailored implementation of sequential quadratic programming (SQP) known as the real-time iterations (RTI) scheme, with Gauss-Newton type Hessian approximation. The RTI algorithm performs a single SQP iteration per control time step and uses a continuation-based warm starting of the state and control trajectories $(X_i, u_i; S_i)$ from one time step $t_i$ to the next time step $t_{i+1}$. The non-linear functions and their first order derivatives may be evaluated efficiently using C code generation in CasADi. For solving quadratic programs (QPs), a solver PRESAS, which applies block-structured factorization techniques with low-rank updates to preconditioning of an iterative solver within a primal active-set algorithm with specialized warm-starting may be used. In combination with the CasADi generated C code, the PREAS solver results in efficient and dependable predictive controller 104 solver for solving the optimal control structured NLP 640 problem that is suitable for embedded system platforms.

Based on the control input 105 generated by the predictive controller 104, by solving the optimal control structured NLP 640 problem, the articulated vehicle 120 may be controlled to perform the docking maneuver 130.

FIG. 6C shows the example docking maneuver 130 in detail, in accordance with embodiments of the present disclosure. During the docking maneuver 130, the rear trailer 124e of the articulated vehicle 120 is to approach a docking bay 132 door and achieve a target configuration or target state X_f 140. During the docking maneuver 130, there may be other articulated vehicles or obstacles 144 close to the target docking configuration, depicted as obstacles 602a, 602b.

In one embodiment, both the obstacles 602a and 602b and the trailer 124e of the articulated vehicle 120 are represented as being inflated using a pth order hyper ellipsoid as 604a, 604b, and 606, respectively. The hyper ellipsoid 604a, 604b, 606 contains the corresponding obstacles 602a and 602b or and the hyper ellipsoid 606 contains the trailer 124e of the articulated vehicle 120, in its interior. In some embodiments, the hyper ellipsoids 604a, 604b and 606 may be computed such that an area of the hyper ellipsoids 604a, 604b and 606 is minimized. In other words, the hyper ellipsoids 604a, 604b and 606 may be computed to minimize a maximum margin between the hyper ellipsoids 604a and 604b and the corresponding obstacles 602a and 602b, and the hyper ellipsoids 606 and the trailer 124e, in a direction orthogonal to the obstacle 602a and 602b or the trailer 124e boundary. In another embodiment, the hyper ellipsoids 604a, 604b and 606 may be computed using an analytical formulation for a feasible hyper-ellipsoid.

In an example, the hyper ellipsoid is defined with a center coordinate $(c_x, c_y)$ and parameters $(r_x, r_y)$, $\varphi$, with $\rho \in \mathbb{N}_{>0}$ denoting an order of the ellipsoid. The hyper ellipsoid is defined as:

$$\left(\frac{(x-c_x)}{r_y}\right)^p + \left(\frac{(y-c_y)}{r_y}\right)^p \leq 1.$$

In some embodiments of the present disclosure, the predictive controller 104 includes one or more collision avoidance constraints to enforce one or more collision-free motion primitives in an environment while executing a sequence of motion primitives for moving the articulated vehicle 120. To this end, each of the one or more collision avoidance constraints are implemented using multiple nonlinear inequality constraints. In this regard, a set of nonlinear inequality constraints may be written in the form $h(x_k, u_k) \leq 0$, in which points 608a and 608b on the rear trailer 124e are constrained to an exterior of the hyper ellipses 604a and 604b. The set of nonlinear inequality constraints ensures that one or multiple points of the tractor 122 and/or trailer 124a-124e are constrained to the exterior of the hyper ellipses that enclose each of the obstacles 602a and 602b in the environment 146 of the articulated vehicle 120. The set of nonlinear inequality constraints may also ensure that one or multiple points of each obstacle 602a and 602b are constrained to the exterior of the hyper ellipses that enclose the tractor 122 and to the exterior of the hyper ellipses 606 that enclose the trailer 124e at each time step of the prediction time horizon.

Moreover, the points 610a and 610b on the obstacles 602a and 602b are constrained to reside in an exterior of the hyper ellipse 606 associated with the trailer 124e of the articulated vehicle 120. It may be noted that a constraint may be sufficient to guarantee that the last trailer 124e does not intersect with any of the obstacles 602a or 602b. It may also be understood that a resulting constraint will be differentiable (if $\rho > 1$) and is thus useful in the predictive controller 104 formulation. This contrasts with common methods using collision checking, where an exterior of the trailer 124e perimeter is discretized into a set of points 612a-612j, which are checked in turn to ensure that each of the set of point resides outside of each of the obstacles 602a and 602b. Such a constraint based on the discretized set of points 612a-612j may not be differentiable and less useful in the predictive controller 104. Additionally, such collision checking methods may incur many constraints, drastically increasing the computation time of the predictive controller 104.

Figure 7A:
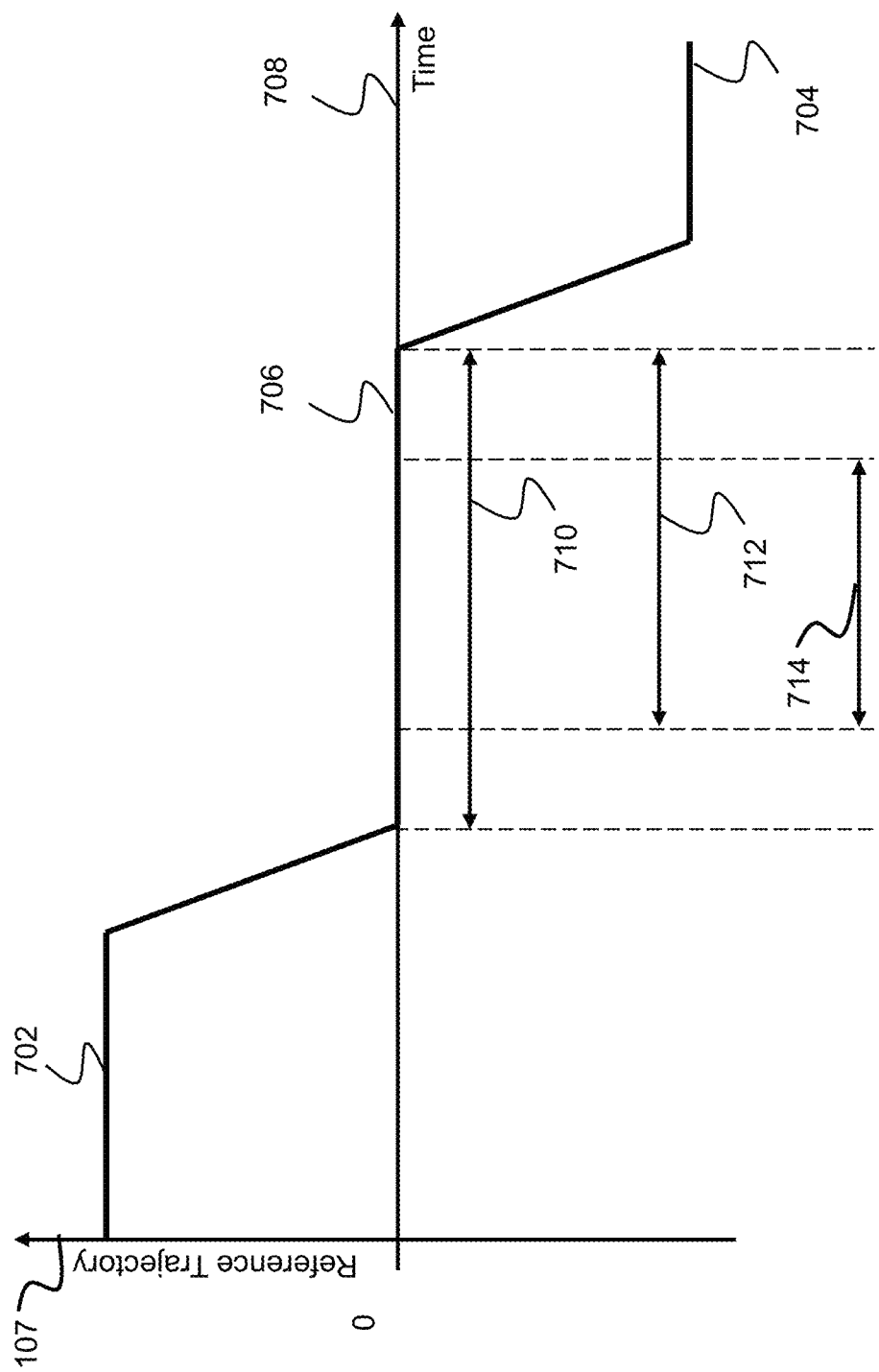
FIG. 7A shows an example reference trajectory, in accordance with some embodiments of the present disclosure.

FIG. 7A shows an example reference trajectory 107, in accordance with some embodiments of the present disclosure. The reference trajectory 107 may be computed by the motion planner 102 in the path and motion planning layer 202. To this end, the reference trajectory 107 may include one or more motion cusps, i.e., a transition from a forward motion 702 to a reverse motion 704 or from a reverse motion 704 to a forward motion 702. Some embodiments of the present disclosure are based on the realization that the reference trajectory 107 should include a sufficiently large pause period 710 at each of the one or more motion cusps, in order to allow for the predictive controller 104 to command a gear change with a sufficiently large preview time period 712 due to a time delay period 714 of the gear shifting mechanics in the controlled system.

For example, FIG. 7A shows a graph of the reference trajectory 107 with respect to time 708, including the forward motion 702 with positive reference velocity values, followed by the pause at standstill with zero reference velocity values 706, and followed by the reverse motion 704 with negative reference velocity values. The pause period 710 is larger than the preview time period 712, for the predictive controller 104 to command a gear change. The preview time period 712 is larger than the time delay period 714 of the gear shifting mechanics in the controlled articulated vehicle 120.

In particular, the GT motion planning algorithm is modified to introduce a pause at each motion cusp, i.e., at each switch between the forward motion 702 and the backward motion 704 of the articulated vehicle 120 to reach the target docking configuration or target state 140 at the end of the docking maneuver 130. In the pause time period 710, $\Delta t_{pause}$, during which the articulated vehicle 120 is planned to be at standstill with zero reference velocity value 706, a gear shift is initiated with the preview time period 712, $\Delta t_{preview}$ before the articulated vehicle 120 starts moving in the opposite direction. The preview time period 712 is chosen to be larger than the time delay period 714 that indicates an average time it takes for the articulated vehicle 120 to switch between gears, $\Delta t_{preview} > \Delta t_{gear}$. For example, longitudinal velocity bounds may change according to the current gear, $v \geq 0$ when the articulated vehicle 120 is in forward motion 702 and $v \leq 0$ when the articulated vehicle 120 is in reverse motion 704.

Figure 7B:
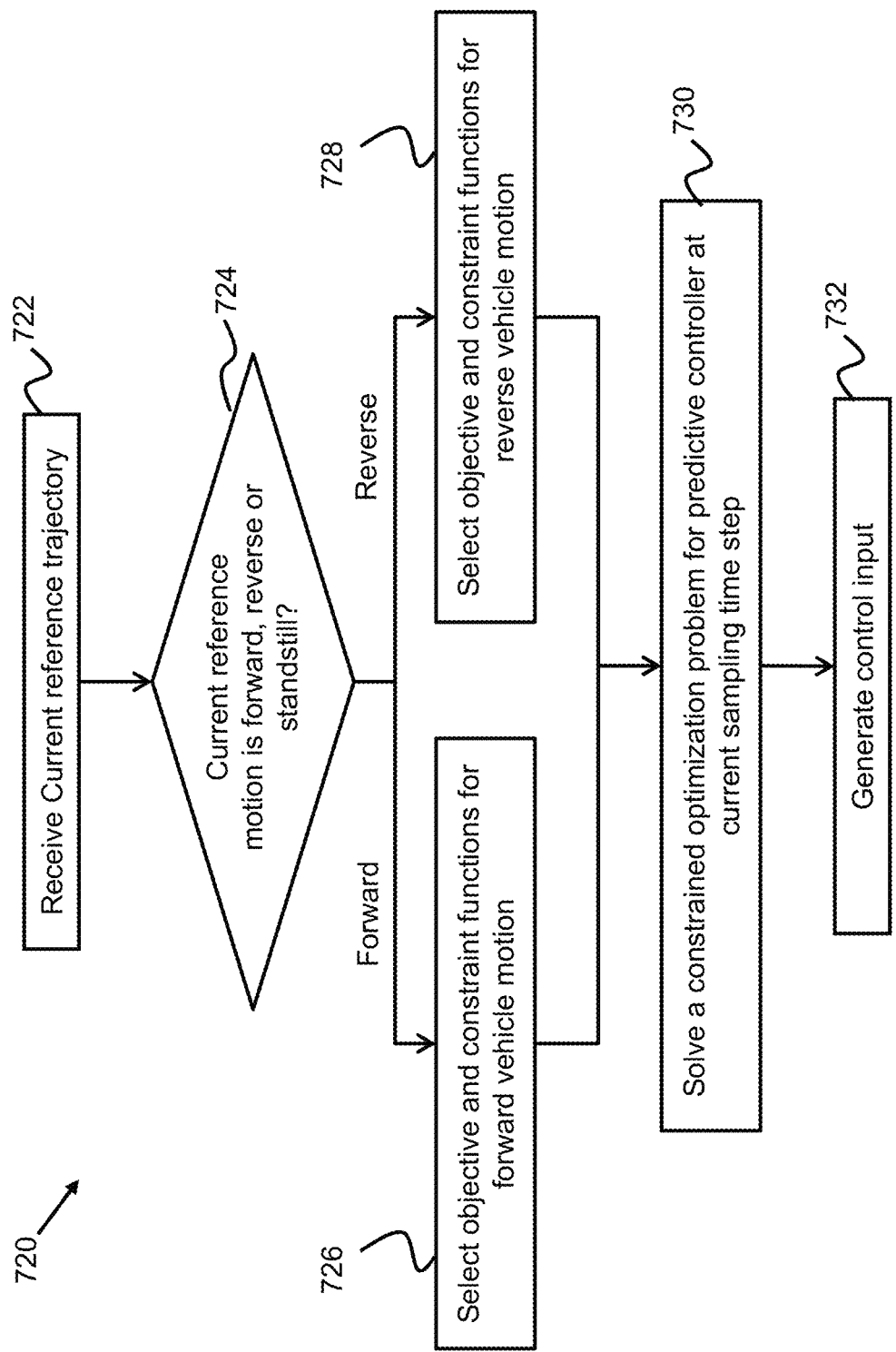
FIG. 7B shows an example method for switching non-linear program objective and constraint functions of a non-linear predictive controller, in accordance with some embodiments of the present disclosure.

FIG. 7B shows an example method 720 for switching NLP objective and constraint functions 644 of the non-linear predictive controller 104, in accordance with some embodiments of the present disclosure. In particular, the objective and constraint functions 644 of the predictive controller 104 may be switched, depending on whether a current reference motion is either a forward motion 702 or a reverse motion 704.

At 722, the current reference trajectory 107 is received. The current reference trajectory 107 may be determined by the motion planner 102 based on a first path or a second path. It may be noted that the second path may have a second number of motion cusps and a second number of initial tracking errors that is less or smaller than a first number of motion cusps and a first number of initial tracking errors of the first path.

At 724, a determination is made to check which part of the reference trajectory 107 over the prediction horizon length of the predictive controller 104 has forward motion 702, the reverse motion 704, or standstill if with zero reference velocity value 706. In other words, a determination is made to identify, for example, which part of the reference trajectory 107 over the prediction horizon length of the predictive controller 104 is either positive, negative, or close to zero.

Based on the determination at 724, at 726, the predictive controller 104 may be adjusted for forward motion. In particular, the objective and constraint functions 644 indicating the equality constraint function and the inequality constraint function, as well as the objective function 604 relating to the constrained optimization problem associated with the predictive controller 104 may be adjusted for the forward motion 702 of the articulated vehicle 120 for the forward motion part of the reference trajectory 107, at one or more sampling time steps $t_i$. This may ensure that a velocity of the articulated vehicle 120 is always larger than or equal to zero.

Further, at 728, the predictive controller 104 may be adjusted for backward motion. In this regard, the objective and constraint functions 644 indicating the equality constraint function and the inequality constraint function, as well as the objective function 604 relating to the constrained optimization problem associated with the predictive controller 104 may be adjusted for the backward vehicle motion 704 at one or more sampling time steps $t_i$, for the backward motion part of the reference trajectory 107. This may ensure that a velocity of the articulated vehicle 120 is always smaller than or equal to zero.

At 730, the predictive controller 104 may be implemented by solving the constrained optimization problem for predictive reference tracking at the current sampling time step $t_i$. The constrained optimization problem may be solved based on the objective and constraint functions 644 and the estimated state 109 for the current reference trajectory 107.

At 732, the control input 105 is generated by solving the constrained optimization problem. For example, the objective and constraint function 644 may be related to the optimization problem, such as the optimal control structured QP 608 and optimal control structured NLP 640, of the predictive controller 104. To this end, the forward vehicle motion 702 followed by the reverse vehicle motion 704 may correspond to a motion cusp.

FIG. 8A shows an example of execution of the automated docking maneuver 130 with automatic emergency braking, in accordance with some embodiments of the present disclosure. The docking maneuver 130 may be performed by the articulated vehicle 120. In order to perform the docking maneuver 130, the modified AGT motion planning algorithm implemented by the motion planner 102 and the non-linear predictive controller 104 may be integrated.

It may be noted that the AGT motion planning algorithm utilized by the motion planner 102 computes a kinematically feasible trajectory, such as the reference trajectory 107. The reference trajectory 107 may be generated based on the first path 320 or the second path. The reference trajectory 107 avoids collisions between the articulated vehicle and any static obstacles 144 in the environment 146.

However, the motion planner 102 does not take into consideration any dynamic obstacles that may enter the environment 146. Regarding the dynamic obstacles, certain restrictions are imposed on the system 100 to control movement of the articulated vehicle 120.

In this regard, some embodiments are based on the realization that the docking maneuver 130 is conducted in a mostly closed environment, i.e., without pedestrians, cyclists, or passenger vehicles, and with only sporadic appearances of dynamic obstacles in an area of interest. For example, the area of interest may correspond to a safety region. The safety region may be determined for the motion of the articulated vehicle 120 based on the reference trajectory 107. The safety region comprises safety sets, depicted as safety sets 802, 804, and 806, along the reference trajectory 107. In particular, the safety sets 802, 804, and 806 may be around a current state configuration 808 of the articulated vehicle 120 and/or predicted state configurations 810, 812 of the articulated vehicle 120 in the environment 146. It may be noted that during the docking maneuver 130, the articulated vehicle 120 may move from the current state configuration 808 to the predicted state configurations 810, 812.

Further, some embodiments of the present disclosure are based on the realization that if a dynamic obstacle appears within the safety sets 802, 804, 806 while performing the docking maneuver 130, the system 100 or the predictive controller 104 stops movement of the articulated vehicle 120 by performing an automatic emergency braking (AEB). The predictive controller 104 then resumes execution of the docking maneuver 130 after the dynamic obstacle has moved outside of the predefined safety sets 802, 804, 806.

Some embodiments of the present disclosure are based on the realization that a safety tube with a time-varying volume may be constructed around the reference trajectory 107 which will be followed by the articulated vehicle 120 for performing docking maneuver. Moreover, an AEB system may be initiated whenever the dynamic obstacle enters the time-varying safety tube.

In some embodiments of the present disclosure, one or more road-side units (RSUs) or infrastructure sensing devices 148a and 148b can be used for accurate execution of the automated docking maneuver 130, based on accurate sensing of the current state as well as accurate detection of dynamic obstacles in the environment 146 or the safety sets 802, 804, 806 of the controlled articulated vehicle 120. For example, the one or more RSUs 148a and 148b may include one or more sensors, e.g., distance range finders, radars, LIDARs, and/or cameras, as well as sensor fusion technologies in order to accurately detect the state of the articulated vehicle 120 and of dynamic obstacles in the environment 146 of the articulated vehicle 120 and the system 100. In some embodiments of the present disclosure, the communication network 149 may be used for real-time communication between the articulated vehicle 120 and the one or more RSUs or infrastructure sensing devices 148a and 148b.

In an example, the AEB system is initiated if a dynamic obstacle is detected, using sensors on-board the articulated vehicle 120 and/or possibly by communication form one or more RSUs 148a and 148b. To that end, if the dynamic obstacle is within the union of safety sets 802, 804, 806 around the current state configurations 808 or predicted state configuration 810, 812 of the articulated vehicle 120, the predictive controller 104 is interrupted and AEB system engages to execute a braking maneuver.

When the dynamic obstacle moves outside the union of safety sets 802, 804, 806, the predictive controller 104 is re-initialized, and the automatic docking maneuver 130 continues. In certain cases, due to the low speeds at which the articulated vehicle 120 executes the docking maneuver 130, the same motion plan, i.e., the reference trajectory 107 may be reused to complete the docking maneuver 130 and the AGT algorithm does not need to be executed after such an interruption. However, in certain cases, fast re-planning of the motion plan or new reference trajectory may have to be generated and obstacle avoidance constraints in the optimization problem formulation may be changed.

Figure 8B:
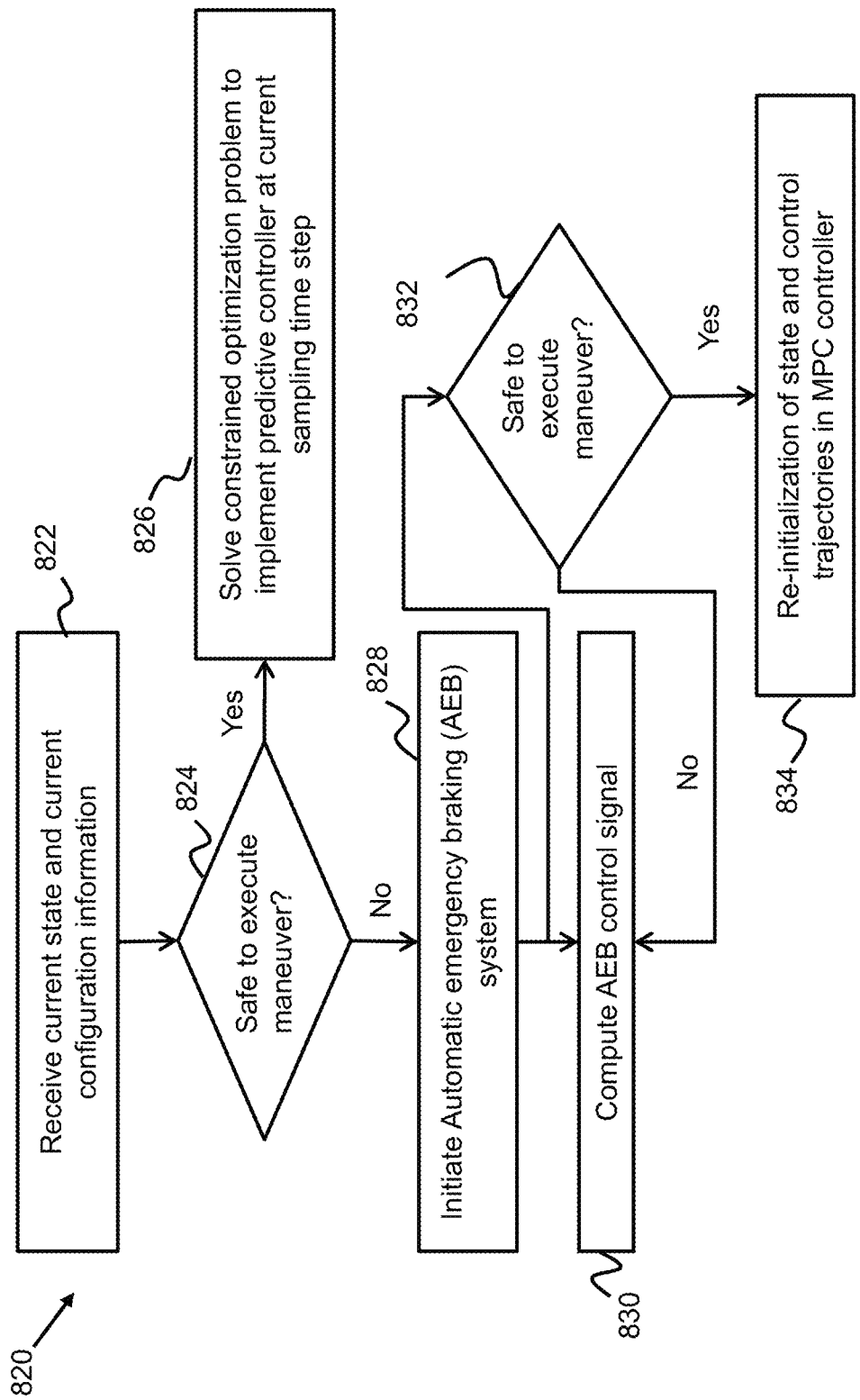
FIG. 8B shows an example method for re-initialization of the predictive controller, in accordance with some embodiments of the present disclosure.

FIG. 8B shows a method 820 for re-initialization of the predictive controller 104, in accordance with some embodiments. For example, the motion of the articulated vehicle 120 and the tracking of the predictive controller 104 may be interrupted by a dynamic obstacle. In certain cases, going back to old reference trajectory may not be feasible as, for example, the dynamic obstacle is not moving for a long time, change in the environment 146 of the articulated vehicle 120 due to the dynamic obstacle, and so forth.

At 822, information relating to a current state and current configuration 808 of the articulated vehicle 120 and surroundings of the articulated vehicle 120 is received. For example, the surroundings of the articulated vehicle 120 may correspond to safety sets 802, 804, 806. In an example, the predictive controller 104 may determine the information, based on tracking of the articulated vehicle 120 to check whether it is safe or not to execute a maneuver, such as the docking maneuver 130, at each sampling time step $t_i$, using a detection mechanism. For example, the detection mechanism may comprise using RSUs 148a and 148b or other one or more on-board sensors to sense the current configuration 808 of the articulated vehicle 120 and surroundings of the articulated vehicle 120.

At 824, a determination is made to check if each of one or more safety checks associated with maneuvering are satisfied, based on the current state 808 and the environment 146 of the vehicle 153 and the current reference trajectory 107.

Once the safety checks are satisfied, at 826, the predictive controller 104 may be implemented by solving the constrained optimization problem for predictive reference tracking of the articulated vehicle 120. The constrained optimization problem may be solved based on the reference trajectory 107 and the estimated state 109, at the sampling time step $t_i$. The predictive controller 104 may generate the control input 105 to control the articulated vehicle 120 for performing the docking maneuver 130.

However, if the safety checks are not satisfied at 828, an automatic emergency braking (AEB) system is initiated. The AEB system is initiated to safely bring the articulated vehicle 120 to a standstill. In this regard, at 830, an AEB control signal is computed. The generated AEB control signal is provided to the actuators of the articulated vehicle 120, to bring the articulated vehicle 120 to standstill.

At 832, if one or more of the safety checks are not satisfied, for example, if one or more dynamic obstacles are detected inside the safety sets 802, 804, 806 around the current state configuration 808 and/or predicted state configurations 810 and 812 of the articulated vehicle 120, the AEB system may be activated.

Some embodiments of the disclosure are based on the realization that the AEB system continues its execution as long as one or more of the safety checks are not satisfied.

Further, at 834, a re-initialization step for the state and control trajectories of the predictive controller 104 is executed when it is safe to execute the docking maneuver 130 again. For example, in order to ensure a relatively smooth transition after switching from the AEB back to the docking maneuver 130, the predictive controller 104 may computes a closest point in the reference trajectory 107 with respect to the current state configuration 808 of the articulated vehicle 120. Subsequently, the predictive controller 104 may start tracking the articulated vehicle 120 from the current state configuration 808 of the articulated vehicle 120 in the reference trajectory 107 and resulting in an updated reference trajectory for the predictive controller 104. For example, the reference trajectory 107 is set to the current state configuration 808 of the articulated vehicle 120 with a zero reference speed value. Subsequently, new reference states are time shifted within the horizon to account for the vehicle reaching a reference speed from standstill after braking.

Figure 9:
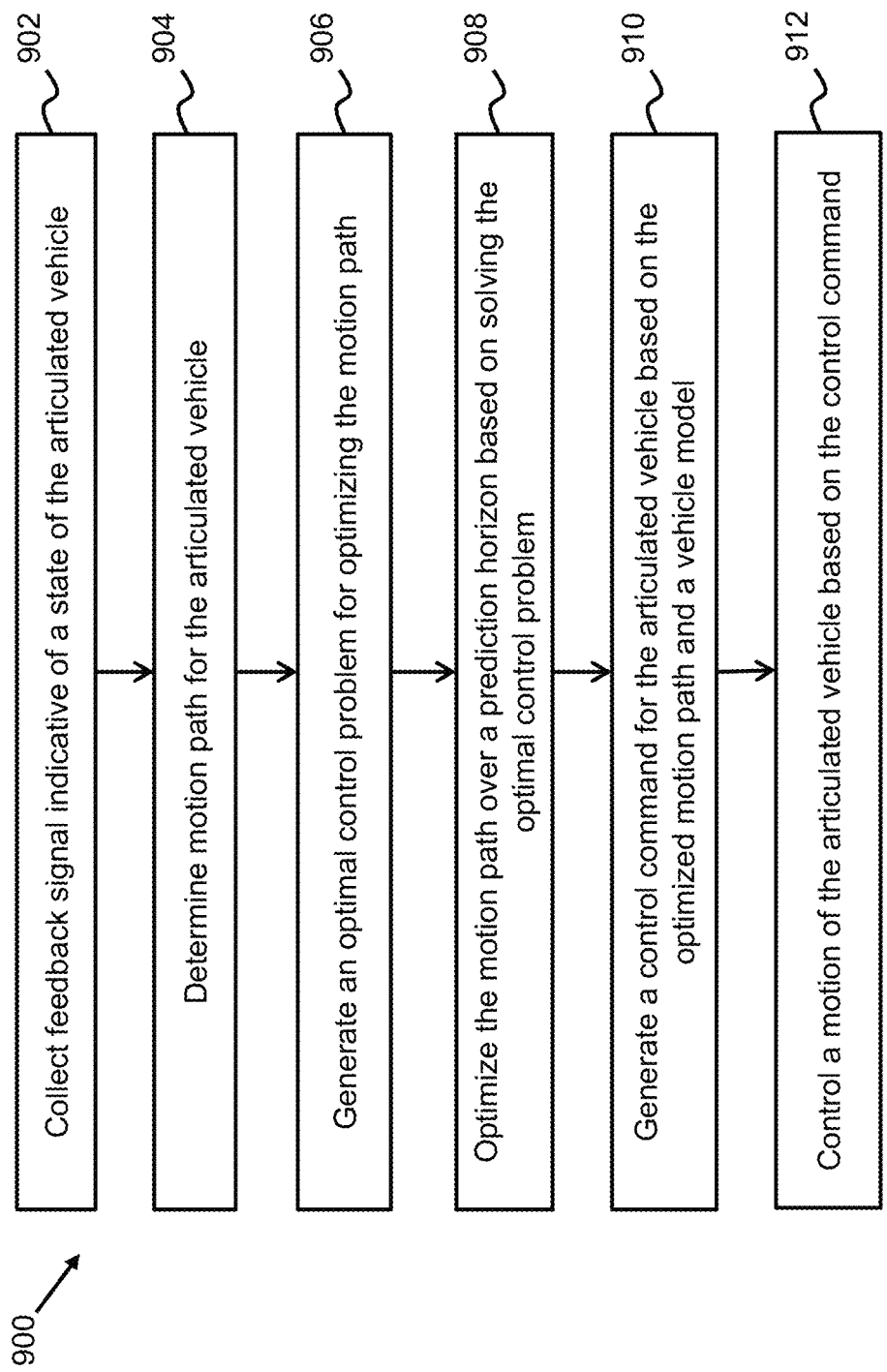
FIG. 9 shows an example method for controlling motion of an articulated vehicle, according to some embodiments of the present disclosure.

FIG. 9 shows an example flowchart 900 for implementation of a method for controlling motion of the articulated vehicle 120, in accordance with an example embodiment. More, fewer, or different steps may be provided. In an example, the steps of the method 900 may be performed by the path and motion planning system 100.

At 902, a feedback signal indicative of a state of the articulated vehicle 120 may be collected. For example, the processor 150 may collect the feedback signal form one or more sensors, such as the sensors 156 and 158, onboard the articulated vehicle 120 and/or the RSUs 148a and 148b. The feedback signal may indicate a current state and a current configuration of the articulated vehicle 120.

At 904, a motion path for the articulated vehicle 120 is determined. In an example, the motion planner 102 may determine the motion path based on the feedback signal. For example, the motion path comprises one or more forward motions of the articulated vehicle 120 and one or more backward motions 120 of the articulated vehicle. In an example, the motion path may be generated based on a first path generated by the motion planner 102. In an example, the motion path based on the first path may have a first number of motion cusps and a first number of initial tracking errors. For example, when the first number of motion cusps and the first number of initial tracking errors are greater than the predefined motion cusp threshold and the predefined initial tracking error threshold, respectively, the motion path may have to be optimized. In this regard, a number of motion cusps and a number of initial tracking errors may have to be reduced to ensure reliable tracking of a trajectory followed by the articulated vehicle 120.

At 906, an optimal control problem is generated for optimizing the motion path. The OCP comprises an integral tracking error function relating to the motion path. The integral tracking error function indicates an integral tracking error based on one or more motion cusps. As may be noted, the one or more motion cusps indicate a switching between a forward motion and a backward motion in the motion path. For example, the integral tracking error function may be a quadratic objective function indicating at least an integral tracking error based on the one or more motion cusps present in the motion path or the reference trajectory over a prediction horizon. In an example, the OCP may correspond to a constrained optimal control structured NLP.

In particular, the integral tracking error function is defined differently for forward motion and backward motion, i.e., forward direction and backward direction. Specifically, one or more functional relationships defining the integral tracking error function for the constrained optimization problem of the predictive controller 104 are determined differently for the forward motions and the backward motions in the motion path or the reference trajectory 107.

At 908, the motion path is optimized over the prediction horizon based on solving the optimal control problem. The prediction horizon may be associated with a vehicle model of the articulated vehicle 120 having the state of the articulated vehicle 120. In an example, the OCP may be solved by a tailored implementation of sequential quadratic programming (SQP) known as the real-time iterations (RTI) scheme. For example, the RTI algorithm may performs a single SQP iteration per control time step and use a continuation-based warm starting of the state and control trajectories from one time step k to the next k+1 to solve the OCP.

In an example, the predictive controller 104 may solve the OCP to generate a solution or an output 105. Further, the output 105 may be gives as feedback to the motion planner 102. Subsequently, the motion planner may generate an optimized motion path and an optimized reference trajectory.

At 910, a control command is generated for the articulated vehicle 120 based on the optimized motion path and the vehicle model. In an example, based on the optimized reference trajectory 107, the control command may be generated for the articulated vehicle 120 to cause the articulated vehicle 120 to follow the optimized reference trajectory 107.

Thereafter, at 912, the motion of the articulated vehicle 120 is controlled based on the control command, thereby changing its state. To this end the modified AGT algorithm employed by the motion planner 102 may improve the performance of the predictive controller 104 for tracking the reference trajectory 107 of the articulated vehicle 120 and for enabling successful docking maneuver 130. To this end, the motion of the articulated vehicle 120 is controlled based on the control command. Further, during the motion, the motion of the articulated vehicle 120 is tracked by the predictive controller 104 to enable to perform the docking maneuver in automatic manner. In this regard, the optimized reference trajectory 107 having reduced number of motion cusps and small initial tracking error may ensure accurate tracking of the motion of the articulated vehicle 10 and following of the reference trajectory 107 precisely.

Accordingly, blocks of the flowcharts 300, 400, 412, 426, 720, 820 and 900 support combinations of means for performing the specified functions and combinations of operations for performing the specified functions. It will also be understood that one or more blocks of the flowcharts 300, 400, 412, 426, 720, 820 and 900, and combinations of blocks in the flowcharts 300, 400, 412, 426, 720, 820 and 900, can be implemented by special purpose hardware-based computer systems which perform the specified functions, or combinations of special purpose hardware and computer instructions.

Alternatively, the system 100 may comprise means for performing each of the operations described above. In this regard, according to an example embodiment, examples of means for performing operations may comprise, for example, the processor 150 and/or a device or circuit for executing instructions or executing an algorithm for processing information as described above.

On implementing the methods 300, 400, 412, 426, 720, 820 and 900 disclosed herein, the end result generated by the system 100 is a tangible control of the articulated vehicle 120 for performing the docking maneuver 130.

Figure 10:
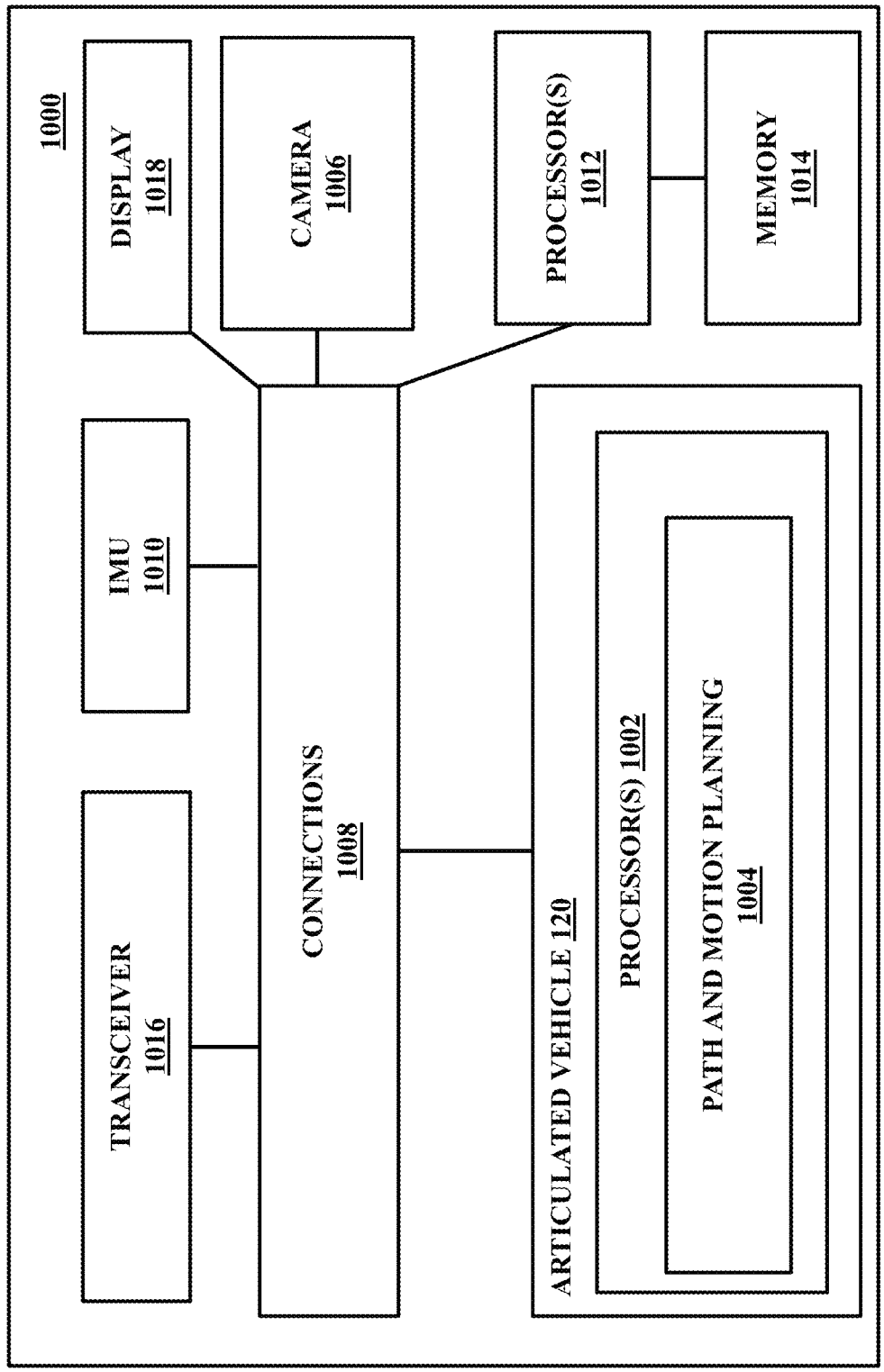
FIG. 10 shows a schematic of a system, in accordance with some embodiments of the present disclosure.

FIG. 10 shows a schematic of a system 1000, in accordance with an embodiment. The system 1000 includes the articulated vehicle 120 including a processor 1002 configured for performing path and motion planning 1004. The articulated vehicle 120 also includes at least one sensor, such as a pressure sensor, force sensor, distance range finders, radar, LIDAR and/or a camera. The sensors may be operatively connected to the processor 1002 and is configured for sensing information indicative of the initial state and the target state of the articulated vehicle 120. The articulated vehicle 120 may be a tractor-trailer type vehicle as described in previous embodiments. Using this information, the processor 1002 is configured to perform motion and path planning for the articulated vehicle 120 using one or more techniques described above in previous embodiments.

The system 1000 may include one or combination of sensor(s) 1006, an inertial measurement unit (IMU) 1010, a processor 1012, a memory 1014, a transceiver 1016, and a display/screen 1018, which can be operatively coupled to other components through connections 1008. The connections 1008 can comprise buses, lines, fibers, links, or combination thereof.

The transceiver 1016 may, for example, include a transmitter enabled to transmit one or more signals over one or more types of wireless communication networks and a receiver to receive one or more signals transmitted over the one or more types of wireless communication networks. The transceiver 1016 can permit communication with wireless networks based on a variety of technologies such as, but not limited to, femtocells, Wi-Fi networks or Wireless Local Area Networks (WLANs), which may be based on the IEEE 802.11 family of standards, Wireless Personal Area Networks (WPANS) such Bluetooth, Near Field Communication (NFC), networks based on the IEEE 802.15x family of standards, and/or Wireless Wide Area Networks (WWANs) such as LTE, WiMAX, etc. The system 1000 can also include one or more ports for communicating over wired networks.

In some embodiments, the sensor(s) 1006 may include image sensors, such as CCD or CMOS sensors, lasers and/or camera, which are hereinafter referred to as "sensor 1006". For example, the sensor 1006 can convert an optical image into an electronic or digital image and can send acquired images to the processor 1012. Additionally, or alternatively, the image sensor can sense the light reflected from a target object in a scene and submit the intensities of the captured light to the processor 1012.

For example, the sensor 1006 may include color or grayscale cameras, which provide "color information." The term "color information" as used herein refers to color and/or grayscale information. In general, as used herein, a color image or color information can be viewed as comprising 1 to N channels, where N is some integer dependent on the color space being used to store the image. For example, an RGB image comprises three channels, with one channel each for Red, Blue, and Green information.

In some embodiments, the processor 1012 can also receive input from IMU 1010. In other embodiments, the IMU 1010 can comprise 3-axis accelerometer(s), 3-axis gyroscope(s), and/or magnetometer(s). The IMU 1010 can provide velocity, orientation, and/or other position related information to the processor 1012. In some embodiments, the IMU 1010 can output measured information in synchronization with the capture of each image frame by the sensor 1006. In some embodiments, the output of the IMU 1010 is used in part by the processor 1012 to fuse the sensor measurements and/or to further process the fused measurements.

The system 1000 can also include a screen or display 1018 rendering images, such as color and/or depth images. In some embodiments, the display 1018 can be used to display live images captured by the sensor 1006, fused images, augmented reality (AR) images, graphical user interfaces (GUIs), motion control instructions, and other program outputs. In some embodiments, the display 1018 can include and/or be housed with a touchscreen to permit users to input data via some combination of virtual keyboards, icons, menus, or other GUIs, user gestures and/or input devices such as styli and other writing implements. In some embodiments, the display 1018 can be implemented using a liquid crystal display (LCD) display or a light emitting diode (LED) display, such as an organic LED (OLED) display. In other embodiments, the display 1018 can be a wearable display. In some embodiments, the result of the fusion may be rendered on the display 1018 or submitted to different applications that can be internal or external to the system 1000.

Exemplary system 1000 can also be modified in many ways in a manner consistent with the disclosure, such as, by adding, combining, or omitting one or more of the functional blocks shown. For example, in some configurations, the system 1000 does not include the IMU 1010 or the transceiver 1016. Further, in certain example implementations, the system 1000 include a variety of other sensors (not shown) such as an ambient light sensor, microphones, acoustic sensors, ultrasonic sensors, laser range finders, etc. In some embodiments, portions of the system 1000 take the form of one or more chipsets, and/or the like.

The processor 1012 can be implemented using a combination of hardware, firmware, and software. The processor 1012 can represent one or more circuits configurable to perform at least a portion of a computing procedure or process related to sensor fusion and/or methods for further processing the fused measurements. The processor 1012 retrieves instructions and/or data from memory 1060. The processor 1012 can be implemented using one or more application specific integrated circuits (ASICs), central and/or graphical processing units (CPUs and/or GPUs), digital signal processors (DSPs), digital signal processing devices (DSPDs), programmable logic devices (PLDs), field programmable gate arrays (FPGAs), controllers, micro-controllers, microprocessors, embedded processor cores, electronic devices, other electronic units designed to perform the functions described herein, or a combination thereof.

The memory 1014 may be implemented within the processor 1012 and/or external to the processor 1012. As used herein the term "memory" refers to any type of long term, short term, volatile, nonvolatile, or other memory and is not to be limited to any particular type of memory or number of memories, or type of physical media upon which memory is stored. In some embodiments, the memory 1014 holds program codes that facilitate the automated parking or motion planning of tractor-trailer-based articulated vehicle 120.

For example, the memory 1014 can store the measurements of the sensors, such as still images, depth information, video frames, program results, as well as data provided by the IMU 1010 and other sensors. The memory 1014 can store a memory storing a geometry of the articulated vehicle 120, a map of the environment in which the maneuvering of the vehicle is to be performed, a kinematic model of the articulated vehicle 120, and a dynamic system model of the articulated vehicle 120. In general, the memory 1014 may represent any data storage mechanism. The memory 1014 can include, for example, a primary memory and/or a secondary memory. The primary memory can include, for example, a random-access memory, read only memory, etc. While illustrated in FIG. 10 as being separate from the processors 1012, it should be understood that all or part of a primary memory can be provided within or otherwise co-located and/or coupled to the processors 1012.

Secondary memory may include, for example, the same or similar type of memory as primary memory and/or one or more data storage devices or systems, such as, for example, flash/USB memory drives, memory card drives, disk drives, optical disc drives, tape drives, solid state drives, hybrid drives etc. In certain implementations, secondary memory can be operatively receptive of, or otherwise configurable to a non-transitory computer-readable medium in a removable media drive (not shown). In some embodiments, the non-transitory computer readable medium forms part of the memory 1014 and/or the processor 1012.

The above-described embodiments of the present disclosure can be implemented in any of numerous ways. For example, the embodiments may be implemented using hardware, software, or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the disclosure may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed but are used merely as labels to distinguish one claim element having a certain name from another element having a same name (but for use of the ordinal term) to distinguish the claim elements.

Although the disclosure has been described by way of examples of preferred embodiments, it is to be understood that various other adaptations and modifications can be made within the spirit and scope of the disclosure.

Therefore, it is the object of the appended claims to cover all such variations and modifications as come within the true spirit and scope of the disclosure.

We claim:

1. A path and motion planning system for controlling a motion of an articulated vehicle having one or more trailers, comprising:
   a memory configured to store computer executable instructions; and
   one or more processors configured to execute the instructions to:
   collect a feedback signal indicative of a state of the articulated vehicle;
   determine a motion path for the articulated vehicle based on the feedback signal, the motion path comprising one or more forward motions of the articulated vehicle and one or more backward motions of the articulated vehicle;
   generate an optimal control problem for optimizing the motion path, the optimal control problem comprising an integral tracking error function relating to the motion path, the integral tracking error function indicating at least an integral tracking error resulting from one or more motion cusps, the one or more motion cusps indicating a switching between a forward motion and a backward motion in the motion path;

optimize the motion path over a prediction horizon based on solving the optimal control problem, the prediction horizon being associated with a vehicle model of the articulated vehicle having the state;

generate a control command for the articulated vehicle based on the optimized motion path and the vehicle model; and control the motion of the articulated vehicle based on the control command, thereby changing its state.

2. The path and motion planning system of claim 1, wherein the one or more processors are further configured to:

construct a graph having multiple nodes defining states of the articulated vehicle over the prediction horizon, the multiple nodes of the graph comprising an initial node defining a target state of the articulated vehicle and a target node defining an initial state of the articulated vehicle, wherein each pair of nodes in the graph is connected with an edge defined by one or a combination of collision-free motion primitives moving the articulated vehicle between the states of the connected nodes, and wherein the multiple nodes connected through the corresponding edges form a first path through the graph connecting the initial node with the target node by a sequence of motion primitives for moving the articulated vehicle from the initial state to the target state;

generate the motion path based on the first path formed by the graph; and control the motion of the articulated vehicle based on the motion path, when the motion path is formed before a termination condition is met.

3. The path and motion planning system of claim 2, wherein the one or more processors are further configured to:

connect the target node of the graph to an initial configuration of the articulated vehicle by solving a linear quadratic regulator (LQR) steering problem.

4. The path and motion planning system of claim 3, wherein the one or more processors are further configured to:

determine a first number of motion cusps in the sequence of motion primitives of the first path;

determine a first number of initial tracking errors induced by solving the LQR steering problem; and on determining at least one of: the first number of motion cusps to be greater than a predefined motion cusp threshold, or the first number of initial tracking errors to be greater than a predefined initial tracking error threshold, expand the graph to add one or more new nodes until the termination condition is met, wherein the expansion of the graph is subjected to a constraint associated with at least one of: a total number of motion cusps, or a total number of initial tracking errors, the graph is expanded to form a second path by connecting the initial node with the target node, and the second path has at least: a second number of motion cusps that are less than the first number of motion cusps or a second number of initial tracking errors that are less than the first number of initial tracking errors.

5. The path and motion planning system of claim 4, wherein the one or more processors are further configured to:

generate a reference trajectory for the motion of the articulated vehicle along at least one of: the first path or the second path, as a function of time; and generate a control command for the articulated vehicle to cause the articulated vehicle to follow the reference trajectory.

6. The path and motion planning system of claim 5, wherein the one or more processors are further configured to:

determine a safety region for the motion of the articulated vehicle based on the generated reference trajectory, the safety region comprising one or more safety sets along the reference trajectory;

check for a dynamic obstacle within the safety region; and on identifying the dynamic obstacle to be within the safety region, cause to stop the motion of the articulated vehicle along the reference trajectory by initiating an automatic emergency braking (AEB) system to execute a braking maneuver.

7. The path and motion planning system of claim 1, wherein the system comprises a predictive controller, the predictive controller configured with at least a constraint function, a quadratic objective function and the vehicle model, wherein the predictive controller is configured to track the motion of the articulated vehicle.

8. The path and motion planning system of claim 7, wherein the one or more processors are further configured to:

generate an equality constraint function and an inequality constraint function for the predictive controller, wherein the predictive controller comprises one or more non-linear constraints and a non-linear vehicle model;

generate an objective function for the predictive controller, the objective function being configured to minimize errors between one or more predicted states and the reference trajectory over a prediction time horizon of the predictive controller; and solve a constrained optimization problem associated with the predictive controller based on the equality constraint function, the inequality constraint function, and the objective function, using one or more iterations of sequential quadratic programming.

9. The path and motion planning system of claim 8, wherein the equality constraint function, the inequality constraint function and the objective function relating to the constrained optimization problem associated with the predictive controller are adjusted to at least one of: a forward motion of the articulated vehicle or a backward motion of the articulated vehicle.

10. The path and motion planning system of claim 9, wherein one or more functional relationships defining an integral action for the constrained optimization problem of the predictive controller are determined differently for the one or more forward motions and the one or more backward motions, and wherein an integral tracking error state is reset at the time at which the one or more motion cusps occur.

11. The path and motion planning system of claim 10, wherein the articulated vehicle comprises a tractor coupled with one or more trailers, wherein the integral action is implemented to integrate at least one of: a lateral positional tracking error of an end trailer when the articulated vehicle is executing the one or more backward motions, or a lateral positional tracking error of the tractor when the articulated vehicle is executing the one or more forward motions.

12. The path and motion planning system of claim 7, wherein the predictive controller includes one or more collision avoidance constraints to enforce one or more collision-free motion primitives in an environment while executing a sequence of motion primitives for moving the articulated vehicle.

13. The path and motion planning system of claim 12, wherein each of the one or more collision avoidance constraints are implemented using multiple non-linear inequality constraints.

14. The path and motion planning system of claim 1, wherein the articulated vehicle is a tractor-trailer vehicle comprising a tractor coupled with one or more trailers, and wherein the articulated vehicle is controlled by the path and motion planning system to perform a docking maneuver.

15. A method for controlling a motion of an articulated vehicle having one or more trailers, the method comprising:
    collecting a feedback signal indicative of a state of the articulated vehicle;
    determining a motion path for the articulated vehicle based on the feedback signal, the motion path comprising one or more forward motions of the articulated vehicle and one or more backward motions of the articulated vehicle;
    generating an optimal control problem for optimizing the motion path, the optimal control problem comprising an integral tracking error function relating to the motion path, the integral tracking error function indicating at least an integral tracking error based on one or more motion cusps, the one or more motion cusps indicating a switching between a forward motion and a backward motion in the motion path;
    optimizing the motion path over a prediction horizon based on solving the optimal control problem, the prediction horizon being associated with a vehicle model of the articulated vehicle having the state;
    generating a control command for the articulated vehicle based on the optimized motion path and the vehicle model; and
    controlling the motion of the articulated vehicle based on the control command, thereby changing its state.

16. The method of claim 15, the method further comprising:
    constructing a graph having multiple nodes defining states of the articulated vehicle over the prediction horizon, the multiple nodes of the graph comprising an initial node defining an initial state of the articulated vehicle and a target node defining a target state of the articulated vehicle, wherein each pair of nodes in the graph is connected with an edge defined by one or a combination of collision-free motion primitives moving the articulated vehicle between the states of the connected nodes, and wherein the multiple nodes connected through the corresponding edges form a first path through the graph connecting the initial node with the target node by a sequence of motion primitives for moving the articulated vehicle from the initial state to the target state;
    generating the motion path based on the first path formed by the graph; and
    controlling the motion of the articulated vehicle based on the motion path, when the motion path is formed before a termination condition is met.

17. The method of claim 16, the method further comprising:
    determining a first number of motion cusps in the sequence of motion primitives of the first path;
    determining a first number of initial tracking errors induced by solving a linear quadratic regulator (LQR) steering problem; and
    on determining at least one of: the first number of motion cusps to be greater than a predefined motion cusp threshold, or the first number of initial tracking errors to be greater than a predefined initial tracking error threshold, expanding the graph to add one or more new nodes until the termination condition is met, wherein
        the expansion of the graph is subjected to a constraint associated with at least one of: a total number of motion cusps, or a total number of initial tracking errors,
        the graph is expanded to form a second path connecting the initial node with the target node, and
        the second path has at least: a second number of motion cusps that is less than the first number of motion cusps, or a second number of initial tracking errors that are less than the first number of initial tracking errors.

18. The method of claim 17, the method further comprising:
    generating a reference trajectory for the motion of the articulated vehicle along at least one of: the first path or the second path, as a function of time; and
    generating a control command for the articulated vehicle to cause the articulated vehicle to follow the reference trajectory.

19. The method of claim 15, the method further comprising:
    generating an equality constraint function and an inequality constraint for a predictive controller when the predictive controller comprises one or more non-linear constraints and a non-linear vehicle model,
    generating an objective function for the predictive controller relating to a constrained optimization problem, the objective function being configured to minimize errors between one or more predicted states and the reference trajectory over a prediction time horizon of the predictive controller, wherein
        the equality constraint function, the inequality constraint function and the objective function associated with the predictive controller are adjusted to at least one of: a forward motion of the articulated vehicle or a backward motion of the articulated vehicle,
        one or more functional relationships defining an integral action for the constrained optimization problem of the predictive controller are determined differently for the one or more forward motions and the one or more backward motions, and
        an integral tracking error state is reset at each time step for the one or more motion cusps; and
    solving the constrained optimization problem associated with the predictive controller based on the equality constraint function, the inequality constraint function, and the objective function, using one or more iterations of sequential quadratic programming.

20. A non-transitory computer readable storage medium embodied thereon a program executable by a processor for performing a method, the method comprising:
    collecting a feedback signal indicative of a state of the articulated vehicle;

determining a motion path for the articulated vehicle based on the feedback signal, the motion path comprising one or more forward motions of the articulated vehicle and one or more backward motions of the articulated vehicle;

generating an optimal control problem for optimizing the motion path, the optimal control problem comprising an integral tracking error function relating to the motion path, the integral tracking error function indicating at least an integral tracking error based on one or more motion cusps, the one or more motion cusps indicating a switching between a forward motion and a backward motion in the motion path;

optimizing the motion path over a prediction horizon based on solving the optimal control problem, the prediction horizon being associated with a vehicle model of the articulated vehicle having the state;

generating a control command for the articulated vehicle based on the optimized motion path and the vehicle model; and controlling the motion of the articulated vehicle based on the control command, thereby changing its state.

* * * * *